US011124416B2

(12) United States Patent
Price

(10) Patent No.: US 11,124,416 B2
(45) Date of Patent: Sep. 21, 2021

(54) RELATING TO GRAPHENE NANOMATERIALS

(71) Applicant: Kainos Innovation Limited, Chester (GB)

(72) Inventor: Richard John Price, Chester (GB)

(73) Assignee: Kainos Innovation Limited, Chester (GB)

( * ) Notice: Subject to any disclaimer, the term of this patent is extended or adjusted under 35 U.S.C. 154(b) by 268 days.

(21) Appl. No.: 16/320,710

(22) PCT Filed: Jul. 27, 2017

(86) PCT No.: PCT/GB2017/052187
§ 371 (c)(1),
(2) Date: Jan. 25, 2019

(87) PCT Pub. No.: WO2018/020247
PCT Pub. Date: Feb. 1, 2018

(65) Prior Publication Data
US 2019/0161352 A1 May 30, 2019

(30) Foreign Application Priority Data

Jul. 27, 2016 (GB) .................................... 1613012

(51) Int. Cl.
*C01B 32/194* (2017.01)
*C01B 32/184* (2017.01)
(52) U.S. Cl.
CPC .......... *C01B 32/194* (2017.08); *C01B 32/184* (2017.08); *C01B 2204/02* (2013.01);
(Continued)

(58) Field of Classification Search
CPC . C01B 32/194; C01B 32/184; C01B 2204/26; C01B 2204/24; C01B 2204/22;
(Continued)

(56) References Cited

U.S. PATENT DOCUMENTS

2013/0040124 A1 2/2013 Koo
2014/0335010 A1 11/2014 Sorensen
(Continued)

FOREIGN PATENT DOCUMENTS

CN 105523543 4/2016
EP 3037384 6/2016
(Continued)

OTHER PUBLICATIONS

Cravotto, Giancarlo, and Pedro Cintas. "Sonication-assisted fabrication and post-synthetic modifications of graphene-like materials." Chemistry—A European Journal 16.18 (2010): 5246-5259.*
(Continued)

*Primary Examiner* — Richard M Rump
(74) *Attorney, Agent, or Firm* — Fitch, Even, Tabin & Flannery LLP

(57) ABSTRACT

A process for preparing a graphene nanomaterial product, the process comprising: cavitating a liquid medium comprising a diaromatic hydrocarbon component to synthesise from the diaromatic hydrocarbon component a dispersion of graphene nanomaterial in the liquid medium; and obtaining a graphene nanomaterial product from the dispersion.

19 Claims, 28 Drawing Sheets

(52) U.S. Cl.
CPC ...... *C01B 2204/04* (2013.01); *C01B 2204/22* (2013.01); *C01B 2204/24* (2013.01); *C01B 2204/26* (2013.01); *C01P 2002/82* (2013.01); *C01P 2002/84* (2013.01); *C01P 2002/85* (2013.01); *C01P 2004/04* (2013.01); *C01P 2004/51* (2013.01); *C01P 2006/22* (2013.01)

(58) Field of Classification Search
CPC ............. C01B 2204/04; C01B 2204/02; C01P 2006/22; C01P 2004/51; C01P 2004/04; C01P 2002/85; C01P 2002/84; C01P 2002/82
See application file for complete search history.

(56) References Cited

U.S. PATENT DOCUMENTS

| | | |
|---|---|---|
| 2015/0225244 A1 | 8/2015 | Hintermann |
| 2015/0239741 A1 | 8/2015 | Burton |
| 2016/0019995 A1 | 1/2016 | Zhamu |
| 2017/0050855 A1 | 2/2017 | Shankman |

FOREIGN PATENT DOCUMENTS

| | | |
|---|---|---|
| EP | 3056468 | 8/2016 |
| GB | 2543486 | 4/2017 |
| GB | 2544797 | 5/2017 |
| KR | 101465205 | 11/2014 |
| WO | 2011136478 | 11/2011 |
| WO | 2015120485 | 8/2015 |
| WO | 2015193268 | 12/2015 |
| WO | 2017089818 | 6/2017 |
| WO | 2017089825 | 6/2017 |
| WO | 2018020247 | 2/2018 |

OTHER PUBLICATIONS

Zhang, L.; Zhang, Z.; He, C.; Dai, L.; Liu, J.; Wang, L. Rationally Designed Surfactants for Few-Layered Graphene Exfoliation: Ionic Groups Attached to Electron-Deficient Π-Conjugated Unit through Alkyl Spacers. ACS Nano 2014, 8, 6663-6670, DOI: 10.1021/nn502289w.*

Lockett, Russel, et al., "An Optical Characterization of the Effect of High-Pressure Hydrodynamic Cavitation on Diesel." SAE Technical Papers Series, vol. 1, Apr. 5, 2016, 8 pages.

Fengyun, Ma, et al., "Effect of Cavitation Treatment on the Chemical Composition of Coal Tar." Solid Fuel Chemistry, vol. 45, No. 5, Oct. 14, 2011, pp. 353-358.

Ye, Yu-Fang, et al., "Increase of Acenaphthene Content in Creosote Oil by Hydrodynamic Cavitation." Chemical Engineering and Processing, vol. 104, Mar. 3, 2016, pp. 66-74.

Cataldo, Franco. "Ultrasound-Induced Cracking and Pyrolysis of Some Aromatic and Naphthenic Hydrocarbons", Ultrasonics Sonochemistry, vol. 7, No. 1, Jan. 1, 2000, pp. 35-43.

Katoh, Ryuzi, et al., "Possible New Route for the Production of C60 by Ultrasound." Ultrasonics: Sonochemistry, Butterworth-Heinemann, GB, vol. 5, No. 1, Mar. 1, 1998, pp. 37-38.

Patent Cooperation Treaty, International Bureau, Notification Concerning Transmittal of International Preliminary Report on Patentability (Chapter I of the Patent Cooperation Treaty) and the Written Opinion of the International Searching Authority, issued in International Application No. PCT/GB2017/052187, dated Jan. 29, 2019, 12 pp.

Price, R.J., et al., Understanding the Impact of Cavitation on Hydrocarbons in the Middle Distillate Range. Fuel, IPC Science and Technology Press, Guildford, GB, vol. 156, Apr. 22, 2015, pp. 30-39.

Paton, Keith R., et al., "Scalable Production of Large Quantities of Defect-Free Few-Layer Graphine by Shear Exfoliation in Liquids." Nature Materials, vol. 13, Jun. 2014, pp. 624-630.

Herron, Christopher R., et al., "Simple and Scalable Route for the 'bottom-up' Synthesis of Few-Layer Graphene Platelets and Thin Films." Journal of Materials Chemistry, vol. 21, 2011, pp. 3378-3383.

Kauppila, Jussi. "Graphene From Graphite by Chemical and Physical Techniques." Ph. D. thesis, University of Turku, 2014, 64 pages.

Sobon, Grzegorz, et al., "Graphene Oxide vs. Reduced Graphene Oxide as Saturable Absorbers for Er-doped Passively Mode-Locked Fiber Laser." Optics Express, vol. 20, No. 17, Aug. 13, 2012, pp. 19464-19473.

Krishnamoorthy, Karthikeyan, et al., "The Chemical and Structural Analysis of Graphene Oxide with Different Degrees of Oxidation." Carbon, vol. 53, 2013, pp. 38-49.

Suslick, Kenneth S., et al., "Inside a Collapsing Bubble: Sonoluminescence and the Conditions During Cavitation." Annual Review of Physical Chemistry, vol. 59, 2008, pp. 659-683.

Suslick, Kenneth S., et al., "The Sonochemical Hot Spot." Journal of American Chemical Society, 1986, vol. 108, pp. 5641-5642.

Flint, Edward B., et al., "The Temperature of Cavitation." Science, New Series, vol. 253, Issue 5026, Sep. 20, 1991, pp. 1397-1399.

Didenko, Yuri T., et al., "Temperature of Multibubble Sonoluminescence in Water." Journal of American Chemical Society, 1999, vol. 103, pp. 10783-10788.

McNamara III, William B., et al., "Sonoluminescence Temperatures During Multi-Bubble Cavitation." Nature, vol. 401, Oct. 21, 1999, pp. 772-775.

Mason, Timothy J., et al., "Applied Sonochemistry: The Uses of Power Ultrasound in Chemisty and Processing." Weinham: Wiley-VCH, 2002, 311 pages.

Zechmeister, L., et al., "On the Cleavage of Benzene, Thiophene and Furan Rings by Means of Ultrasonic Waves." Journal of American Chemical Society, vol. 77, May 20, 1955, pp. 2853-2855.

Zechmeister, L., et al., "On the Ultrasonic Cleavage of the Pyridine Ring." Journal of American Chemical Society, vol. 78, May 20, 1956, pp. 2149-2150.

Currell, Douglas L., et al., "On the Ultrasonic Cleavage of Some Aromatic and Heterocyclic Rings." Journal of American Chemical Society, vol. 80, Jan. 5, 1958, pp. 205-208.

Suslick, Kenneth S., et al., "Alkane Sonochemistry." Journal of Physical Chemistry, vol. 87, 1983, pp. 2299-2301.

Riesz, P., et al., "Free Radical Generation by Ultrasound in Aqueous and Nonaqueous Solutions." Environmental Health Perspectives, vol. 64, 1985, pp. 233-252.

Misik, Vladimir, et al., "Free Radical Formation by Ultrasound in Organic Liquids: A Spin Trapping and EPR Study." Journal of Physical Chemistry, 1994, vol. 98, No. 6, pp. 1634-1640.

Misik, Vladimir, et al., "EPR Study of Free Radicals Induced by Ultrasound in Organic Liquids II*. Probing the Temperatures of Cavitation Regions." Ultrasonics Sonochemistry, vol. 3, 1996, pp. 25-37.

Price, Gareth J., et al., "Use of High-Intensity Ultrasound as a Potential Test Method for Diesel Fuel Stability." Fuel, 1995, vol. 74, No. 9, pp. 1394-1397.

Price, Gareth J., et al., "The Effect of High-Intensity Ultrasound on Diesel Fuels." 1995, vol. 2, No. 2, pp. S67-S70.

Lockett, R.D., et al., "An Experimental Investigation Into the Effect of Hydrodynamic Cavitation on Diesel." International Journal of Engine Research, 2013, vol. 14, No. 6, pp. 606-621, 49 pages.

Katoh, R., et al., "Sonochemical Production of a Carbon Nanotube." Ultrasonics Sonochemistry, vol. 6, 1999, pp. 185-187.

Katoh, Ryuzi, et al., "Sonochemical Polymerization of Benzene Derivatives: the Site of the Reaction." Ultrasonics Sonochemistry, vol. 5, 1998, pp. 69-72.

Xu, Hangxun, et al., "Sonochemical Synthesis of Nanomaterials." Chemical Society Review, 2013, vol. 42, pp. 2555-2567.

Noltingk, B.E., et al., "Cavitation Produced by Ultrasonics." Proceedings of the Physical Society. Section B, vol. 63, 1950, pp. 674-685.

Neppiras, E.A., "Acoustic Cavitation." Review Section of Physics Letters, vol. 61, No. 3, 1980, pp. 159-251.

Murakami, M. "Morphology and Polymerization Mechanism of One-Dimensional Graphite Polymer, Poly-Peri-Naphthalene." Synthetic Metals, vol. 18, 1987, pp. 531-536.

(56) References Cited

OTHER PUBLICATIONS

Kamo, Hiroaki, et al., "Formation of Poly-Peri-Naphthalene Thin Film by Chemical Vapor Depostion." Synthetic Metals, vol. 68, 1994, pp. 61-63.
Treier, Matthias, et al., "Surface-Assisted Cyclodehydrogenation Provides a Synthetic Route Towards Easily Processable and Chemically Tailored Nanographenes." Nature Chemistry, vol. 3, Jan. 2011, pp. 61-67.
Handbook of Fluid Dynamics and Fluid Machinery: Fundamentals of Fluid Dynamics, vol. I. Edited by Joseph A. Schetz and Allen E. Fuhs, John Wiley & Sons, Inc., 1996, pp. 161-162.
NIST Chemistry WebBook, NIST Standard Reference Database No. 69, believed to be publicly available at least as of Jul. 27, 2016, <https://webbook.nist.gov/chemistry/>, 4 pages.
Dortmund Data Bank, DDBST GmbH (Oldenburg), Saturated Vapor Pressure, Calculation by Antoine Equation, website <http://ddbonline.ddbst.com/AntoineCalculation/AntoineCalculationCGI.exe>, believed to be publicly available at least as of Jul. 27, 2016, 1 page.
He, Peng, et al., "Processable Aqueous Dispersions of Graphene Stabilized by Graphene Quantum Dots." Chemistry of Materials, Dec. 3, 2014, pp. 1-30.
Kim, Sung, et al., "Size-dependence of Raman Scattering From Graphene Quantum Dots: Interplay Between Shape and Thickness." Applied Physics Letters, vol. 102, 2013, pp. 053108-1-053108-3.
Dreyer, Daniel R., et al., "The Chemistry of Graphene Oxide." Chemical Society Reviews, 2010, vol. 39, pp. 228-240.
Hernandez, Yenny, et al., "Measurement of Multicomponent Solubility Parameters for Graphene Facilitates Solvent Discovery." Langmuir, vol. 26, No. 5, Nov. 2, 2009, pp. 3208-3213.
Konios, Dimitrios, et al., "Dispersion Behaviour of Graphene Oxide and Reduced Graphene Oxide." Journal of Colloid and Interface Science, vol. 430, 2014, pp. 108-112.
Yi, Min, et al., "Achieving Concentrated Graphene Dispersions in Water/Acetone Mixtures by the Strategy of Tailoring Hansen Solubility Parameters." Journal of Physics D: Applied Physics, vol. 46, 2013, 9 pages.
Hansen, Charles M., "Hansen Solubility Parameters: A User's Handbook." Second Edition, CRC Press, 2007, 526 pages.
British Application No. 1613012.2, Search Report, dated Feb. 7, 2017, 4 pages.
Bianco, Alberto, et al., "All in the Graphene Family—A Recommended Nomenclature for Two-Dimensional Carbon Materials." Carbon, vol. 65, 2013, pp. 1-6.
Hernandez, Yenny, et al., "High-Yield Production of Graphene by Liquid-Phase Exfoliation of Graphite." Nature Nanotechnology, vol. 3, Sep. 2008, pp. 563-568.
Lotya, Mustafa, et al., "High-Concentration, Surfactant-Stabilized Gaphene Dispersions." ACS Nano, vol. 4, No. 6, 2010, pp. 3155-3162.
Vencel, T., et al., "Oxygen Exclusion from the Organic Solvents Using Ultrasound and Comparison with Other Common Techniques Used in Photochemical Experiments." Chemical Papers, vol. 59, No. 4, 2005, pp. 271-274.
Johnson, David W., et al., "A Manufacturing Perspective on Graphene Dispersions." Current Opinion in Colloid & Interface Science, vol. 20, 2015, pp. 367-382.
Kuila, Tapas, et al., "Chemical Functionalization of Graphene and its Applications." Progress in Materials Science, vol. 57, 2012, pp. 1061-1105.
Yang, T., et al., "Synthesis and Characterization of Alkylamine-Functionalized Graphene for Polyolefin-Based Nanocomposites." Applied Surface Science, vol. 305, 2014, pp. 725-731.
Jang, Jinhee, et al., "Dispersibility of Reduced Alkylamine-Functionalized Graphene Oxides in Organic Solvents." Journal of Colloid and Interface Science, vol. 424, 2014, pp. 62-66.
Feicht, Patrick, et al., "Facile and Scalable One-Step Production of Organically Modified Graphene Oxide by a Two-Phase Extraction." Carbon, vol. 80, 2014, pp. 229-234.
Riesz, Peter, et al., "Free Radical Formation Induced By Ultrasound and Its Biological Implications." Free Radical Biology & Medicine, 1992, vol. 13, pp. 247-270.
Xu, Jiasheng, et al. "Liquid-phase exfoliation of graphene in organic solvents with addition of naphthalene." Journal of Colloid and Interface Science, vol. 418, 2014, pp. 37-42.

\* cited by examiner

RELATING TO GRAPHENE NANOMATERIALS

FIELD OF THE INVENTION

The present invention relates to processes for preparing graphene nanomaterial products, and to products obtained thereby.

BACKGROUND TO THE INVENTION

Graphene in its pristine form is a two-dimensional single layer of continuous hexagonally arranged carbon atoms. It has been shown to have a number of interesting physical properties; including large surface area, immense strength, and extremely high thermal and electrical conductivity. Sheets of the material are flexible, impermeable to gases and relatively transparent, leading to a broad range of potential applications including electronic devices, energy storage materials, polymer nanocomposites, conductive inks and sensors.

The biggest challenge to the successful future application of graphene in new devices is the availability of the material. To-date the main production focus has been on 'top-down' approaches, which involve breaking stacked layers of graphite apart to yield graphene sheets. Exfoliation of graphite was first reported by micromechanical cleavage and subsequently has been achieved electrochemically, by sonication and high shear. The breakdown of layers can also be aided by the conversion of graphite to graphite oxide or intercalated graphite as a first step in top-down synthesis. All such routes are dependent upon the availability of high quality graphite.

'Bottom-up' methods of synthesis from alternative sources of carbon (generally small molecules) that require high temperatures have also been investigated. Large area films of graphene can be grown on metals or silicon carbide substrates, although substrate removal can present difficulties. Graphene nanomaterials have been synthesised by Chemical Vapour Deposition (CVD) without the use of any substrates. Graphene is typically collected outside of the furnace and production can therefore take place as a continuous process. An example of this type of approach is graphene production by the microwave-enhanced CVD of ethanol at atmospheric pressure. The thermal decomposition of sodium ethoxide in ethanol to produce few-layer graphene via substrate free CVD has also been demonstrated.

Recently there has been growing interest in the fabrication of graphene in the form of narrow strips (Graphene Nano Ribbons, GNRs) and dots (Graphene Quantum Dots, GQDs). GQDs are sufficiently small (<30 nm) to produce quantum confinement and size dependent photoluminescence as a result of changing the zero band gap found in conventional forms of graphene. Carbon-based GQDs offer some advantages over quantum dots fabricated from inorganic semiconductor materials with respect to their toxicity and cost.

Again the synthesis of GQDs falls into two broad categories: top-down and bottom-up. Top-down approaches start with the conversion of graphite into sheets of graphite oxide. A cutting procedure (hydrothermal, solvothermal, electrochemical, nano lithography, microwave-assisted, nanotonmy-assisted or ultrasonic) is then applied to convert these sheets into smaller GQDs. Bottom-up approaches use the pyrolysis and polymerization of small organic molecules. For example hexa-peri-hexabenzocoronene has been pyrolysed, oxidized, functionalized and reduced to form disk-like GQDs that are 60 nm in diameter with a thickness of 2-3 nm. Other starting materials have also been employed, including citric acid, glutathione, L-glutamic acid and pyrene. The ruthenium catalysed cage opening of $C_{60}$ produces GQDs, the shape of which is tailored by controlling the annealing temperatures. The list of potential applications for GQDs includes catalysis, bio-imaging (e.g. membrane markers), optoelectronics (LEDs), printing, photodetectors, quantum computing and energy conversion devices.

A need however remains for 'bottom-up' methods to enhance the availability of graphene nanomaterials. It is an object of the invention to address this problem and/or another problem associated with the prior art.

STATEMENTS OF THE INVENTION

According to one aspect of the invention there is provided a process for preparing a graphene nanomaterial product, the process comprising: cavitating a liquid medium comprising a diaromatic component to synthesise graphene nanomaterial from the diaromatic component and form a dispersion of the graphene nanomaterial in the liquid medium, and obtaining a graphene nanomaterial product from the dispersion.

Cavitation can occur in liquids when they are subjected to rapid changes in pressure that cause the formation of vapour bubbles. These bubbles form in low-pressure regions and collapse when subjected to higher pressure, with the implosion generating extremely high localised temperatures and pressures. It has been found that when diaromatic compounds undergo cavitation (e.g. induced with ultrasound) the conditions produce nanomaterial having one or more graphene layers. Bubbles are small (hundreds of microns) and collapse very quickly (micro seconds), generating high temperatures (thousands of K). This allows for the formation or synthesis of the nanomaterial, dispersed in the liquid medium. A nanomaterial product can be obtained from this dispersion.

The graphene nanomaterial product comprises or consists of graphene nanomaterial from the dispersion. In particular, the graphene nanomaterial product comprises or consists of graphene nanomaterial synthesised from the diaromatic component. In addition to graphene nanomaterial, the graphene nanomaterial product may optionally comprise other materials stemming from the process or starting materials.

Suitably, the graphene nanomaterial product comprises at least 10 ppm, at least 50 ppm, at least 100 ppm, at least 0.1% w/w, at least 1% w/w, at least 10% w/w, at least 40% w/w, at least 60% w/w, at least 80% w/w, at least 90% w/w, or at least 95% w/w graphene nanomaterial synthesised from the diaromatic component, based on the total weight of the graphene nanomaterial product.

The term "graphene nanomaterial" is used herein to refer to a plurality of particles each comprising or consisting of one or more graphene layers and sized, in at least one dimension, in the range of from the thickness of a single graphene layer to about 100 nm. Such particles are referred to herein as "graphene nanomaterial particles". Graphene nanomaterial particles as defined herein comprise at least 30 carbon atoms, suitably at least 100 carbon atoms.

The term "graphene layer" is used herein to refer to a single-atom-thick sheet of hexagonally arranged $sp^2$-bonded carbon atoms, either occurring within a multi-layer structure or by itself, optionally comprising impurities.

The graphene nanomaterial may comprise or consist of graphene nanomaterial particles each independently comprising or consisting of in the range of from 1 to 200 graphene layers, in particular 1 to 100 graphene layers, such as in the range of from 1 to 30 graphene layers, or even in the range of from 1 to 20 or in the range of from 1 to 10 graphene layers.

Suitably, the graphene nanomaterial may comprise or consist of graphene, bilayer graphene, few-layer graphene, multi-layer graphene, or combinations thereof.

The term "graphene" is used herein to refer to a graphene layer occurring by itself as a graphene nanomaterial particle, i.e. not forming an integral part of a multi-layer structure.

The term "bilayer graphene" is used herein to refer to a graphene nanomaterial particle consisting of two stacked graphene layers.

The term "trilayer graphene" is used herein to refer to a graphene nanomaterial particle consisting of three stacked graphene layers.

The term "few-layer graphene" is used herein to refer to a graphene nanomaterial particle consisting of 2 to 5 stacked graphene layers.

The term "multi-layer graphene" is used herein to refer to a graphene nanomaterial particle consisting of 2 to 10 stacked graphene layers.

The graphene nanomaterial particles may, for example, be a graphene quantum dots, graphene nanoflakes, graphene nanoribbons, graphene nanosheets, or combinations thereof.

The term "graphene quantum dots" is used herein to refer to graphene nanomaterial particles with a maximum dimension of less than 30 nm.

The term "graphene nanoflakes" is used herein to refer to graphene nanomaterial particles with a maximum dimension of less than 100 nm.

The term "graphene nanoribbons" is used herein to refer to ribbons of graphene or multi-layer graphene with a width of less than 50 nm and a length greater than the width.

The term "graphene nanosheet" is used herein to refer to graphene nanomaterial particles with a maximum dimension of less than 2000 nm, preferably less than 1000 nm.

Multi-layer graphene nanomaterial particles, i.e. those comprising a plurality of graphene layers, may display a crystalline order or may be turbostratic, i.e. lacking any observable registry of the graphene layers.

The graphene layers, one or more graphene nanomaterial particles, or indeed the graphene nanomaterial as a whole, may be pristine. The term "pristine" is used herein to describe graphene layers, nanomaterial particles or nanomaterials substantially free from impurities. Such materials may be achievable by substantially eliminating impurity sources from the process.

Alternatively, the graphene layers, one or more graphene nanomaterial particles, or indeed the graphene nanomaterial as a whole, may comprise one or more impurities. For example, the layers, particles or material as a whole may be oxidised.

Typical impurities are heteroatoms e.g. defined as O, S, N, and P. Sources for such impurities include air and the components of the liquid medium. The extent of the impurities may be defined by a C/heteroatom atomic ratio. Suitably, a graphene layer, graphene nanomaterial particle, or indeed the graphene nanomaterial as a whole, may have a C/heteroatom ratio of at least 2, in particular of at least 3, or even of at least 5 or 10. In some embodiments of the invention, the C/heteroatom atomic ratio is in the range of from 2 to 10. Pristine graphene layers or nanomaterial may, for example, have a C/heteroatom atomic ratio of at least 20, or even of at least 50 or of at least 100.

Partially oxidised graphene layers are particularly common and may lead to desirable properties in the graphene nanomaterial. Suitably, a graphene layer, graphene nanomaterial particle, or indeed the graphene nanomaterial as a whole, may have a C/O atomic ratio of at least 2, in particular of at least 3, or even of at least 5 or 10. In some embodiments of the invention, the C/0 atomic ratio is in the range of from 2 to 10. Pristine graphene layers or nanomaterial may, for example, have a C/O atomic ratio of at least 20.

Since, for some applications, impurities are desirable, the graphene layer, graphene nanomaterial particle, or indeed the graphene nanomaterial as a whole, may have a C/heteroatom ratio (and/or a C/O atomic ratio) of at most 20, in particular of at most 10, or even of at most 5.

The graphene nanomaterial may be functionalised or unfunctionalised. A functionalised graphene nanomaterial comprises a functional group covalently bonded to a graphene layer. Functional groups may conveniently bond with one or more heteroatom impurities of a graphene layer and may optionally be incorporated as part of the cavitation process.

The process presents a novel bottom-up and substrate free synthesis of optionally functionalised nanomaterial having one or more graphene layers by the cavitation of diaromatics. The synthesis offers potential for the fabrication of advantageous graphene nanomaterials all the way down to the dimensions of graphene quantum dots.

The process comprises cavitating a liquid medium comprising a diaromatic component consisting of one or more diaromatic hydrocarbons or diaromatic heterocycles.

Diaromatic hydrocarbons or heterocycles of use include fused diaromatic hydrocarbons or heterocycles, and linked (biphenyl-like) diaromatic hydrocarbons and heterocycles.

Advantageously, the diaromatic component may be a diaromatic hydrocarbon component consisting of one or more diaromatic hydrocarbons.

Suitable diaromatic hydrocarbons or heterocycles may optionally be substituted, for example with one or more alkyl, alkenyl or alkynyl substituents. Suitably, the one or more substituents may be $C_1$ to $C_5$ substituents, in particular methyl or ethyl. Substituents, for example a single methyl or ethyl substituent, may advantageously lead to a lower melting point, which facilitates incorporation of the diaromatic hydrocarbon or heterocycle into the liquid medium. However, as substituents can lower the rate of nanomaterial formation, a balance may advantageously be struck between the convenience of forming the liquid medium and reaction rates.

Suitable diaromatic hydrocarbons and heterocycles include compounds of Formula A or Formula B, or heterocyclic variants thereof, optionally substituted with one or more moieties at one or more of the numbered positions:

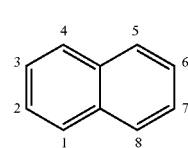

Formula A

Formula B

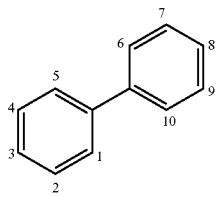

Suitable moieties include those that may be fractured or detached from their numbered position by thermally driven fission, in particular under conditions of cavitation.

Examples of suitable moieties include alkyl, alkenyl or alkynyl substituents, and halides. Suitably, a moiety may be present at one, two, three or four, or more than four of the numbered positions.

Suitably, an alkyl, alkenyl or alkynyl moiety may comprise 1 to 5 carbon atoms. Particular examples of such moieties include methyl and ethyl.

Suitably, a halide moiety may be selected from Cl, Br or F.

In various embodiments, the diaromatic component comprises or consists of one or more substituted or unsubstituted heterocyclic variants of Formula A or Formula B. In such heterocyclic variants N may replace C in the rings at one or more of the numbered positions. Optionally, the heterocyclic variant may comprise one or two replacements of C with N. One example of such a heterocyclic variant is quinoline.

In various embodiments, the diaromatic component comprises or consists of one or more substituted or unsubstituted compounds of Formula A.

In various embodiments, the diaromatic component comprises or consists of substituted or unsubstituted compounds of Formula B.

Examples of useful diaromatic hydrocarbons include naphthalene and alkyl substituted naphthalene, in particular methylnaphthalene, e.g. 1-methylnaphthalene, or mixtures thereof.

In some embodiments, the diaromatic component comprises in the range of from 1 to 40% v/v, in particular in the range of from 1 to 30% v/v based on the total volume of the component, of naphthalene, with the remainder of the component being made up by a substituted naphthalene having a lower melting point than naphthalene, e.g. methylnaphthalene, in particular 1-methylnaphthalene.

Suitably, the liquid medium may comprise a diaromatic component consisting of methylnaphthalene, such as 1-methylnaphthalene, and optionally naphthalene. In some embodiments, the diaromatic component consists (substantially) of methylnaphthalene, e.g. 1-methylnaphthalene.

Advantageously, the liquid medium may comprise at least 10% v/v, or at least 25% v/v of the diaromatic component, based on the total volume of the liquid medium before cavitation. In some embodiments, the liquid medium comprises at least 50% v/v of the diaromatic component, at least 75% v/v of the diaromatic component, or even at least 95% v/v of the diaromatic component. In various embodiments, the liquid medium consists of the diaromatic component.

Optionally, the liquid medium may comprise one or more other components making up a balance of the liquid medium before cavitation.

The inclusion of a stabilising component may be useful for stabilising the dispersion of graphene nanomaterial to be formed.

A suitable stabilising component may be chosen, for example, with reference to Hansen Solubility Parameters. For example, the stabilising component may comprise or consist of a solvent which, on addition to the liquid medium, is capable of reducing the distance in Hansen space between the predicted Hansen Solubility Parameters of the liquid medium (HSPs: $\delta_{Ds}$, $\delta_{Ps}$ and $\delta_{Hs}$) and of graphene, graphene oxide or reduced graphene oxide (HSPs: $\delta_{Dg}$, $\delta_{Pg}$ and $\delta_{Hg}$). In particular, the solvent may reduce R, where $R^2=4(\delta_{Dg}-\delta_{Ds})^2+(\delta_{Pg}-\delta_{Ps})^2+(\delta_{Hg}-\delta_{Hs})^2$.

Where a stabilising component or other component is included in the liquid medium prior to cavitation, the nature and amount of the component must be consistent with permitting the formation of graphene nanomaterial by cavitation of the liquid medium.

One example of a suitable stabilising component is N-Methyl-2-pyrrolidone (NMP), which has been found to stabilise the dispersion of the graphene nanomaterial in the liquid medium. NMP has been found to permit formation of graphene nanomaterial by cavitation of the liquid medium, even when present at high concentrations.

Suitably, the liquid medium may comprise in the range of from 1 to 90% v/v stabilising component, in particular NMP, such as in the range of from 10 to 75% v/v stabilising component, or even in the range of from 20 to 50% v/v stabilising component.

Suitably, the liquid medium may consist of the diaromatic component and a balancing amount of stabilising component, in particular NMP, and optionally a functionalising component.

To provide functionalised graphene nanomaterial, the liquid medium may advantageously comprise a functionalising component so that cavitating the liquid medium synthesises, from the diaromatic hydrocarbon component and functionalising component, a functionalised graphene nanomaterial dispersed in the liquid medium. A functionalised graphene nanomaterial product is then obtained from the dispersion.

The functionalising component may comprise or consist of molecules able to form covalent bonds with graphene layers, in particular heteroatom impurities thereof (e.g. oxygen).

Advantageously, the functionalising component may functionalise the graphene nanomaterial so as to aid dispersion of the graphene nanomaterial in the liquid medium. In particular, the functionalising component may be selected to enhance dispersion stability of the graphene nanomaterial in the liquid medium, e.g. by making the graphene nanomaterial more polar or less polar.

Suitably, the functionalising component may comprise or consist of one or more compounds capable of taking part in a nucleophilic substitution, electrophilic substitution, condensation reaction or addition reaction. Such compounds may be chosen to increase or decrease the polarity of the graphene nanomaterial, for example to facilitate its dispersion.

In various embodiments, the functionalising component comprises or consists of molecules comprising an amine group, in particular a primary amine group. Suitably, the functionalising component may comprise or consist of an alkylamine, in particular a primary alkylamine. The alkyl amine may, for example, have in the range of from 5 to 20 carbon atoms, e.g. in the range of from 6 to 12 carbon atoms.

In various embodiments, the functionalising component comprises or consists of molecules comprising a hydroxyl or peroxide group. Such molecules may advantageously comprise a terminal hydroxyl group. Suitably, the functionalising component may comprise or consist of water, hydrogen peroxide, an alcohol (primary, secondary or tertiary), or a mixture thereof.

In various embodiments, the functionalising component comprises or consists of molecules comprising a carboxylic acid group. Suitably, the functionalising component may comprise or consist of an organic acid.

Advantageously, to aid solubility with the diaromatic component in the liquid medium, the functionalising component may comprise or consist of aromatic molecules. Advantageously, the polarity of such a functionalising component may be tailored by substituents. For example, the aromatic molecules may be substituted with one or more polar or non-polar groups, for example alkyl, hydroxyl, or carboxylic acid.

In various embodiments, the functionalising component comprises or consists of one or more of: octylamine, dodecylamine, $H_2O$, HOOH, acetic acid, tri(ethylene glycol) monoethyl ether, aniline, benzoic acid, phenol and formic acid.

Optionally, the functionalising component may be present in an amount in the range of from 0.01 to 10% v/v based on the total volume of the liquid medium. Suitably, the functionalising component may be present in an amount in the range of from 0.05 to 5% v/v, or in the range of from 0.1 to 1% v/v.

The functionalising component may also comprise or consist of materials that are not miscible or soluble in diaromatic hydrocarbons. In an embodiment, the liquid medium comprises an emulsion of the functionalising component in the diaromatic component. Suitably, the emulsion may be kinetically and/or thermodynamically stable.

A heteroatom content, in particular oxygen content in the nanomaterial facilitates functionalisation. Accordingly, the process may advantageously comprise cavitating the liquid medium comprising a functionalising component in the presence of oxygen or another heteroatom impurity as herein defined, e.g. in the presence of air.

Conveniently, the process may comprise cavitating the liquid medium with air dissolved therein. Suitably, the liquid medium may comprise at least 1 mg/L air, such as at least 10 mg/L air or even at least 100 mg/L air, or even at least 200 mg/L air.

Advantageously, the liquid medium may have an initial boiling point in the range of from 180 to 300° C., in particular in the range of from 200 to 260° C.

Conveniently, the liquid medium may be substantially free from graphite and/or other exfoliation precursors of graphene nanomaterial.

In an embodiment, the process comprises treating the liquid medium, prior to cavitation, to reduce air or oxygen dissolved therein. This has been shown to increase the purity of the graphene nanomaterial, i.e. to reduce impurities in the graphene nanomaterial as a whole. Suitably, the process may comprise sparging the liquid medium with an inert gas, for example nitrogen, to reduce air or oxygen dissolved in the liquid medium. Additionally or alternatively the liquid medium may be subjected to one or more freeze-thaw cycles.

If desired, the liquid medium may be degassed by cavitation, for example immediately before or during the synthesis of the nanomaterial product.

Cavitation of the liquid medium to synthesise the nanomaterial product may conveniently comprise subjecting the liquid medium to ultrasound. Suitably, the liquid medium may be cavitated by subjecting it to ultrasound having a frequency in the range of from 20 kHz to 2 MHz, in particular in the range of from 20 kHz to 1 MHz, such as in the range of from 20 kHz to 100 kHz, or even in the range of from 20 to 50 kHz.

Other methods of cavitation are known in the art.

The amount of energy applied to achieve cavitation, or indeed the duration of cavitation, may suitably be chosen consistent with the desired amount of nanomaterial to be formed.

In some embodiments, the liquid medium is cavitated for at least 1 second, at least 30 seconds, or at least 1 minute, or at least 5 minutes.

To reduce impurities in the graphene nanomaterial, cavitation may advantageously be carried out under an inert atmosphere, e.g. under a nitrogen atmosphere.

Cavitation of the liquid medium forms a dispersion of graphene nanomaterial in the liquid medium. Particularly in a liquid medium consisting of diaromatic component, standing collisions induced by thermal mixing may result in agglomeration of graphene nanomaterial into larger turbostratic particles that are not nanomaterial particles.

The process may comprise a distinct functionalising step following formation of functionalised or unfunctionalised nanomaterial by cavitation.

In an embodiment, the process comprises: cavitating the liquid medium to synthesise graphene nanomaterial in the liquid medium, subsequently functionalising the graphene nanomaterial, and obtaining a graphene nanomaterial product comprising functionalised graphene nanomaterial.

The separate functionalising step may comprise cavitation of the nanomaterial in the presence of a functionalising component as described herein.

The process may advantageously comprise stabilising the dispersion and obtaining the graphene nanomaterial product from the stabilised dispersion.

Stabilising the dispersion reduces the tendency of the graphene nanomaterial to agglomerate and/or settle. Advantageously, stabilising the dispersion may comprise forming a colloid of the dispersed graphene nanomaterial in the liquid medium, such that particles of the dispersed graphene nanomaterial do not settle.

Suitably, the dispersion may be stabilised by the inclusion of a stabilising component in the liquid medium prior to cavitation, e.g. as aforesaid. Additionally or alternatively, the dispersion may be stabilised by the addition of a stabilising component during and/or after cavitation of the liquid medium.

Thus the process may comprise adding a stabilising component to the liquid medium before, during or after cavitation. The stabilising component may suitably comprise or consist of a solvent which, on addition to the liquid medium, is capable of reducing the distance in Hansen space between the predicted Hansen Solubility Parameters of the liquid medium (HSPs: $\delta_{Ds}$, $\delta_{Ps}$ and $\delta_{Hs}$) and of graphene, graphene oxide or reduced graphene oxide (HSPs: $\delta_{Dg}$, $\delta_{Pg}$ and $\delta_{Hg}$). In particular, the solvent may reduce R, where $R^2 = 4(\delta_{Dg} - \delta_{Ds})^2 + (\delta_{Pg} - \delta_{Ps})^2 + (\delta_{Hg} - \delta_{Hs})^2$.

Advantageously, the stabilising component may comprise or consist of NMP. However, other stabilising components may also be readily used.

The amount of stabilising component included or added may vary depending on stabilisation requirements. Suitably, the dispersion may comprise in the range of from 1 to 90% v/v stabilising component, in particular NMP, such as in the range of from 10 to 75% v/v stabilising component, or even in the range of from 20 to 50% v/v stabilising component.

Where the stabilising component is added to the dispersion after cavitation there is advantageously no need to consider whether the stabilising component would permit the formation of graphene nanomaterial by cavitation of the liquid medium.

The process involves obtaining a graphene nanomaterial product from the dispersion. This may be achieved in a variety of ways. The dispersion of graphene nanomaterial may constitute the graphene nanomaterial product, provided that it has been stabilised with a stabilising component. Alternatively, the graphene nanomaterial product may comprise a subset of the dispersion and be obtained by one or more separation steps.

A separation step may, for example, comprise separating at least part of the liquid medium from the graphene nanomaterial. Additionally or alternatively, a separation step may comprise separating at least a proportion of non-nanomaterial particles from the graphene nanomaterial, i.e. particles having a minimum diameter in excess of 100 nm. Separation may be achieved by any suitable means, including for example washing, filtering, centrifuging or combinations thereof. In an embodiment, separation comprises filtering graphene nanomaterial from the liquid medium with a suitable filter.

As aforesaid, at least part of the graphene nanomaterial in the dispersion may agglomerate into larger turbostratic particles comprising graphene layers. Such particles may settle out of the dispersion. In an embodiment, such particles are separated from the dispersion to provide a purified dispersion constituting the graphene nanomaterial product.

However, the nanomaterial product may also be obtained by allowing the graphene nanomaterial in the dispersion to agglomerate and settle out of the dispersion to form turbostratic particles, re-dispersing graphene nanomaterial from the turbostratic particles to form a re-dispersion, and obtaining the graphene nanomaterial product from the re-dispersion.

The re-dispersion of graphene nanomaterial may constitute the graphene nanomaterial product, provided that it has been stabilised with a stabilising component. Alternatively, the graphene nanomaterial product may comprise a subset of the re-dispersion and be obtained by one or more separation steps, e.g. as aforesaid.

Re-dispersing graphene nanomaterial may comprise exposing the turbostratic particles to a re-dispersion liquid comprising a stabilising component and optionally agitating the particles, for example by shaking, sonication or shear mixing. Conveniently, the re-dispersion liquid may comprise or consist of NMP or another stabilising component as defined herein.

Once obtained, the graphene nanomaterial product may be further processed or purified, for example to increase the concentration of any desired graphene nanomaterial particles contained therein, e.g. graphene, bilayer graphene, few-layer graphene, multi-layer graphene, graphene quantum dots, graphene nanoflakes, graphene nanosheets, graphene nanoribbons, or combinations thereof.

It will be appreciated from the foregoing that embodiments of the process provide an array of options for obtaining the graphene nanomaterial product. By way of non-limiting example:

In some embodiments, the process comprises: cavitating a liquid medium comprising a diaromatic component, e.g. 1-methylnaphthalene, and a stabilising component, e.g. NMP, to form a dispersion of graphene nanomaterial in the liquid medium, said stabilised dispersion constituting the graphene nanomaterial product.

In some embodiments, the process comprises: cavitating a liquid medium comprising a diaromatic component, e.g. 1-methylnaphthalene, to form a dispersion of graphene nanomaterial in the liquid medium, and adding a stabilising component, e.g. NMP, to the dispersion to form a stabilised dispersion, said stabilised dispersion constituting the graphene nanomaterial product.

In some embodiments, the process comprises: cavitating a liquid medium comprising a diaromatic component, e.g. 1-methylnaphthalene, to form a dispersion of graphene nanomaterial in the liquid medium, allowing the graphene nanomaterial in the dispersion to agglomerate and settle out of the dispersion to form turbostratic particles, and re-dispersing graphene nanomaterial from the turbostratic particles, e.g. using NMP, to form a re-dispersion, said re-dispersion constituting the graphene nanomaterial product.

In some embodiments, the process comprises: cavitating a liquid medium comprising a diaromatic component, e.g. 1-methylnaphthalene, and optionally a stabilising component, e.g. NMP, to form a dispersion of graphene nanomaterial in the liquid medium, and separating the graphene nanomaterial from the liquid medium to obtain the graphene nanomaterial product.

In some embodiments, the process comprises: cavitating a liquid medium comprising a diaromatic component, e.g. 1-methylnaphthalene, and optionally a stabilising component, e.g. NMP, to form a dispersion of graphene nanomaterial in the liquid medium, and separating the graphene nanomaterial from the liquid medium to obtain the graphene nanomaterial product.

Of course a functionalising component may also be included in each of these embodiments to obtain functionalised graphene nanomaterial.

From another aspect, the invention provides a graphene nanomaterial product obtainable or obtained by any process according to the invention.

From yet another aspect, the invention provides a graphene nanomaterial product comprising a graphene nanomaterial dispersed in a liquid medium comprising a diaromatic component and a stabilising component.

The graphene nanomaterial, liquid medium, diaromatic component and stabilising component may be as described in respect of other aspects of the invention.

In some embodiments, the graphene nanomaterial product comprises a graphene nanomaterial dispersed in a liquid medium comprising 1-methylnaphthalene and NMP.

Throughout the description and claims of this specification, the words "comprise" and "contain" and variations of the words, for example "comprising" and "comprises", mean "including but not limited to", and do not exclude other moieties, additives, components, integers or steps. Moreover the singular encompasses the plural unless the context otherwise requires: in particular, where the indefinite article is used, the specification is to be understood as contemplating plurality as well as singularity, unless the context requires otherwise.

Preferred features of each aspect of the invention may be as described in connection with any of the other aspects. Other features of the invention will become apparent from the following examples. Generally speaking the invention extends to any novel one, or any novel combination, of the features disclosed in this specification (including any accompanying claims and drawings). Thus features, integers, characteristics, compounds, chemical moieties or groups described in conjunction with a particular aspect, embodiment or example of the invention are to be understood to be applicable to any other aspect, embodiment or example described herein unless incompatible therewith.

Moreover unless stated otherwise, any feature disclosed herein may be replaced by an alternative feature serving the same or a similar purpose.

Where upper and lower limits are quoted for a property, then a range of values defined by a combination of any of the upper limits with any of the lower limits may also be implied.

In this specification, references to compound properties are—unless stated otherwise—to properties measured under ambient conditions, i.e. at atmospheric pressure and at a temperature of from 16 to 22 or 25° C., or from 18 to 22 or 25° C., for example about 20° C. or about 25° C.

DETAILED DESCRIPTION

Figure 1:
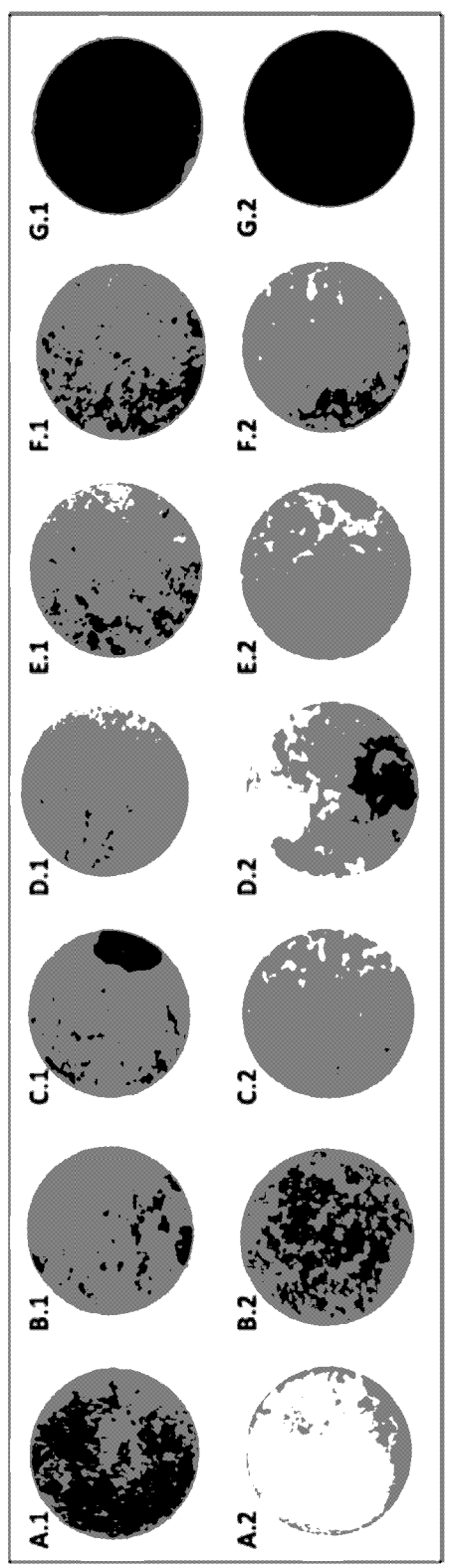
FIG. 1 shows photographs of the first (A.1-G1) and second (A.2-G.2) sediments after filtration of the samples in Example 1.

The present invention will now be further described with reference to the following non-limiting examples and the accompanying drawings.

Experimental Methods

In a typical experiment 50 mL of a liquid medium was sonicated, during which a darkening occurred due to the formation of a dispersion of particles in the liquid medium.

Sonication

Sonication was carried out with a VCX 750 (750 W) ultra-sonic processor (ex Sonics Materials Inc.) and a 13 mm extender horn, which delivered ultrasound to a 50 mL sample of hydrocarbon contained within a jacketed glass beaker. Cold water (10° C.) was passed through the jacket to keep the liquid hydrocarbon below its flash point. A PTFE lid was used to prevent splashing whilst compressed air or nitrogen was blown over the surface of the hydrocarbon to inhibit condensation inside the reaction vessel. The whole apparatus was housed inside a box to reduce acoustic noise.

Ultrasound was produced at a frequency of 20 kHz and when the amplitude of the processor was set to 65% the delivery of power to the ultrasound probe was 72 W. The probe is made of titanium alloy (Ti 6Al-4V) and consists of 90% titanium, 6% aluminium and 4% vanadium. This material is susceptible to cavitation erosion and becomes tarnished during use. The probe was polished on silicon carbide papers (P400 and P1000) between each experiment to maintain a smooth and shiny tip surface.

Chemicals

Ex Acros Organics: Activated charcoal (SA 2 decolounsing).

Ex Alfa Aesar: Biphenyl (99% purity); 1-Methylnaphthalene (96% purity), N-Methyl-2-pyrrolidone (HPLC grade); Naphthalene (99+% purity).

Ex Sigma Aldrich: Aniline (≥99.5% purity); Benzoic acid (99.5% purity); Dodecylamine (98% purity); Formic acid (95% purity); Hydrogen peroxide solution (30 wt %);

1-Methylnaphthalene (≥95% purity); Octylamine (99% purity); Phenol (≥99% purity); Quinoline (≥97% purity), Toluene (anhydrous, 99.8% purity); Tri(ethylene glycol) monoethyl ether (technical grade).

Ex VWR Chemicals: Acetic acid glacial; n-Heptane (HiPerSolv chromanorm for HPLC, filtered at 0.2 µm).

Abbreviations

A, Absorbance; l, length; 1-MN, 1-methylnaphthalene; NMP, N-methyl-2-pyrrolidone; NAP, naphthalene; N, particle number density.

UV-Vis Spectrophotometry

UV-vis spectrophotometry was carried out using a UV-1699PC VWR Spectrophotometer (VWR International, Radnor, Pa.).

Laser Particle Counter

Particle analysis was carried out using a Spectrex LPC-2200 laser particle counter (Spectrex Corporation, Redwood City, Calif.), which makes measurements based on the principle of near-angle light scattering. A revolving laser beam is passed through the walls of a glass container; any particles present in the sample cause the beam to scatter. The extent of scattering is proportional to the number and size of the particles, which are reliably counted in the 1-100 µm size range. Samples were gently swirled before being left to stand to allow any air bubbles to settle. Number density counts were based on an average of ten consecutive measurements.

When the number concentration (N) is higher than 1000 cm$^{-3}$ there is a risk of overlap between particles in the third dimension (i.e. closer to or further from the detector), which may lead to two or more small particles being counted as a single large particle. Sample dilution with chromatography grade n-heptane, which has a low background particle count (<20 cm$^{-3}$), prevents this artefact from occurring.

1-MN and NMP were pre-filtered (1.0 µm PTFE Acrodisc membrane ex Sigma Aldrich) before irradiation with ultrasound. The background count for all solvents was <50 cm$^{-3}$.

Transmission Electron Microscopy (TEM)

Dispersions were filtered onto a holey carbon film 300 mesh copper TEM grid. Imaging was performed in transmission mode using a JEOL 2100 TEM (JEOL Ltd, Tokyo) at 200 kV or 160 kV beam voltage.

X-Ray Photoelectron Spectroscopy (XPS)

XPS was carried out using a purpose-built ultra-high vacuum system equipped with a Specs PHOIBOS 150 electron energy analyser and Specs FOCUS 500 monochromated Al Kα X-ray source (Specs GmbH, Berlin, Germany). Samples were prepared for analysis by filtering dispersions through unsupported alumina membranes with a 0.2 µm pore size followed by washing with iso-propanol. The filters were cut to size (>~10 mm×10 mm) and attached to standard Ni XPS sample holders using conducting double-sided vacuum-compatible adhesive pads. Survey and narrow scans were acquired over the binding energy range between 0 and 1100 eV using a pass energy of 50 eV and high resolution scans were made over individual photoelectron lines using a pass energy of 15 eV. Data processing and curve fitting were carried out using CasaXPS software v2.3.16, with quantification carried out using Scofield cross-sections corrected for the energy dependence of the analyser transmission and the effective electron attenuation lengths.

Raman Spectroscopy

Renishaw InVia Raman Microscope (Renishaw plc., Wolton-upon-Edge, UK) with a 532 nm laser and 2400 l/mm (vis) grating.

Example 1—Gravimetric Analysis (Samples A-G)

For each of samples A to G set out in Table 1 below, 50 mL of liquid medium consisting of a diaromatic component was sonicated to a pre-set level of energy measured with the in-built meter on the ultrasonic processor. Darkening occurred due to the formation of a dispersion of black particles. The colloid was not stable and flocculation followed by sedimentation was visible after 1-2 days.

Gravimetric analysis of the sediment material was achieved by standing a sample for ca. 1-2 weeks before centrifugation (3500 rmin$^{-1}$ for 20 minutes) and filtering (0.7 µm Whatman glass microfiber filter, Grade GF/F). The sediment was washed with n-heptane to remove residual high boiling hydrocarbons.

The filtrate mixture of 1-MN (and NAP where included) and n-heptane was left to stand, during which time a second, brown sediment formed. Filtering, washing and weighing in the same manner as the first sediment was performed for gravimetric analysis.

FIG. 1 shows the first (A.1-G1) and second (A.2-G.2) sediment after filtration. Both sediments increased as a function of exposure time to ultrasound. The black sediment (A.1-G.1) was always produced in a higher yield than the brown sediment (A.2-G.2), which showed a darkened colour with increasing mass.

Figure 2:
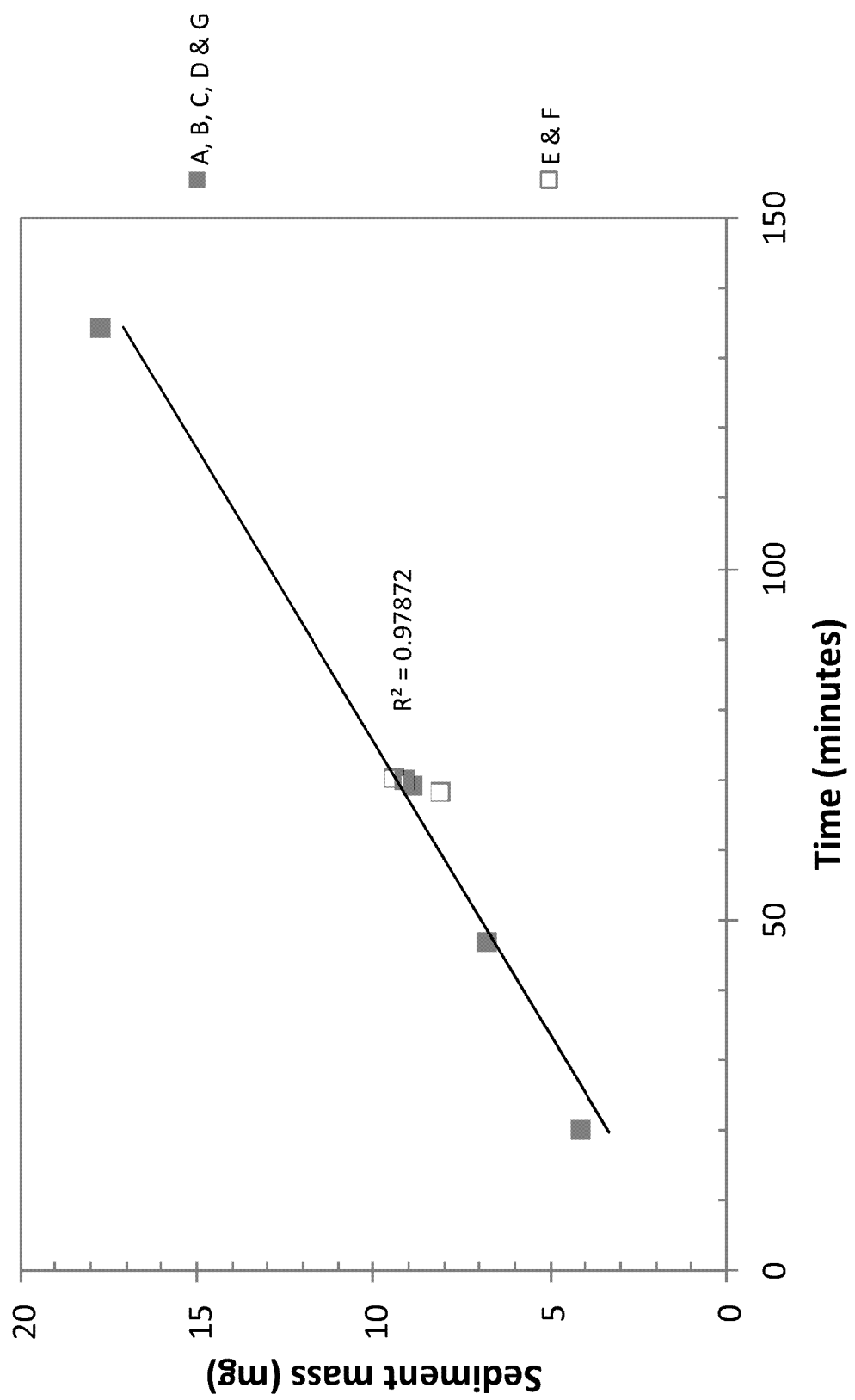
FIG. 2 is a chart of sediment mass against time with samples of Example 1 plotted thereon.

Calorimetric measurements were used to determine that the transfer of ultrasonic power to the sonochemical reaction was 39 W at a transfer efficiency of 53%. The power intensity of the 13 mm extender probe (diameter 1.27 cm) was therefore 30 Wcm$^{-2}$, which is sufficient to produce transient cavitation bubbles. FIG. 2 shows that total sediment mass increased linearly with the level of ultrasound energy (power×time) applied.

For samples E and F, white crystals of NAP were dissolved in 1-MN up to a volume fraction of 0.2: at higher levels complete solubility becomes an issue unless special measures are taken to aid dissolution. Introduction of the non-alkylated diaromatic (NAP) did not have a significant impact on the level of sediment that was produced (Table 1 and FIG. 2).

TABLE 1

Sedimentation experiments.

| Sample i.d. | Liquid medium $\phi_{1\text{-}MN}{:}\phi_{NAP}$ | Energy$^a$ (kJ) | First Sediment | | Second Sediment | |
|---|---|---|---|---|---|---|
| | | | Standing time (days) | Mass (mg) | Standing time (days) | Mass (mg) |
| A | 1.0:0.0 | 86 | 52 | 2.9 | 23 | 1.2 |
| B | 1.0:0.0 | 200 | 14 | 4.8 | 9 | 2.0 |
| C | 1.0:0.0 | 300 | 13 | 7.7 | 9 | 1.2 |
| D | 1.0:0.0 | 300 | 14 | 7.0 | 8 | 2.1 |
| E | 0.9:0.1 | 300 | 14 | 7.5 | 8 | 1.9 |
| F | 0.8:0.2 | 300 | 7 | 6.2 | 10 | 1.9 |
| G | 1.0:0.0 | 600 | 7 | 12.4 | 10 | 5.4 |

$^a$measured on the in-built meter of the ultrasonic processor

Example 2—Colloid Stabilisation (Samples H-J)

Figure 3:
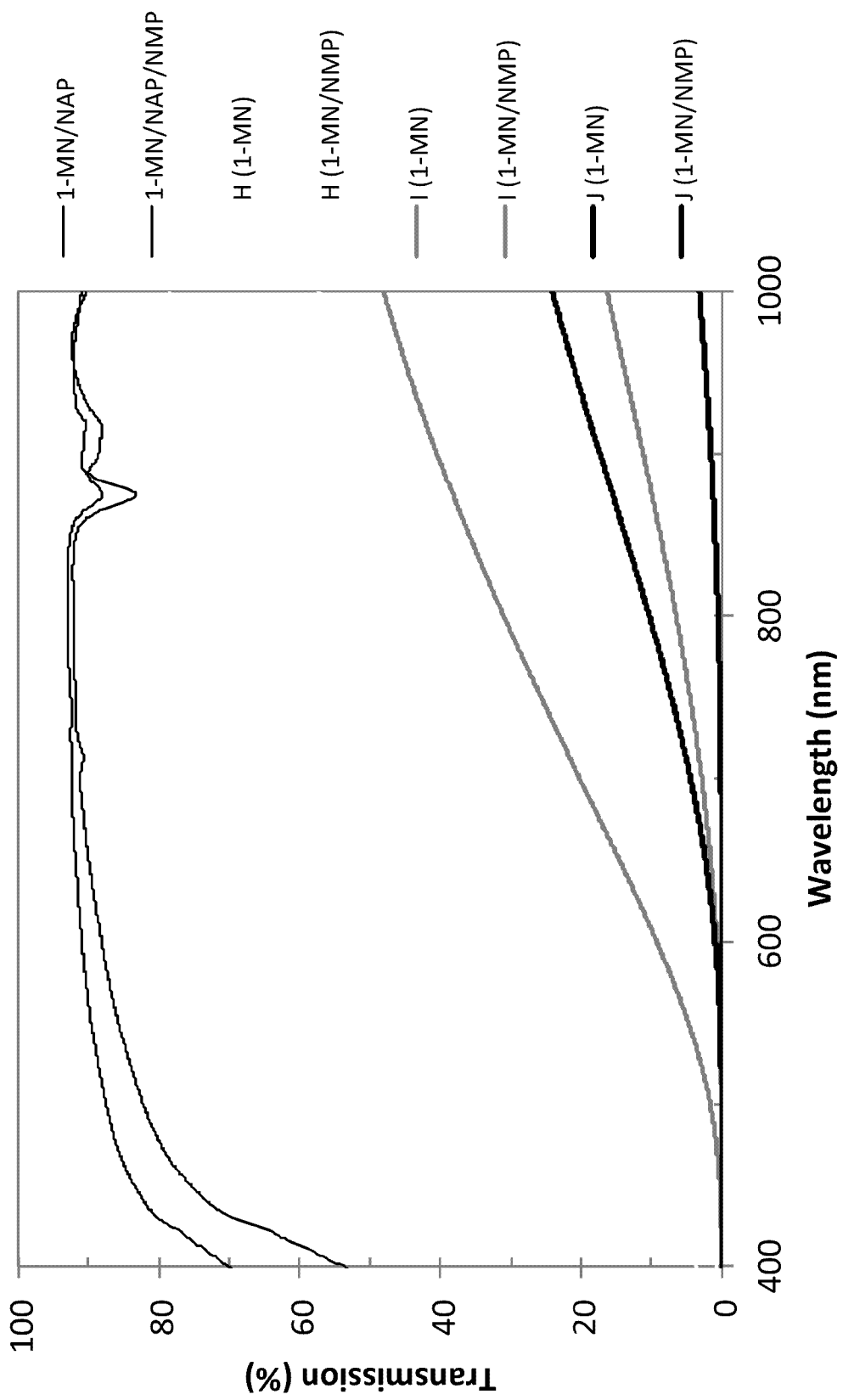
FIG. 3 shows transmission spectra of diaromatic components before and after treatment with ultrasound in the samples of Example 2.

The sonication of diaromatic hydrocarbons (samples H to J detailed in Table 2 below) produced dispersions that showed an absorbance across all wavelengths of visible light. FIG. 3 shows transmission spectra of diaromatic components before and after treatment with ultrasound.

The diaromatic hydrocarbons used as starting materials are relatively transparent in the 400-1000 nm range. In FIG. 3, 1-MN/NAP represents a diaromatic hydrocarbon component with $\phi_{1\text{-}MN}=0.8$, $\phi_{NAP}=0.2$ by volume. 1-MN/NAP/NMP represents a diaromatic hydrocarbon component with $\phi_{1\text{-}MN}=0.4$, $\phi_{NAP}=0.1$, $\phi_{NMP}=0.5$ by volume.

In FIG. 3, H, I and J are as set out in Table 2 below. Absorbance at 660 nm was used as an indicator of nanosheet concentration (see also Table 2).[1]

After sonication, each sample ($H_{1-MN}$, $I_{1-MN}$ and $J_{1-MN}$) had a high count of ≥1 μm particles ($N>1\times10^6$ cm$^{-3}$), which increased with ultrasound exposure time. The irradiated samples were split in two (2×25 mL). NMP was added to one of each of the sub-samples (ϕ=1:1) and the resulting mixtures ($H_{1-MN/NMP}$, $I_{1-MN/NMP}$ and $J_{1-MN/NMP}$) treated with ultrasound for a further 10 minutes. This decreased N (0.2-0.3×10$^6$ cm$^{-3}$) as the ≥1 μm particles were reduced to a size below the detection limit of the counter (<1 μm). These dispersions were stable and did not undergo flocculation or sedimentation.

Figure 4:
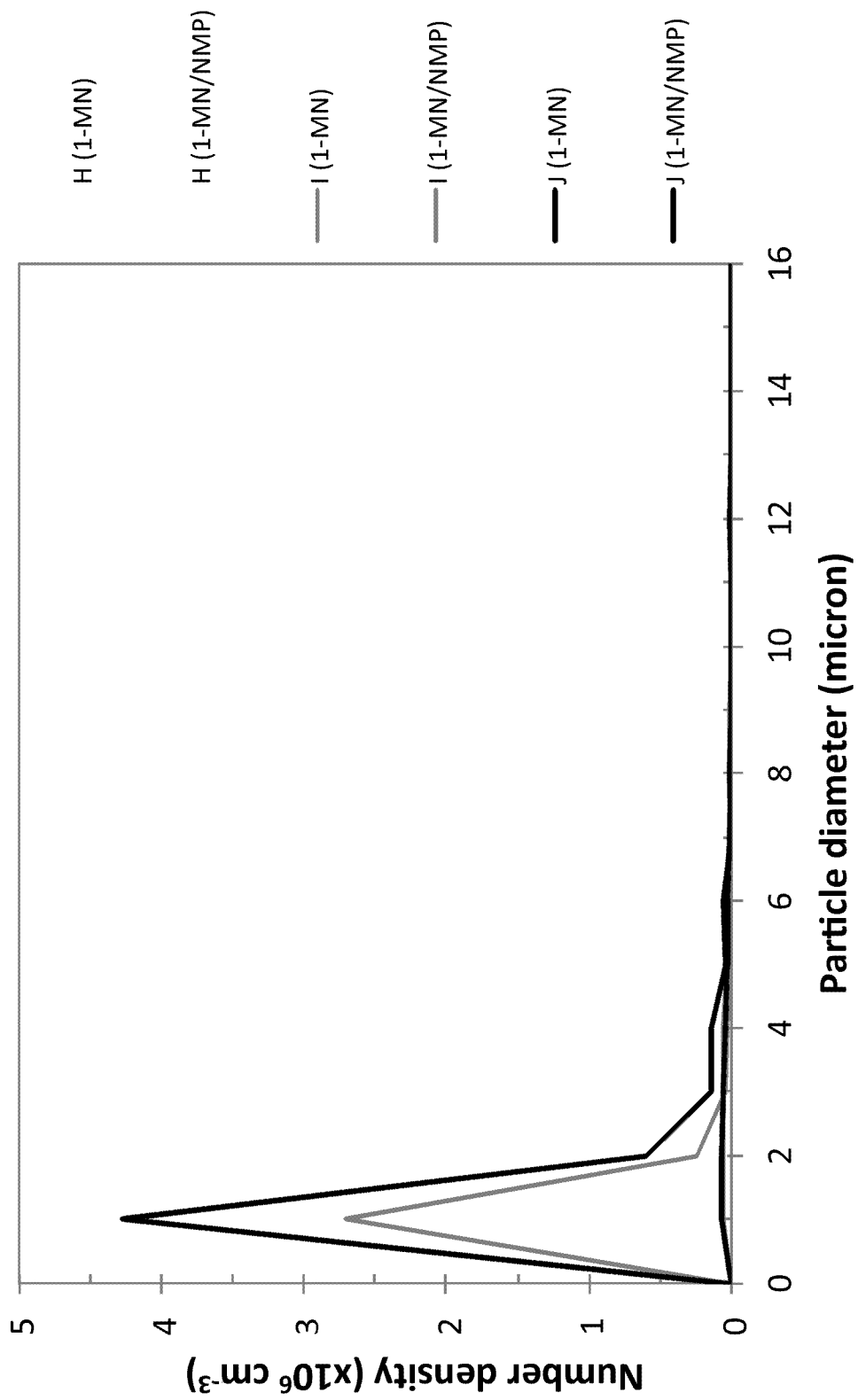
FIG. 4 is a chart showing particle number density of sonicated diaromatic mixtures, before ($H_{1-MN}$, $I_{1-MN}$ & $J_{1-MN}$) and after ($H_{1-MN/NMP}$, $I_{1-MN/NMP}$ & $J_{1-MN/NMP}$) addition of NMP in the samples of Example 2.
Figure 5:
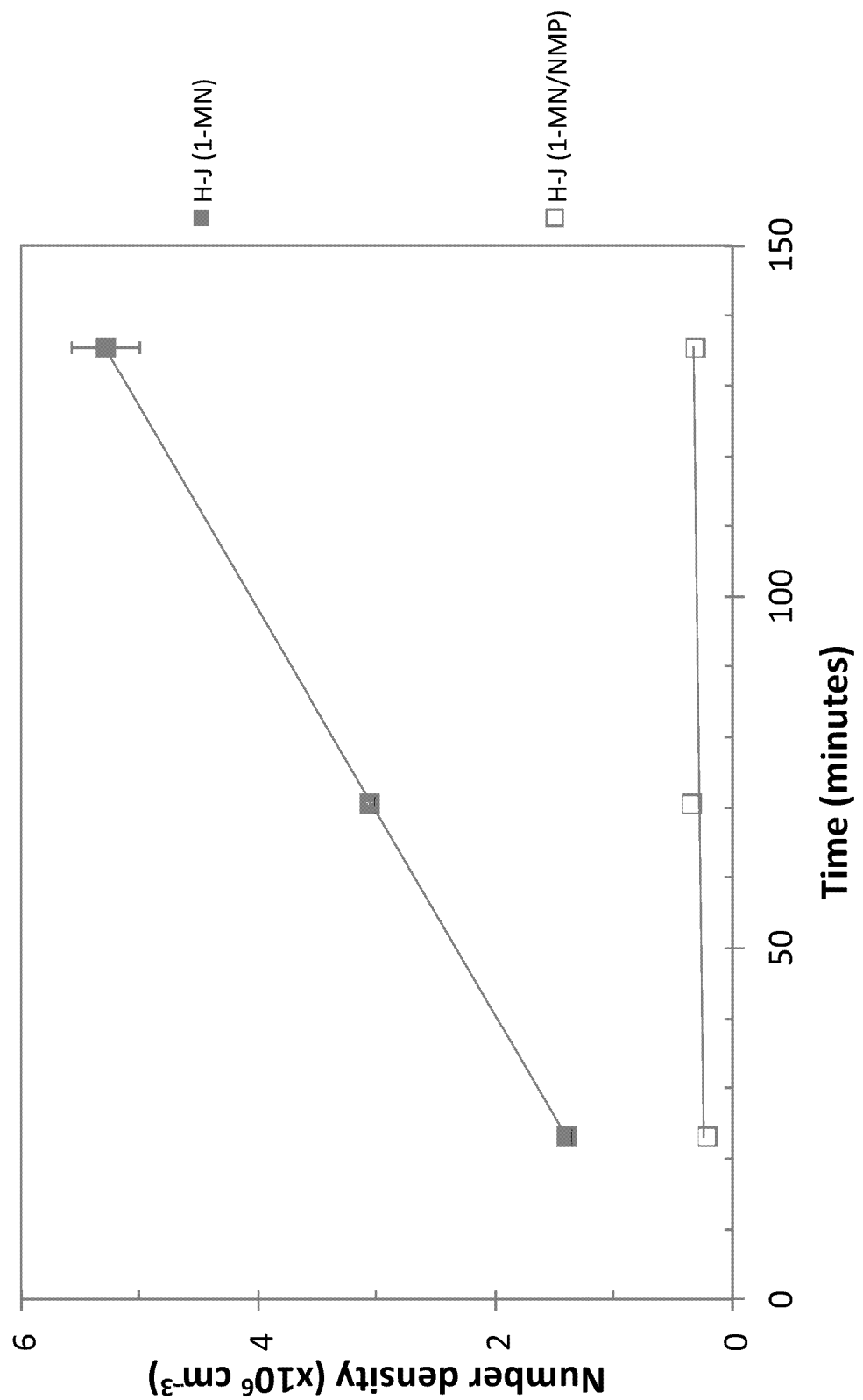
FIG. 5 is a chart showing the change in particle number density as a function of ultrasound exposure time in the samples of Example 2.

FIG. 4 shows particle number density of sonicated diaromatic mixtures, before ($H_{1-MN}$, $I_{1-MN}$ & $J_{1-MN}$) and after ($H_{1-MN/NMP}$, $I_{1-MN/NMP}$ & $J_{1-MN/NMP}$) addition of NMP. FIG. 5 shows the change in particle number density as a function of ultrasound exposure time.

Figure 6:
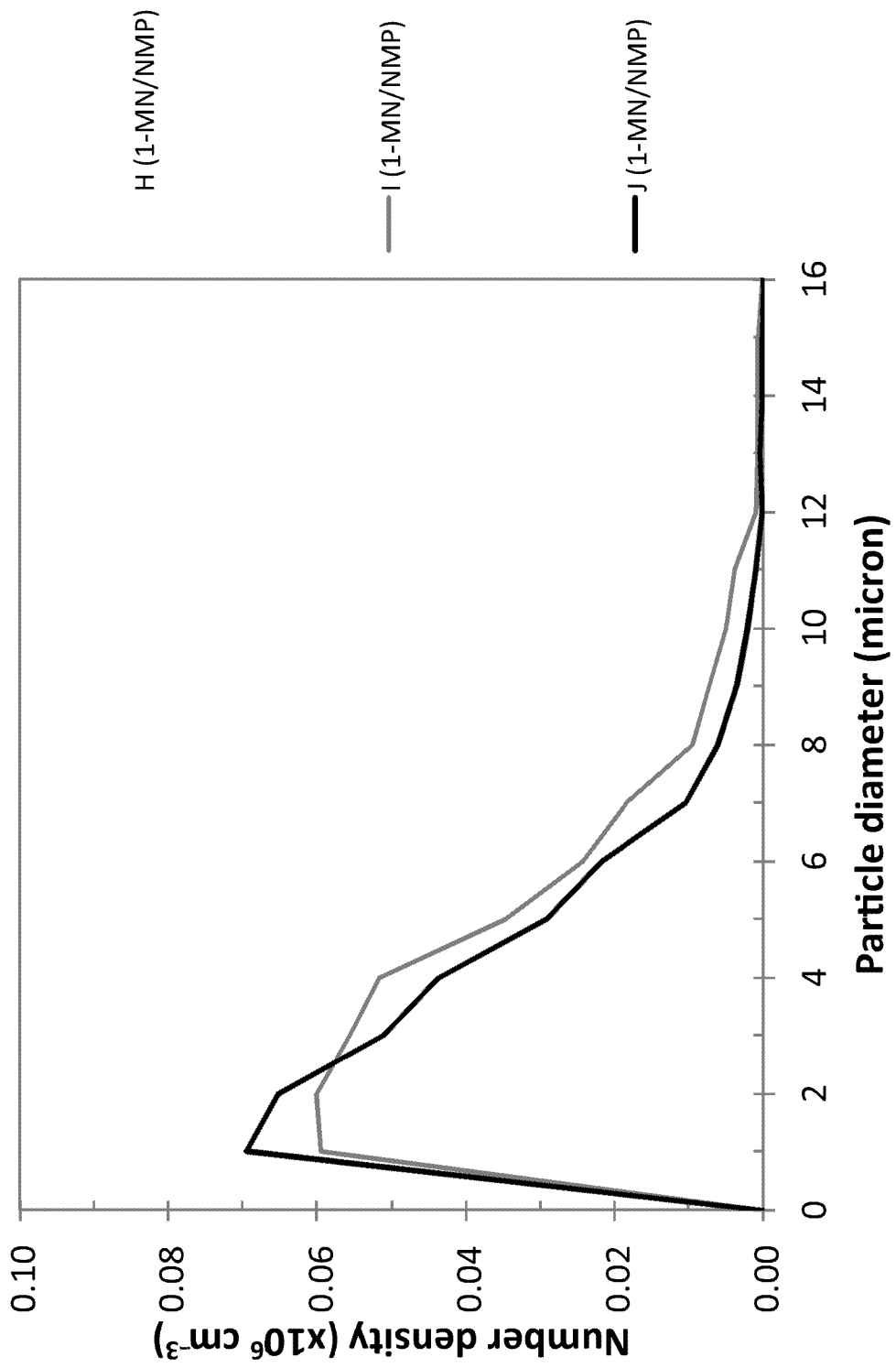
FIG. 6 is a chart showing the size distribution of aggregate particles remaining in stabilised colloids in the samples of Example 2.

The measurable particles remaining in the stabilised dispersions had diameters of 1-12 μm. FIG. 6 shows the size distribution of aggregate particles remaining in stabilised colloids.

TABLE 2

Summary of colloid stabilisation experiments.

| Sample id. | Liquid medium $\phi_{1-MN}:\phi_{NAP}$ | Energy[a] (kJ) | NMP added post-sonication | Absorbance/length (m$^{-1}$) | N (×10$^6$ cm$^{-3}$) | Sedimentation after standing |
|---|---|---|---|---|---|---|
| $H_{1-MN}$ | 0.9:0.1 | 100 | No | 55 | 1.39 | Yes |
| $H_{1-MN/NMP}$ | | | Yes | 28 | 0.21 | No |
| $I_{1-MN}$ | 0.8:0.2 | 300 | No | 173 | 3.06 | Yes |
| $I_{1-MN/NMP}$ | | | Yes | 81 | 0.33 | No |
| $J_{1-MN}$ | 0.8:0.2 | 600 | No | 325 | 5.28 | Yes |
| $J_{1-MN/NMP}$ | | | Yes | 156 | 0.30 | No |

[a]measured on the in-built meter of the ultrasonic processor

Extending sonication times beyond 10 minutes or centrifugation at 1500 rmin$^{-1}$ did not remove this aggregate material (Table 3).

TABLE 3

Impact of sonication and centrifugation on the aggregate particle number density of sample $J_{1-MN/NMP}$.

| Ultrasound @ 20 kHz (min) | Centrifugation @ 1500 r min$^{-1}$ (min) | N (×10$^6$ cm$^{-3}$) |
|---|---|---|
| 10 | 0 | 0.30 ± 0.03 |
| 20 | 0 | 0.30 ± 0.04 |
| 30 | 0 | 0.29 ± 0.04 |
| 10 | 20 | 0.30 ± 0.03 |
| 10 | 80 | 0.28 ± 0.04 |

Filtration of the colloids through different grades of Whatman glass microfiber filters produced some reduction in particle count but with relatively low filter efficiencies: 2% with GF/D (pore size 2.7 μm), 30% with GF/A (pore size 1.6 μm) and 36% with GF/F (pore size 0.7 μm).

Example 3—Sedimentation (Samples H-J)

Figure 7:
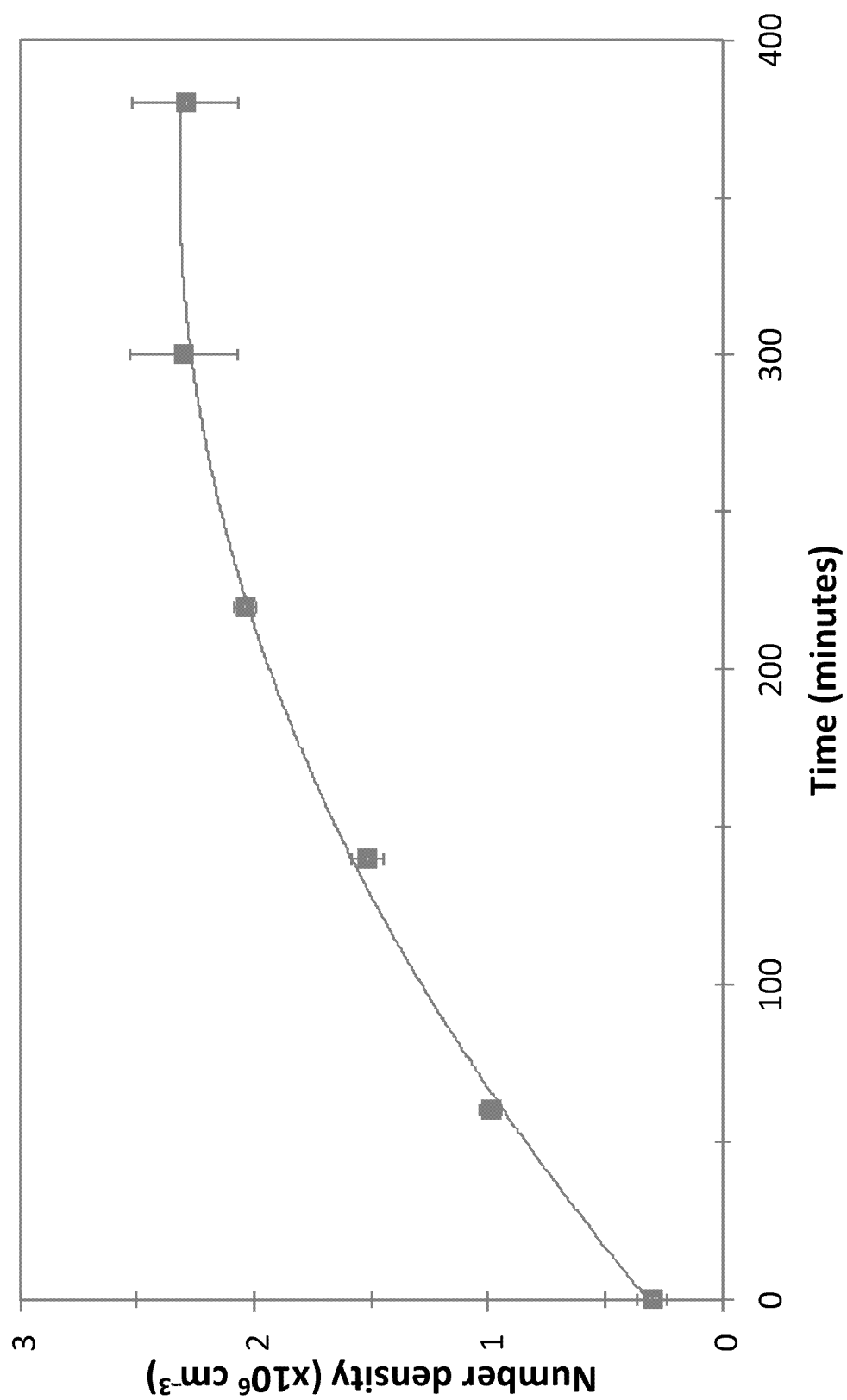
FIG. 7 is a chart showing the increase of ≥μm particles due to thermally driven collisions of sub-micron particles in a sonicated sample of Example 3.
Figure 8:
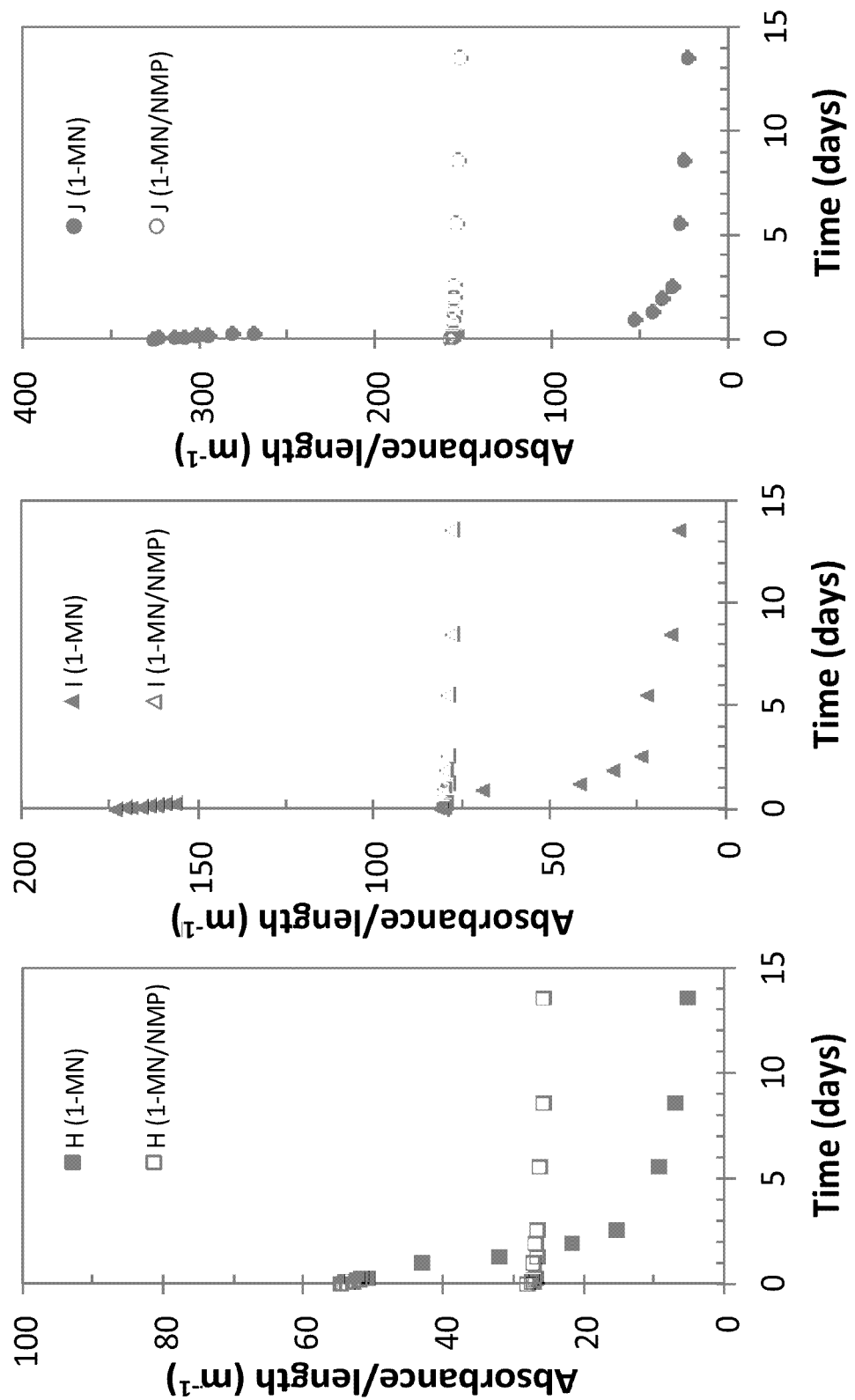
FIG. 8 is a chart showing the absorbance at 660 nm of samples H-J in Example 3 during 14 days of standing.

The particle number density in a freshly sonicated (300 kJ) sample of 1-MN was initially relatively low (N=0.3×10$^6$ cm$^{-3}$), however upon standing thermally driven collisions took place between small particles (<1 μm) leading to an increase in the count of ≥1 μm particles. FIG. 7 shows the increase of ≥1 μm particles due to thermally driven collisions of sub-micron particles in the sonicated sample. An upper limit to particle number density was established over a period of ca. 6 hours (FIG. 7). N=2.35×10$^6$ cm$^{-3}$ after 10 days. Samples H-J were shaken before pipetting into UV-Vis quartz cuvettes and measuring the absorbance at 660 nm over 14 days. FIG. 8 shows the absorbance at 660 nm of samples H-J during 14 days of standing.

Figure 9:
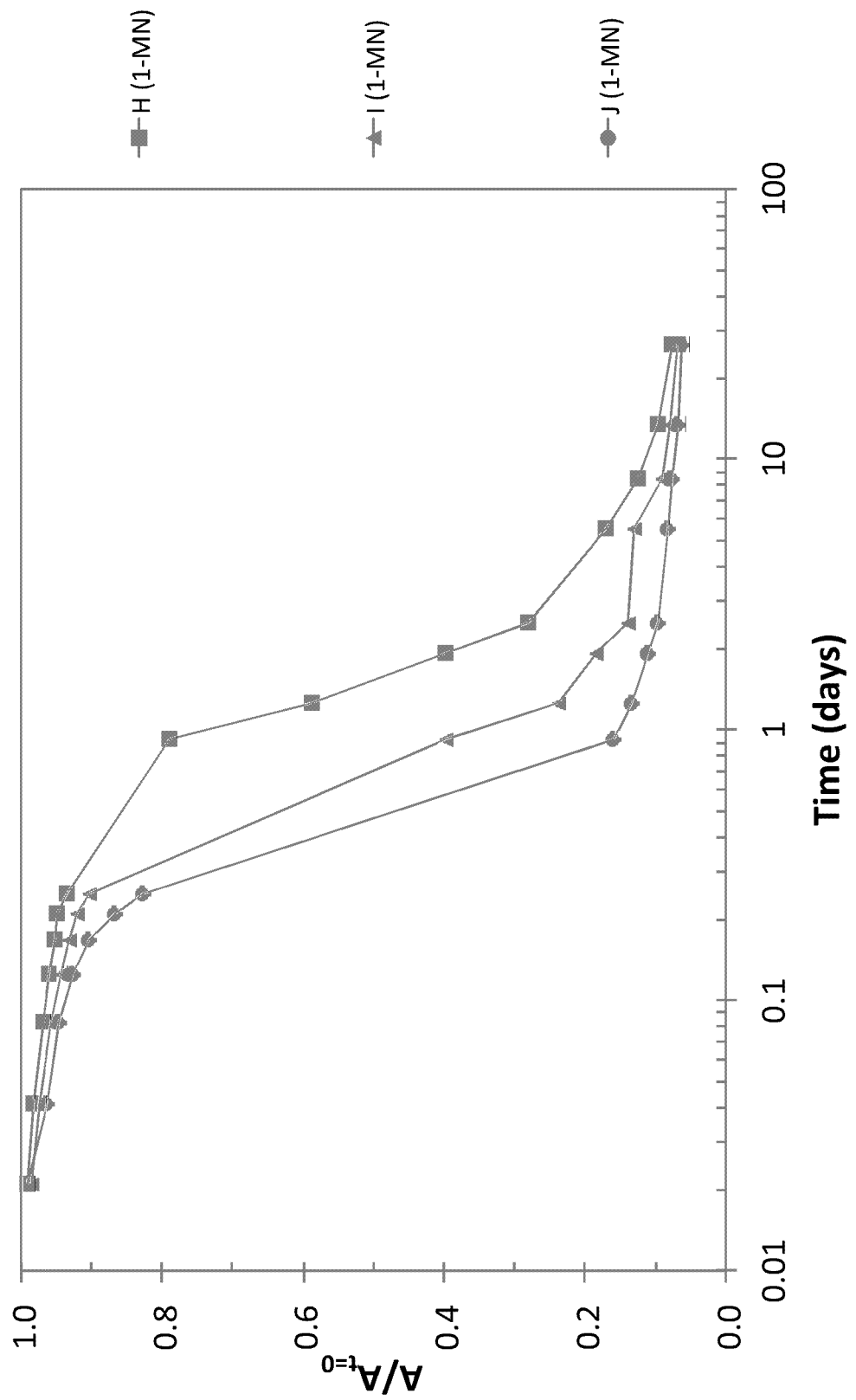
FIG. 9 is a chart showing the increase in the rate of sedimentation in samples H-J of Example 3 during the first 2 days of standing.

Each of the unstabilised dispersions ($H_{1-MN}$, $I_{1-MN}$ & $J_{1-MN}$) showed a drop in absorbance as flocculation followed by sedimentation occurred. The rate of change in absorbance increased as a function of the initial concentration of material present in the dispersion. There is also evidence that the rate of this process increased during the first two days of standing. FIG. 9 shows the increase in the rate of sedimentation during the first 2 days of standing. This is consistent with the growth of small particles by perikinetic agglomeration followed by flocculation, leading to even faster rates of sedimentation. In contrast, the absorbance at 660 nm of each of the stabilized dispersions ($H_{1-MN/NMP}$, $I_{1-MN/NMP}$ & $J_{1-MN/NMP}$) remained relatively stable over the 14 days (FIG. 8).

Example 4—Rate of Particle Formation (Samples K-T)

1-MN (ex Alfa Aesar) contains heteroatom species (typically ca 0.6 wt. % sulfur), which are responsible for at least some of the yellow colouration of the hydrocarbon. Some purification was achieved by adding activated charcoal (20 g) to 1-MN (200 mL) and stirring for 7 hours. Sonication of mixtures K-O (Table 4) was performed whilst samples were taken at 100 kJ intervals to measure the change in absorbance with time.

Figure 10:
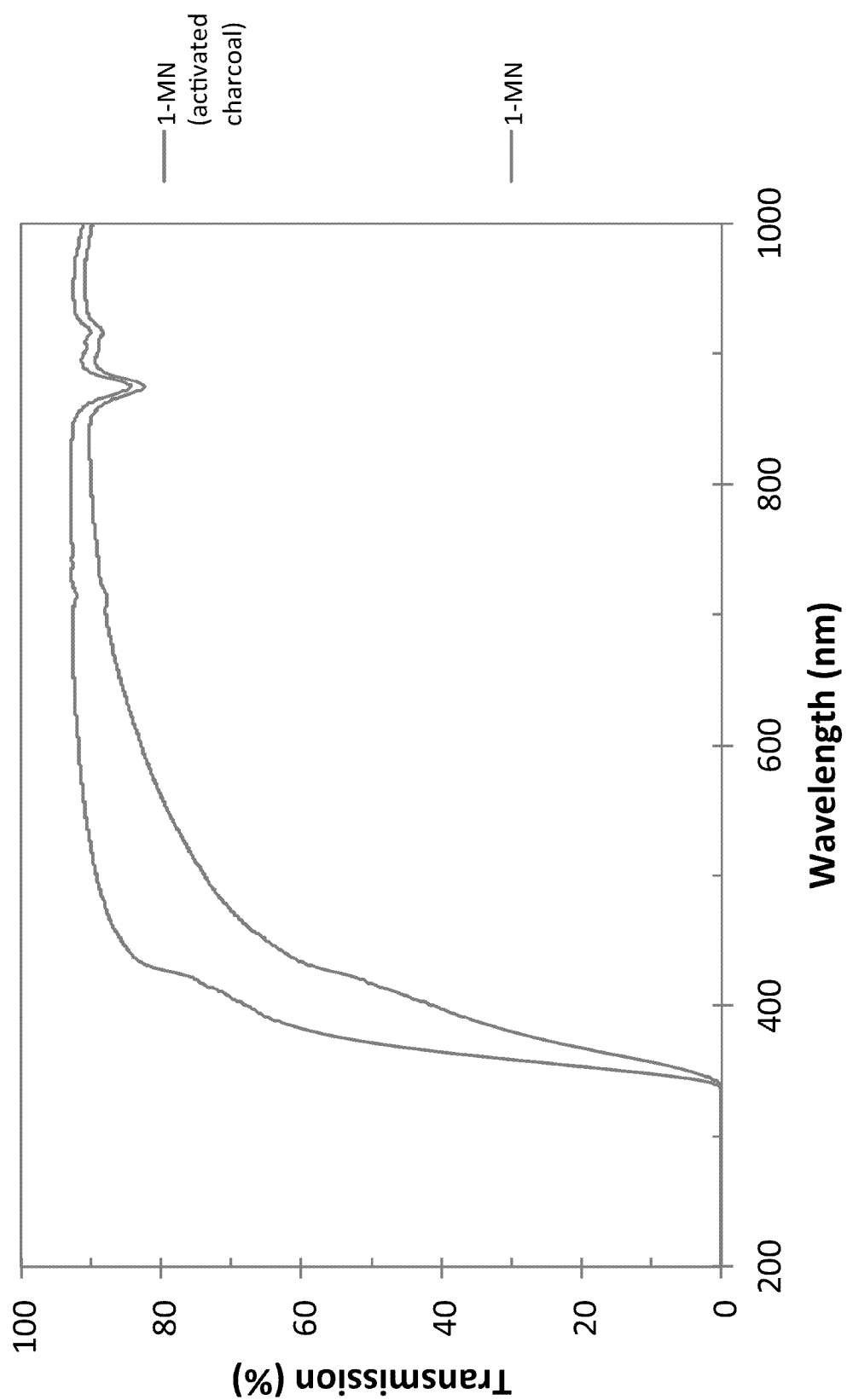
FIG. 10 is a chart showing the UV-visible spectra of 1-MN before and after treatment with activated charcoal.
Figure 11:
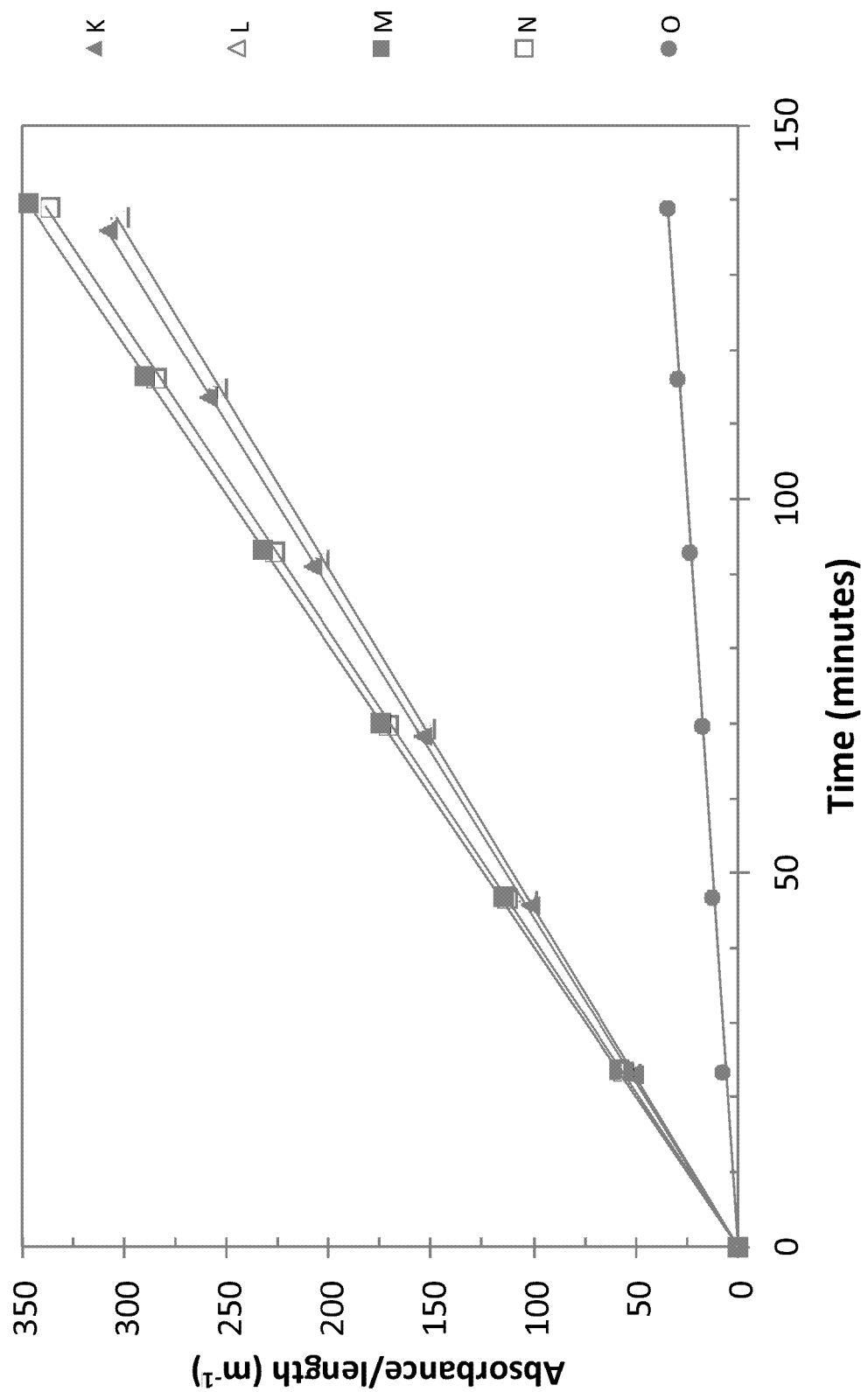
FIG. 11 is a chart showing the rate of formation of particles (absorbance×length$^{-1}$×time$^{-1}$) in samples K-O of Example 4 as monitored by absorbance of 660 nm light.

FIG. 10 shows the UV-visible spectra of 1-MN before and after treatment with activated charcoal. FIG. 11 shows the rate of formation of particles (absorbance×length$^{-1}$×time$^{-1}$) as monitored by absorbance of 660 nm light.

The formation rate decreased slightly (2-3%) after 1-MN was treated with activated charcoal (K v. L and M v. N). The addition of NAP produced a 9-10% (K v. M and L v. N) increase in formation rate. The introduction of NMP during sonication resulted in a stable colloid with a low particle number density (N=0.14×10$^6$ cm$^{-3}$) and a rate of formation that was reduced by a factor of ten (O v. M).

TABLE 4

Experiments to assess rates of formation.

| Sample i.d. | Liquid medium $\phi_{1-MN}:\phi_{NAP}:\phi_{NMP}$ | Energy[a] (kJ) | 1-MN pre-treated with activated C | A l$^{-1}$ t$^{-1}$ (m$^{-1}$ min$^{-1}$) | Sedimentation after standing |
|---|---|---|---|---|---|
| K | 1.0:0.0:0.0 | 600 | No | 2.27 | Yes |
| L | 1.0:0.0:0.0 | 600 | Yes | 2.21 | Yes |
| M | 0.8:0.2:0.0 | 600 | No | 2.49 | Yes |

TABLE 4-continued

Experiments to assess rates of formation.

| Sample i.d. | Liquid medium $\phi_{1\text{-}MN}:\phi_{NAP}:\phi_{NMP}$ | Energy[a] (kJ) | 1-MN pre-treated with activated C | A $l^{-1}$ $t^{-1}$ (m$^{-1}$ min$^{-1}$) | Sedimentation after standing |
|---|---|---|---|---|---|
| N | 0.8:0.2:0.0 | 600 | Yes | 2.43 | Yes |
| O | 0.4:0.1:0.5 | 600 | No | 0.25 | No |

[a]measured on the in-built meter of the ultrasonic processor

Figure 12:
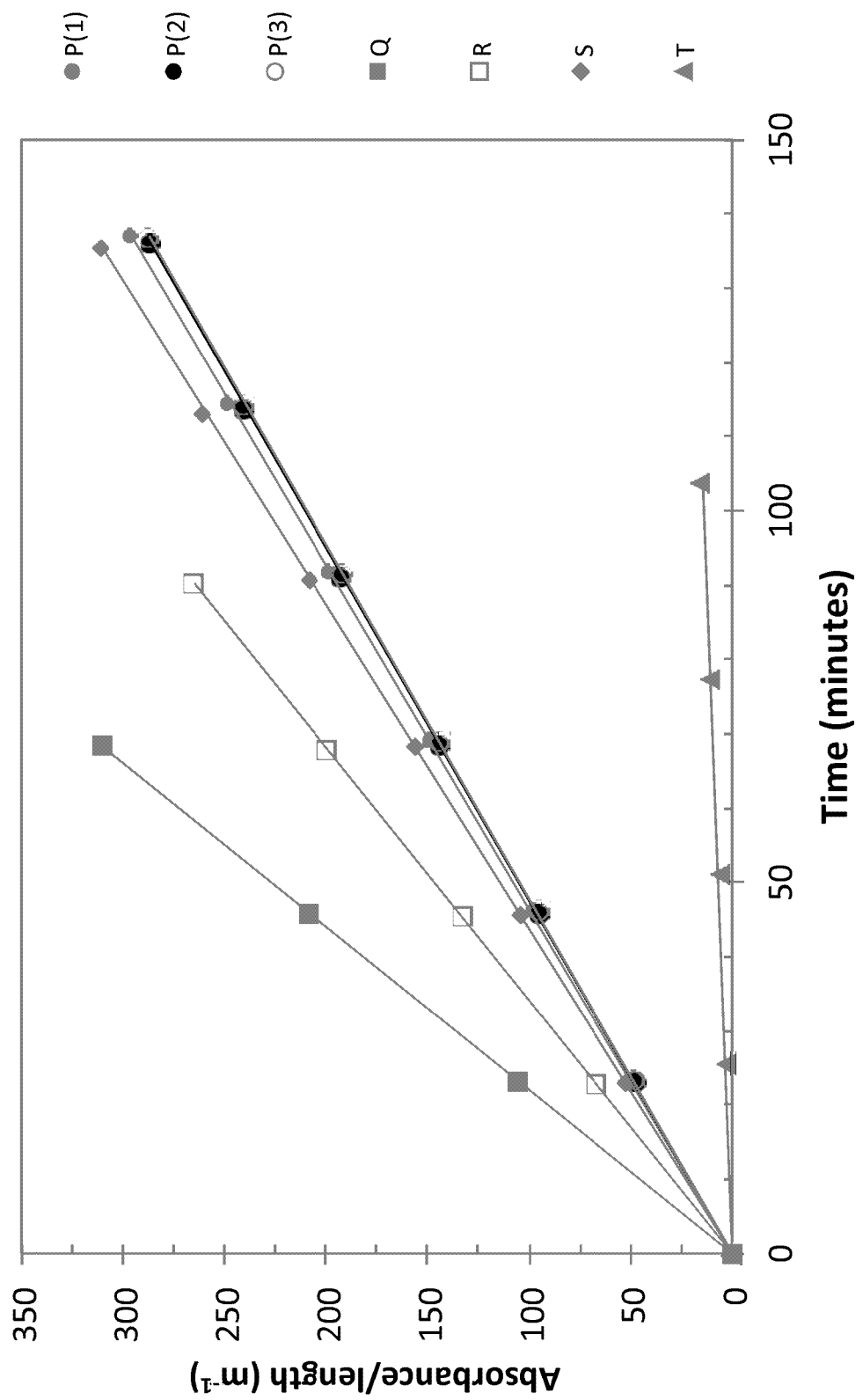
FIG. 12 is a chart showing the rate of formation of particles (absorbance×length$^{-1}$×time$^{-1}$) in samples P-T of Example 4 as monitored by 660 nm light.

The variation in the rate of formation of particles from three different batches of 1-MN (ex Alfa Aesar) is given in Table 5. White crystals of biphenyl can be dissolved in 1-MN up to a volume fraction of 0.35. FIG. 12 shows that this results in an 8% increase in the formation rate. Combining quinoline (a liquid nitrogen-containing diaromatic) with 1-MN at a volume fraction of 0.5 produces an even greater (38%) increase in formation rate. The cavitation of neat quinoline has a reaction rate over twice that of the rate of particle formation of 1-MN. Data in FIG. 12 and Table 5 also show that when toluene (a mono aromatic) is cavitated a very low rate of reaction is observed.

TABLE 5

Further experiments to assess rates of formation.

| Sample i.d. | Liquid medium | Energy[a] (kJ) | A $l^{-1}t^{-1}$ (m$^{-1}$ min$^{-1}$) |
|---|---|---|---|
| P(1) | 1-MN (batch 1) | 600 | 2.16 |
| P(2) | 1-MN (batch 2) | 600 | 2.10 |
| P(3) | 1-MN (batch 3) | 600 | 2.09 |
| Q | Quinoline | 300 | 4.54 |
| R | 1-MN & Quinoline ($\phi_{1\text{-}MN}:\phi_{Quinoline} = 0.5:0.5$) | 400 | 2.93 |
| S | 1-MN & Biphenyl ($\phi_{1\text{-}MN}:\phi_{Biphenyl} = 0.65:0.35$) | 600 | 2.29 |
| T | Toluene | 400 | 0.14 |

[a]measured on the in-built meter of the ultrasonic processor

Example 5—Impact of Nitrogen Sparging (Samples U-W)

The conditions used to produce sample N ($\phi_{1\text{-}MN}=0.8$, $\phi_{NAP}=0.2$) were also employed for a sample U, with the exception that nitrogen gas was bubbled into the hydrocarbon through a fine needle for 10 minutes before commencing sonication. The ultrasound treatment (600 kJ) was then carried out under a flowing atmosphere of nitrogen. Sample U was left to stand without addition of NMP and after a week no visible flocculation or sedimentation had occurred. The number density of ≥1 μm particles was lower (N=1.22× 10$^6$ cm$^{-3}$) than previously observed for samples exposed to ultrasound for the same length of time (5.28×10$^6$ cm$^{-3}$, Table 3). Centrifugation at 3500 r min$^{-1}$ for 60 minutes resulted in a small amount of black sediment (U.1=1.5 mg). The supernatant remained as a stable colloid until n-heptane (50 mL) was added, which produced sedimentation of black material (U.2=10.7 mg).

Sonication of 1-MN (300 kJ) was also conducted whilst continuously bubbling gas (air or N$_2$) into the hydrocarbon during irradiation with ultrasound (V and W). Sedimentation after sonication was observed when air was bubbled; this black material was collected by centrifugation and filtration (V.1=6.2 mg). The addition of n-heptane to the supernatant produced brown sediment (V.2=3.0 mg).

Figure 13:
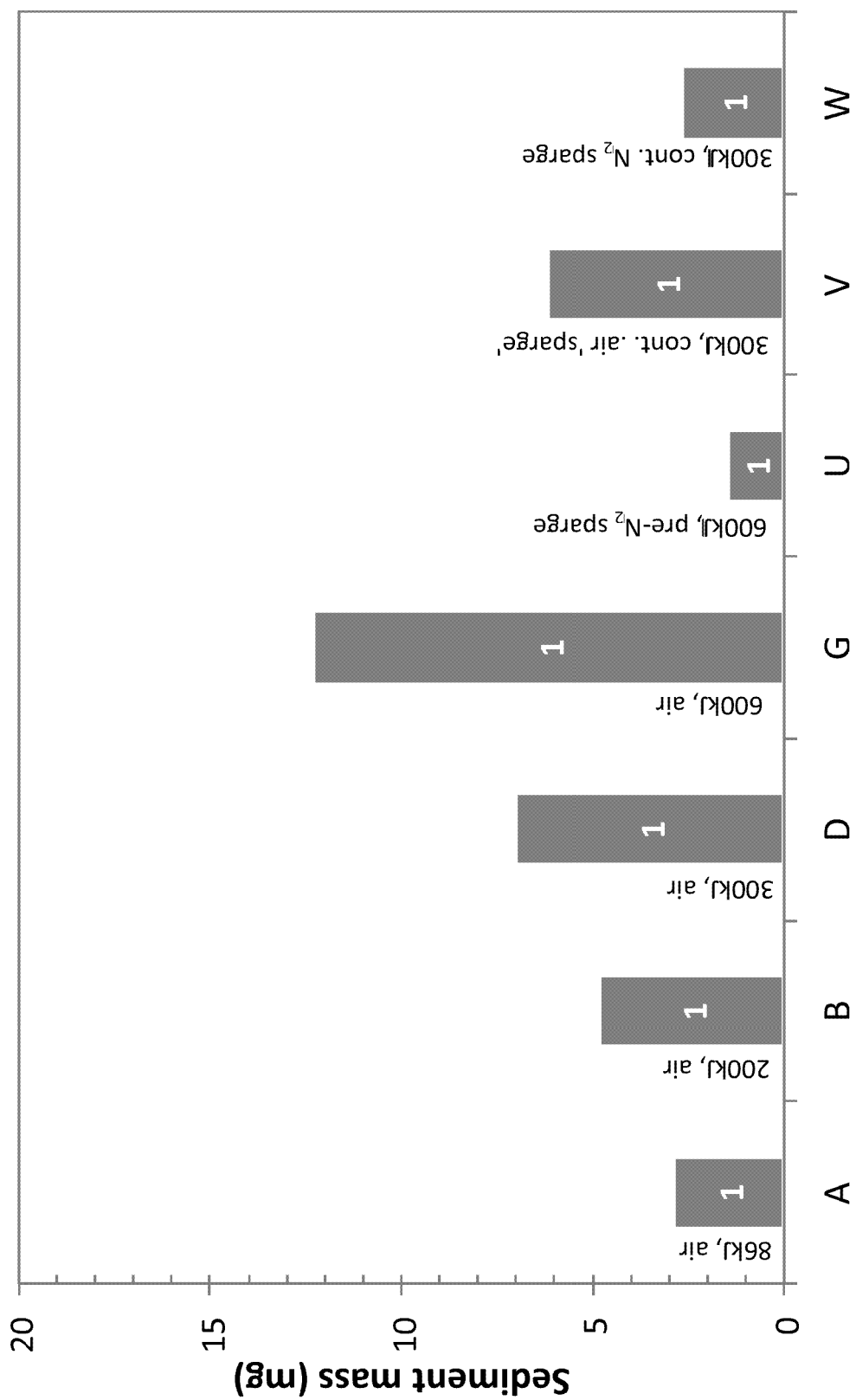
FIG. 13 is a chart showing the change in sedimentation mass when employing a pre-treatment or continuous $N_2$ or air sparge in the samples of Example 5.

When N$_2$ was continuously bubbled sedimentation did not occur, although some black material was isolated by centrifugation (W.1=2.7 mg). Addition of n-heptane produced black sediment (W.2=2.4 mg). These results are summarized in FIG. 13. This shows the change in sedimentation mass when employing a pre-treatment or continuous N$_2$ or air sparge (U.1, V.1 and W.1—first stage sediment after sonication, U.2, V.2 and W.2—second stage sediment after n-heptane addition).

Example 6—Characterisation of Material Formed During Cavitation (Samples X-Z)

Samples X, Y and Z from the cavitation of 1-MN/NAP ($\phi_{1\text{-}MN}=0.8$, $\phi_{NAP}=0.2$) were prepared for analysis by TEM, XPS and Raman spectroscopy as detailed in Table 6. The dispersions produced under air (X and Y) were not stable and after standing for seven days underwent centrifugation at 3500 r min$^{-1}$ for 20 minutes. The brown supernatant (X.2$_{1\text{-}MN}$ and Y.2$_{1\text{-}MN}$) was removed by pipette and the remaining black sediment added to NMP (50 mL), followed by a short period (10 kJ) of sonication to produce a black dispersion (X.1$_{NMP}$ and Y.1$_{NMP}$). A third sample (Z) was prepared by bubbling N$_2$ through the hydrocarbon prior to sonication and then flowing N$_2$ to maintain an oxygen free atmosphere during irradiation. The resulting dispersion was combined with NMP ($\phi$=1:1) and a further 10 minutes of ultrasound applied under a N$_2$ atmosphere to obtain a stable dispersion.

TABLE 6

Summary of samples prepared for analysis.

| Sample i.d. | Liquid medium $\phi_{1\text{-}MN}:\phi_{NAP}$ | Energy[a] (kJ) | 1-MN pre-treated with act. C | Air or N$_2$ | Sedimentation after standing | Samples for TEM, XPS & Raman |
|---|---|---|---|---|---|---|
| X | 0.8:0.2 | 600 | Yes | Air | Yes | X.1$_{NMP}$ X.2$_{1\text{-}MN}$ |
| Y | 0.8:0.2 | 300 | Yes | Air | Yes | Y.1$_{NMP}$ Y.2$_{1\text{-}MN}$ |
| Z | 0.8:0.2 | 600 | Yes | N2 | No | Z$_{1\text{-}MN/NMP}$ |

[a]measured on the in-built meter of the ultrasonic processor

Figure 14:
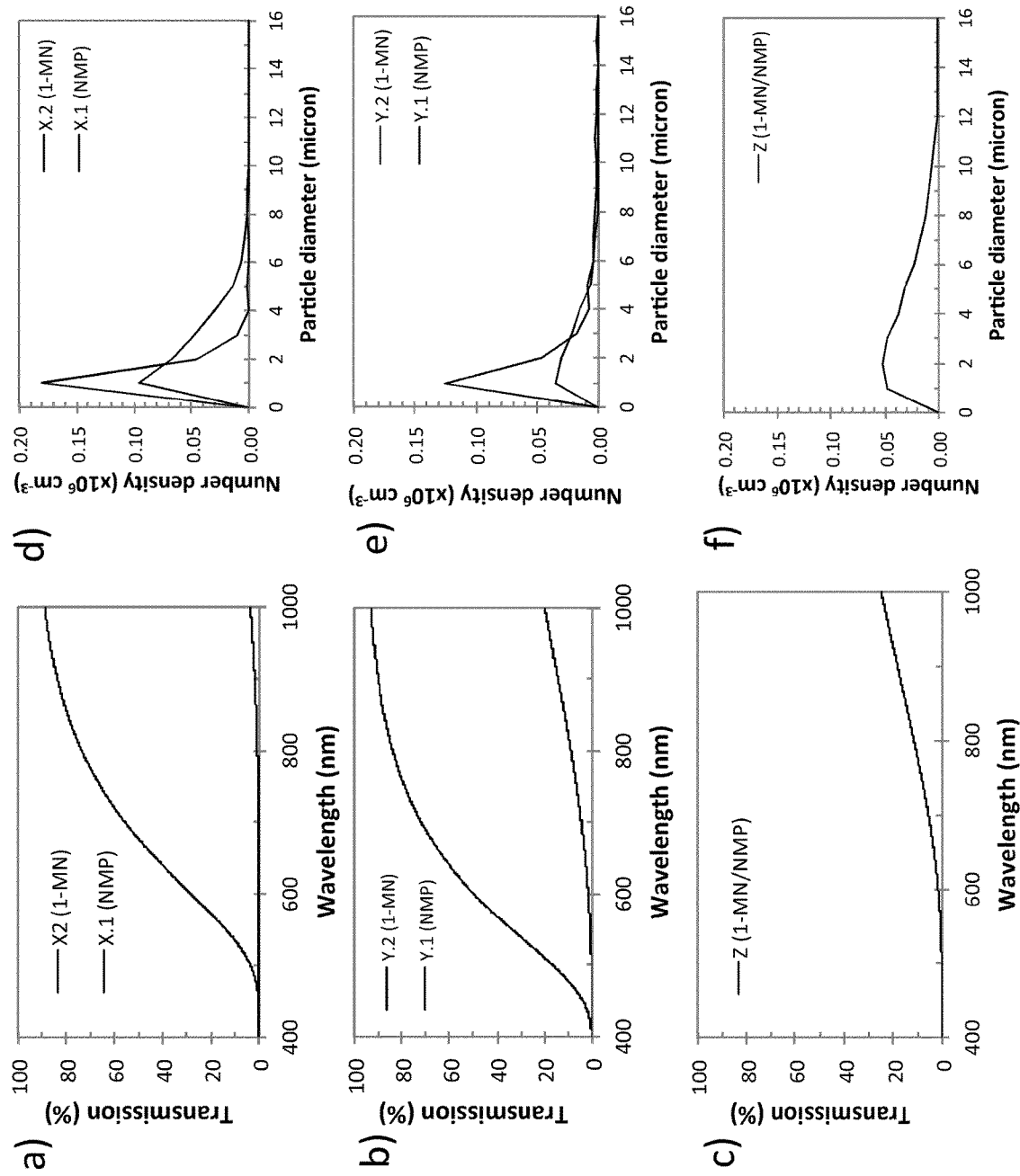
FIGS. 14a to 14f show transmission spectra of a) X , b) Y, c) Z and particle number density measurements of d) X, e) Y and f) Z, with X, Y and Z being samples of Example 6.

FIG. 14 shows transmission spectra of a) X, b) Y, c) Z and particle number density measurements of d) X, e) Y and f) Z. (Abs. at 660 nm/l (m$^{-1}$): X.1$_{NMP}$ 308, X.2$_{1\text{-}MN}$ 34, Y.1$_{NMP}$ 150, Y.2$_{1\text{-}MN}$ 19, Z$_{1\text{-}MN/NMP}$ 144. N (×10$^6$ cm$^3$): X.1$_{NMP}$ 0.27, X.2$_{1\text{-}MN}$ 0.24, Y.1$_{NMP}$ 0.12, Y.2$_{1\text{-}MN}$ 0.23, Z$_{1\text{-}MN/NMP}$ 0.30).

The transmission spectra and absorbance at 660 nm reflect the separation of black and brown materials in sample X and Y. All samples had particle counts 5 0.3×10$^6$ cm$^{-3}$, consistent with stabilised colloids (c.f. H$_{1\text{-}MN/NMP}$, I$_{1\text{-}MN/NMP}$ and J$_{1\text{-}MN/NMP}$ in Table 2).

Figure 15:
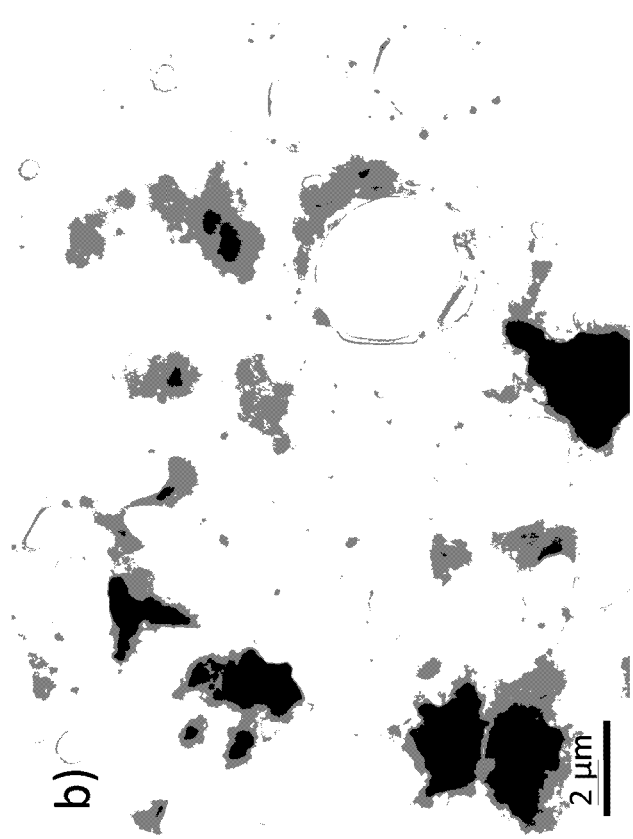
FIG. 15 shows the TEM of material in the brown supernatant $Y.2_{1-MN}$ in Example 6.
Figure 15:
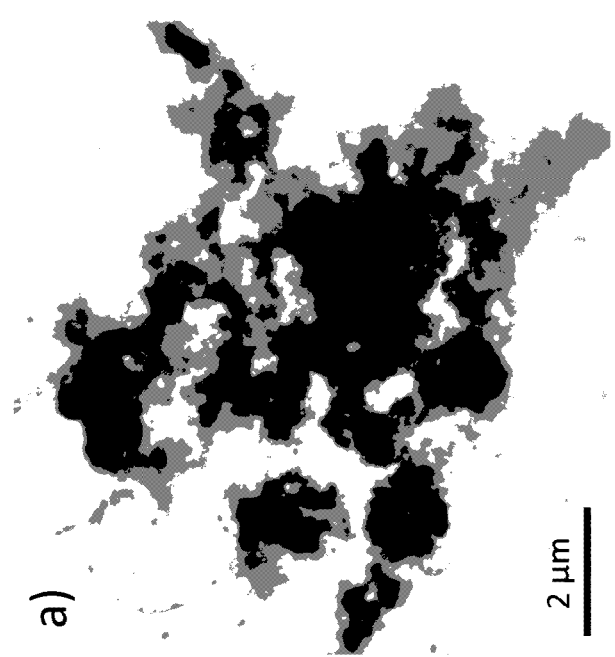

TEM analysis was carried out on $X.1_{NMP}$, $Y.2_{1\text{-}MN}$ and $Z_{1\text{-}MN/NMP}$. FIG. 15 shows the TEM of the brown supernatant $Y.2_{1\text{-}MN}$, which is a low concentration suspension comprising of material that is not finely dispersed but agglomerated into >1 μm sized structures which are electron opaque, and therefore relatively thick.

Figure 16:
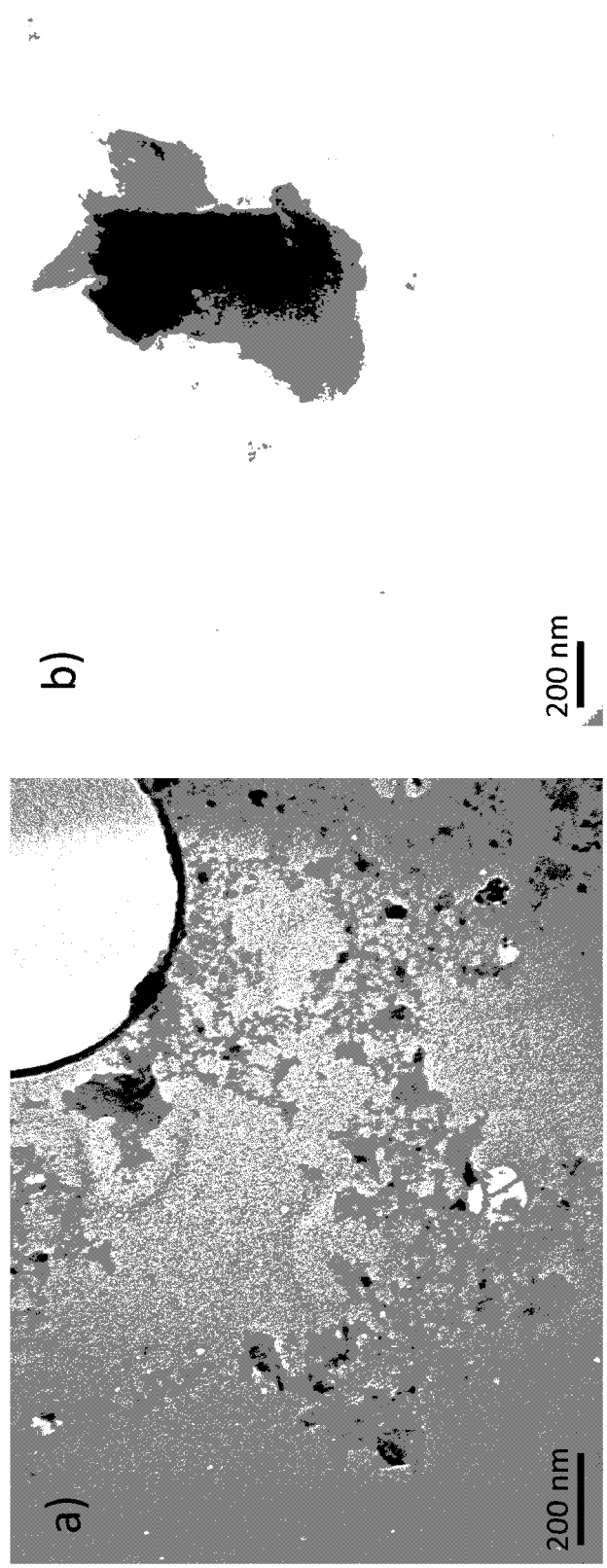
FIGS. 16a and 16b show TEMs of material in the black dispersion $X.1_{NMP}$, in Example 6.

FIG. 16a shows the TEM of the black colloid $X.1_{NMP}$, which is comprised of thin sheets of variable dimensions (10-200 nm) that are seen scattered across the surface of the holey carbon grid. Occasional larger (200-1000 nm) dark particles, which appear to be made of multiple overlapping sheets, are also present (FIG. 16b). These are consistent with the residual aggregate material identified during analysis by laser particle counter.

Figure 17:
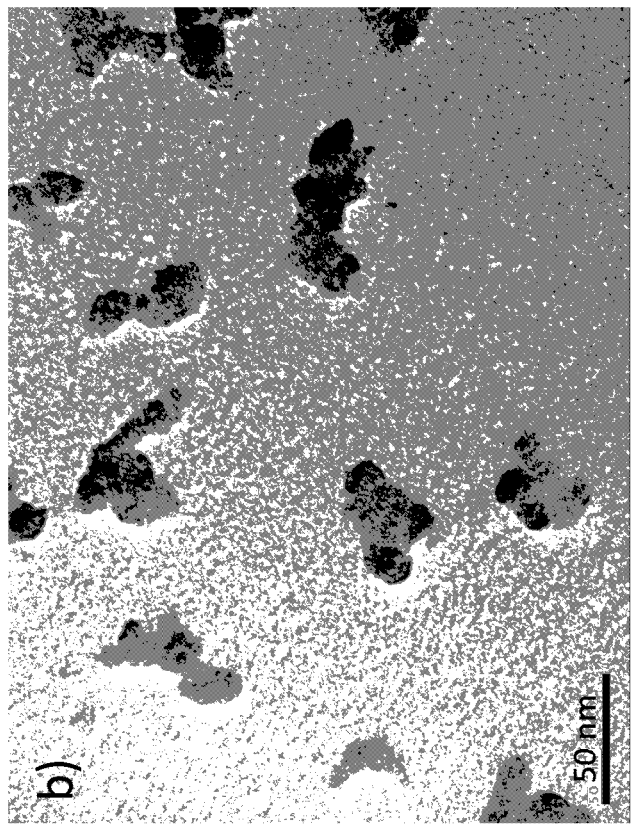
FIG. 17 shows the TEM of material in the black dispersion $Z_{1-MN/NMP}$ in Example 6.
Figure 17:
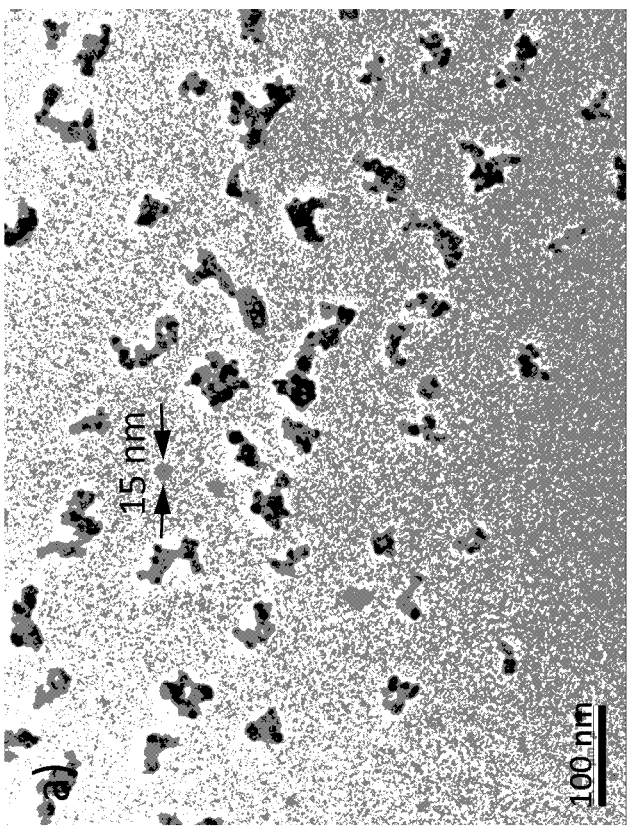

FIG. 17 shows the TEM of $Z_{1\text{-}MN/NMP}$, which contains small (<50 nm) irregular shaped particles, which appear to consist of clusters of primary circular structures with diameters of ca. 15 nm. The $N_2$ sparge and atmosphere during sonication therefore results in some alteration of morphology and the formation of smaller particles.

Figure 18:
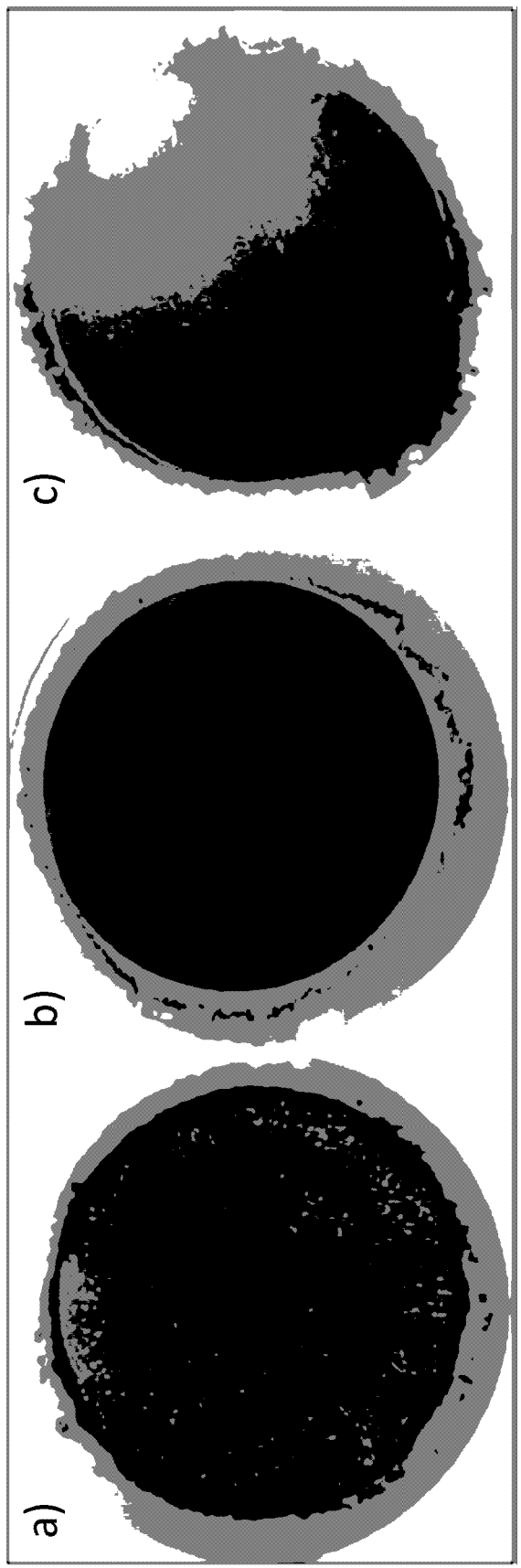
FIG. 18 shows thin films on 0.2 μm alumina filters from dispersions a) $X.1_{NMP}$, b) $X.2_{1-MN}$ and c) $Z_{1-MN/NMP}$ in Example 6.

Thin films were prepared by vacuum filtration of dispersions onto alumina membranes (0.2 μm Whatman Anodisc inorganic unsupported filter) mounted on a fritted glass holder. Films were washed with iso-propanol (15 mL) and dried in an oven (60° C.) for two days. $X.1N_{NMP}$ produced a grey/black film in contrast to the film from $X.2_{1\text{-}MN}$, which was yellow-brown. Sample $Z_{1\text{-}MN/NMP}$ had a dark brown colouration. FIG. 18 shows thin films on 0.2 μm alumina filters from dispersions a) $X.1_{NMP}$, b) $X.2_{1\text{-}MN}$ and c) $Z_{1\text{-}MN/NMP}$.

XPS spectra showed the film composition was primarily carbon and oxygen. Aluminium was also present in significant levels (4-6 atom %) as a result of fractures in the thin films producing a paving of ~50 μm fragments with 10-20 μm gaps. The data was corrected based on the assumption of clean $Al_2O_3$ in areas not covered by carbonaceous material. High levels of carbon (89-92 atom %) are inversely correlated with lower levels of oxygen (6-9 atom %).

Low to trace levels of nitrogen, phosphorus and sulphur were also present and in one case a trace level of sodium was detected (Table 7).

TABLE 7

Elemental composition (atom %) of thin films prepared from samples X and Z.

| Element | $X.1_{NMP}$ | $X.2_{1\text{-}MN}$ | $Z.2_{1\text{-}MN/NMP}$ |
|---|---|---|---|
| O 1s | 9.11 | 7.66 | 6.00 |
| N 1s | 0.71 | 0.15 | 0.85 |
| C 1s | 88.94 | 91.13 | 91.85 |
| P 2s | 0.97 | 0.69 | 1.02 |
| S 2p | 0.26 | 0.36 | 0.27 |
| Na 1s | — | 0.02 | — |

Figure 19:
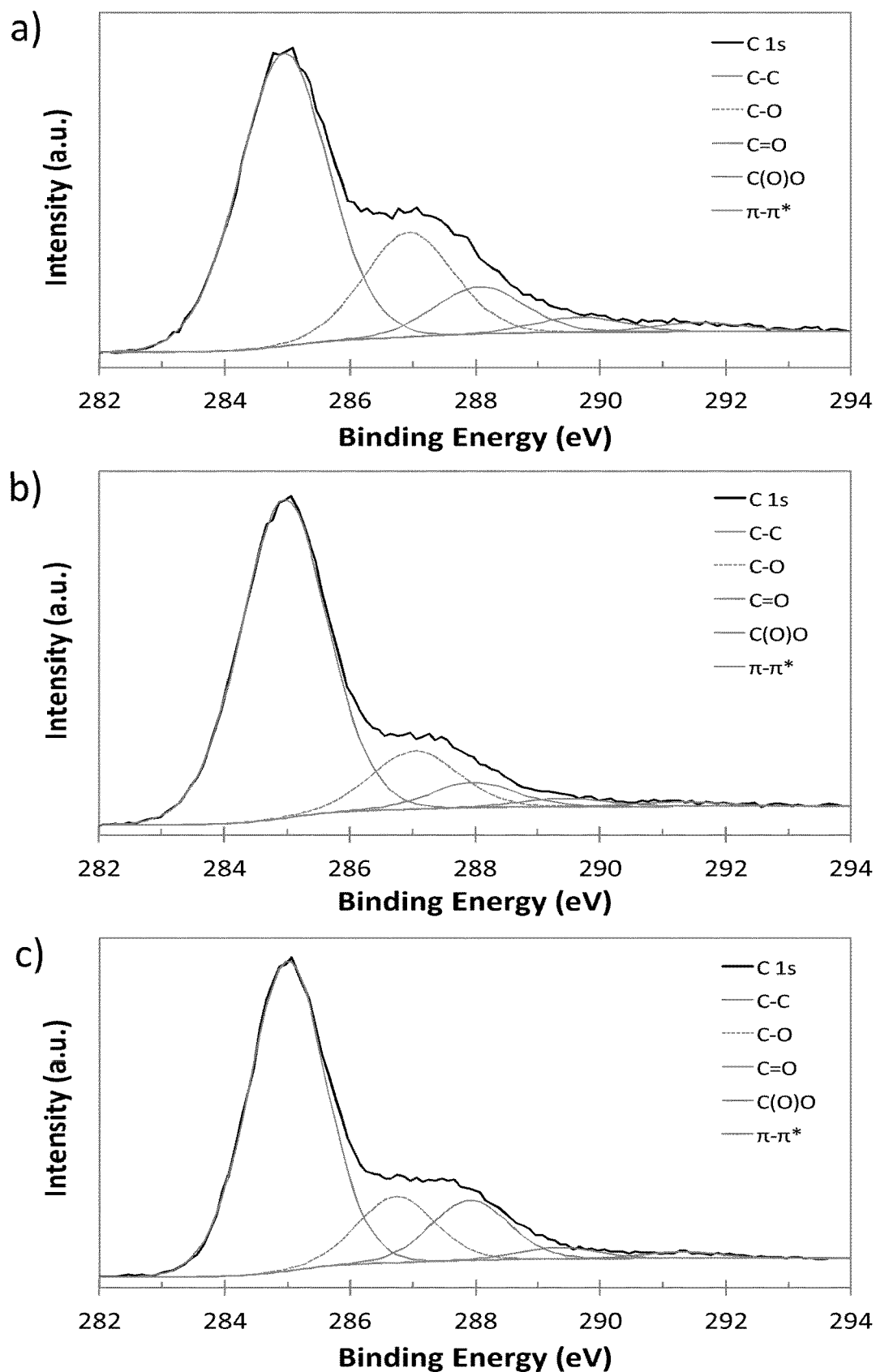
FIG. 19 shows the C1s XPS spectrum of thin films from a) $X.1_{NMP}$, b) $X.2_{1-MN}$ and c) $Z_{1-MN/NMP}$ in Example 6.

FIG. 19 shows the C1s XPS spectrum of thin films from a) $X.1_{NMP}$, b) $X.2_{1\text{-}MN}$ and c) $Z_{1\text{-}MN/NMP}$. The C 1s spectra showed a main peak, which was charge-referenced to an approximate binding energy of 285 eV. This feature can be deconvoluted and fitted with five peaks: C—C (285.0 eV), C—O (286.5 eV), C=O (287.8 eV), O—C=O (289.5 eV) and a π-π* shake up, as seen in aromatics (291.5 eV). Groups who have synthesised graphene have also reported these five features,[2] although here the ratio of oxygenated carbon is somewhat higher and closer to levels typically reported for reduced graphene oxide (rGO) (Table 8).[3,4]

TABLE 8

Composition of C 1s XPS signal attributed to carbon in different environments for samples in this work compared against some reported values for graphene, reduced graphene oxide (rGO) and graphene oxide (GO).

| Group | $X.1_{NMP}$ | $X.2_{1\text{-}MN}$ | $Z_{1\text{-}MN/NMP}$ | Graphene[2] | rGO[3] | rGO[4] | GO[3] | GO[4] |
|---|---|---|---|---|---|---|---|---|
| C—C | 63% | 77% | 68% | 79% | 70% | 69% | 44% | 49% |
| C—O | 22% | 14% | 14% | 10% | 23% | 18% | 45% | 45% |
| C=O | 10% | 6% | 13% | 3% | 14% | 14% | 8% | 7% |
| C(O)O | 3% | 2% | 3% | 6% | 1% | — | 2% | — |

Oxygen spectra were broad and curve-fitted with two main components at ~533 eV and ~534-535 eV. However, strong overlap with oxygen in $Al_2O_3$ is expected and it is therefore difficult to be specific about the chemical groups present.

The N is line was not sufficiently intense on sample $X.2_{1\text{-}MN}$ to enable any useful acquisition at higher resolution. Other spectra had poor signal-to-noise and curve fitting was therefore subject to statistical error. A component at ~400 eV can be attributed to nitrogen in a relatively neutral electronic environment e.g. in amine bonds or similar. A second weak component at ~402-403 eV is also seen which would normally be attributed to protonated nitrogen e.g. in a quaternary ammonium ion. There is some weak evidence for a third component at approximately 406.4 eV in $X.1_{NMP}$ which would correspond to oxidised nitrogen in the form of nitrite-like or nitrate-like groups.

Phosphorus was strongly correlation with the aluminium signal and is therefore assumed to be a low level impurity of the alumina filter. The low sulphur levels correlated with carbon levels but not the aluminium signal. Close inspection of the survey scans showed that sulphur, when detected with a sufficient signal-to-noise ratio, was present in a fully oxidised state e.g. as sulphate $SO_4^{2-}$.

Figure 20:
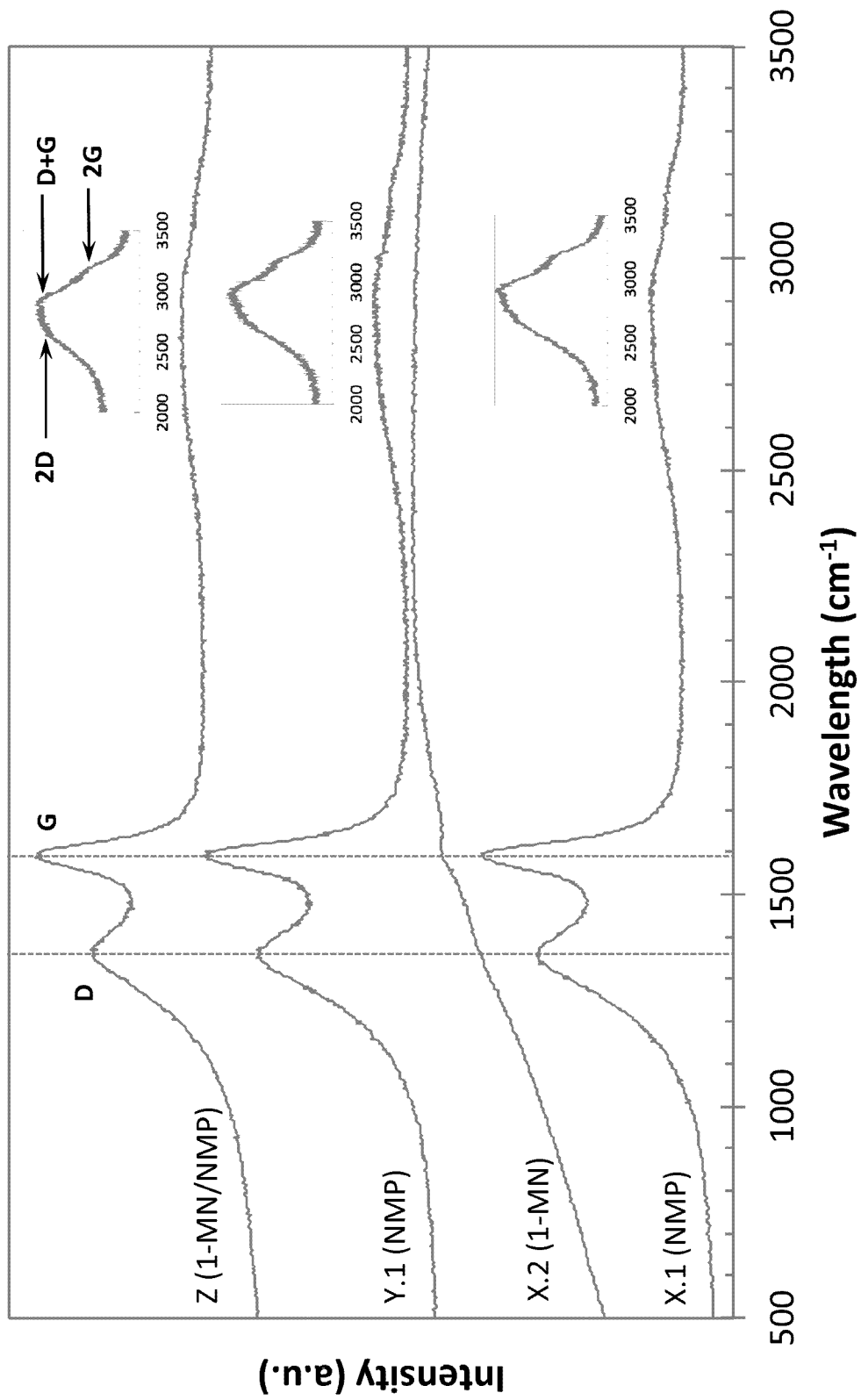
FIG. 20 shows the Raman spectra of thin films from $X.1_{NMP}$, $X.2_{1-MN}$, $Y.1_{NMP}$ and $Z_{1-MN/NMP}$ in Example 6.

FIG. 20 shows the Raman spectra of thin films from $X.1_{NMP}$, $X.2_{1\text{-}MN}$, $Y.1_{NMP}$ and $Z_{1\text{-}MN/NMP}$. The Raman spectra show both G and D bands for all samples although these features were very weak in $X.2_{1\text{-}MN}$, presumably due to the low levels of material captured on the alumina filter. The G band is shifted to a higher wavenumber (~1590 cm$^{-1}$) than in graphite or graphene (~1580 cm$^{-1}$), reflecting the degree of oxidation and the presence of sp$^3$ carbon atoms. The D band (~1360 cm$^{-1}$) also has a higher intensity than in pure forms of graphite and graphene, which can be attributed to defects and disorder at both the edge and on the basal plane of nanosheet structures. The intensity of the 2D band is low and seen in combination with other overtone bands (D+G and 2G)—again consistent with oxidized forms of graphene.[5] The intensity ratio of these bands ($I_D/I_G$~0.83) and their full width at half maximum (FWHM$_G$ ~87 cm$^{-1}$) are consistent with values reported for nanosheets of graphene with a degree of oxidation.[5]

Example 7—Functionalisation of Graphene Nanomaterial (Samples AA-AQ)

Graphene is known to have poor colloidal stability in most common solvents. However dispersion can be aided by the functionalisation of partially oxidised graphene in which the oxygen-containing groups that are present can be used to attach different functional groups. This can be done via sonochemical reactions in which an additional molecule is introduced into the liquid medium comprising diaromatic hydrocarbon whilst it undergoes cavitation. By using functional groups with different polarities it becomes possible to stabilise graphene colloids across a range of different solvents.

Figure 21:
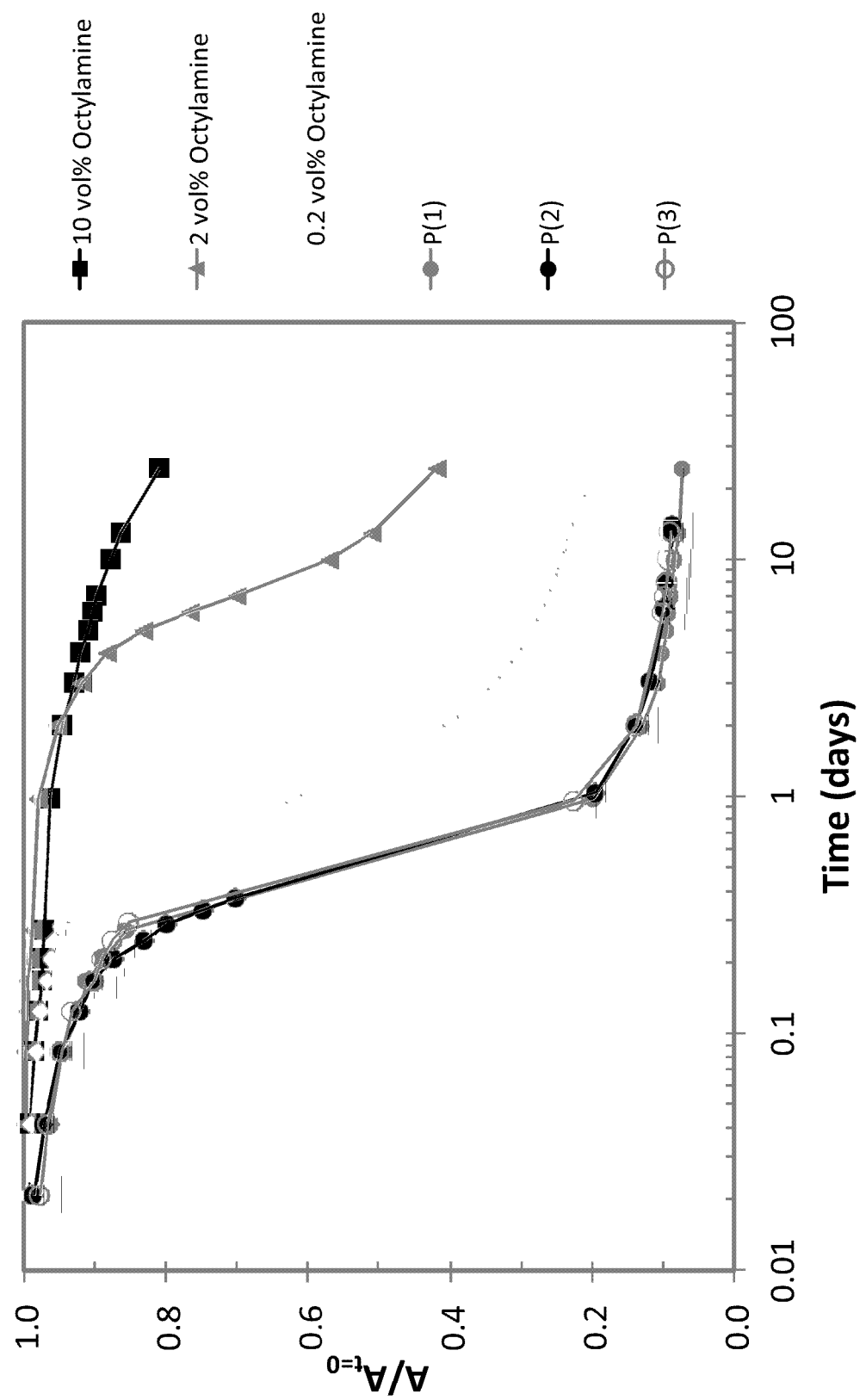
FIG. 21 is a chart showing colloidal stability for dispersion samples generated from 1-MN with octylamine in Example 7.

Octylamine (bp 178° C., mp −1° C.) is miscible with 1-MN and when present at 10 vol % produces a significant reduction in the rate of particle formation (Table 9). Functionalisation with the alkylamine results in an improved colloidal stability in 1-MN when it is used at 0.2, 2 and 10 vol % (FIG. 21).

Figure 22:
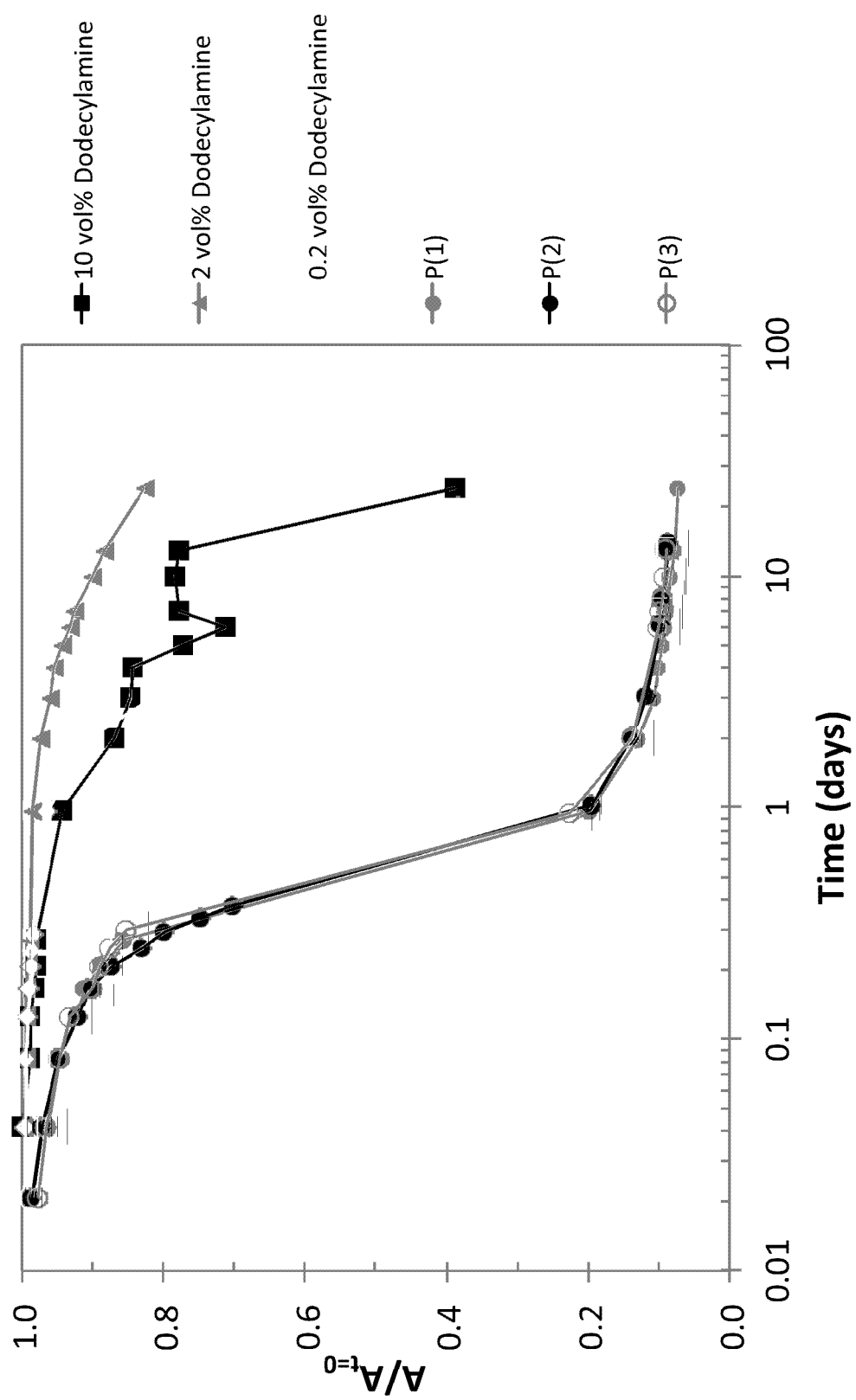
FIG. 22 is a chart showing colloidal stability for dispersion samples generated from 1-MN with dodecylamine in Example 7.

Dodecylamine (bp 247° C., mp 27° C.) forms a cloudy macroemulsion when shaken with 1-MN. When ultrasound is applied the emulsion droplets become smaller leading to the formation of a transparent nanoemulsion. The rate of particle formation during cavitation is not so severely affected as with octylamine (Table 9). The longer alkyl chain length in the molecule leads to more effective colloid stabilisation (FIG. 22), although at 10 vol % the kinetic stability of the nanoemulsion formed during sonication is sufficiently poor to cause some inconsistencies in the stability of the colloidal graphene.

TABLE 9

Functionalisation with alkylamines.

| Sample i.d. | Liquid composition | Energy[a] (kJ) | A $l^{-1}t^{-1}$ ($m^{-1}$ $min^{-1}$) |
|---|---|---|---|
| P(1) | 1-MN (batch 1) | 600 | 2.16 |
| P(2) | 1-MN (batch 2) | 600 | 2.10 |
| P(3) | 1-MN (batch 3) | 600 | 2.09 |
| AA | 0.2 vol % Octylamine[b] | 600 | 2.10 |
| AB | 2 vol % Octylamine[b] | 600 | 1.86 |
| AC | 10 vol % Octylamine[b] | 600 | 0.97 |
| AD | 0.2 vol % Dodecylamine[b] | 600 | 2.08 |
| AE | 2 vol % Dodecylamine[b] | 600 | 1.75 |
| AF | 10 vol % Dodecylamine[b] | 600 | 1.68 |

[a]measured on the in-built meter of the ultrasonic processor
[b]in 1-MN

Figure 23:
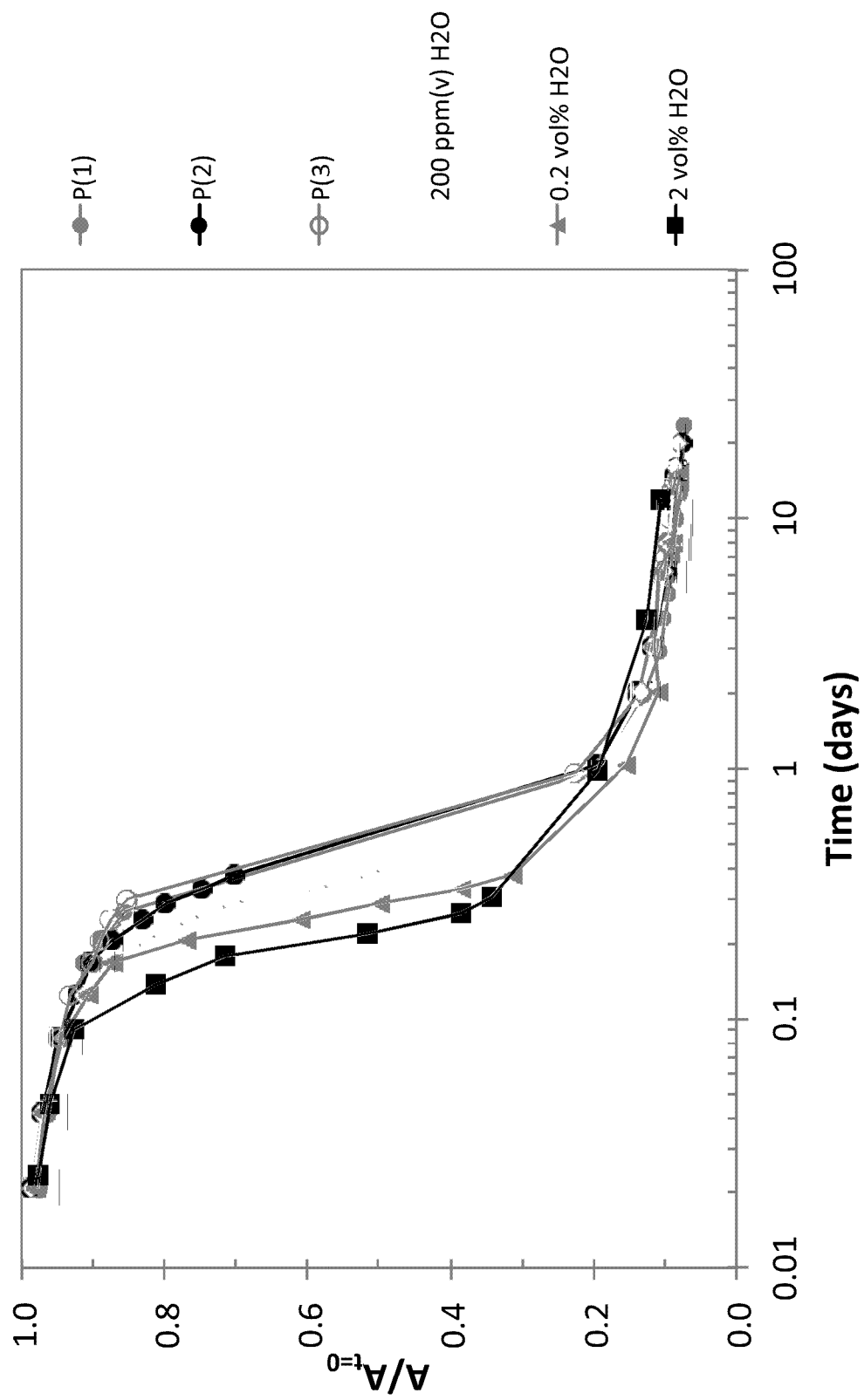
FIG. 23 is a chart showing colloidal stability for dispersion samples generated from 1-MN with water in Example 7.
Figure 24:
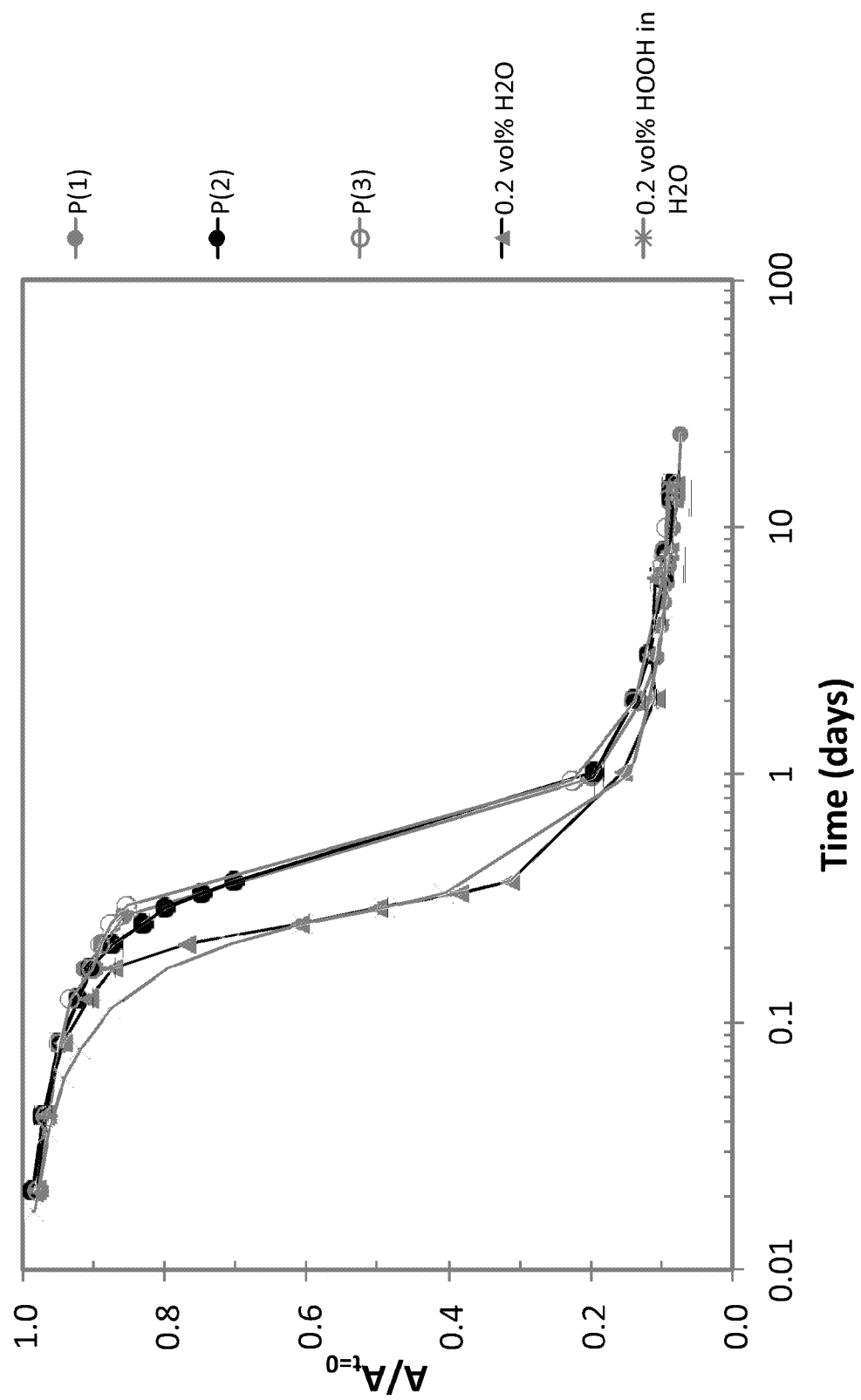
FIG. 24 is a chart showing colloidal stability for dispersion samples generated from 1-MN with water and hydrogen peroxide in Example 7.

Water has a very low solubility in 1-MN and for additions above 200 ppmv cloudy water-in-oil emulsions are formed. Again the application of ultrasound reduces the size of the water droplets in these emulsions until transparent nanoemulsion formation occurs. Such nanoemulsions are kinetically stable and result in small reductions in the rate of particle formation (Table 10). The introduction of water at 200 ppmv, 0.2 vol % and 2 vol % leads to colloids that are less stable than when just 1-MN undergoes cavitation (FIG. 23). Similarly hydrogen peroxide can be used as a functionalising group and produces a similar level of colloidal stability as when just water is used (FIG. 24).

Figure 25:
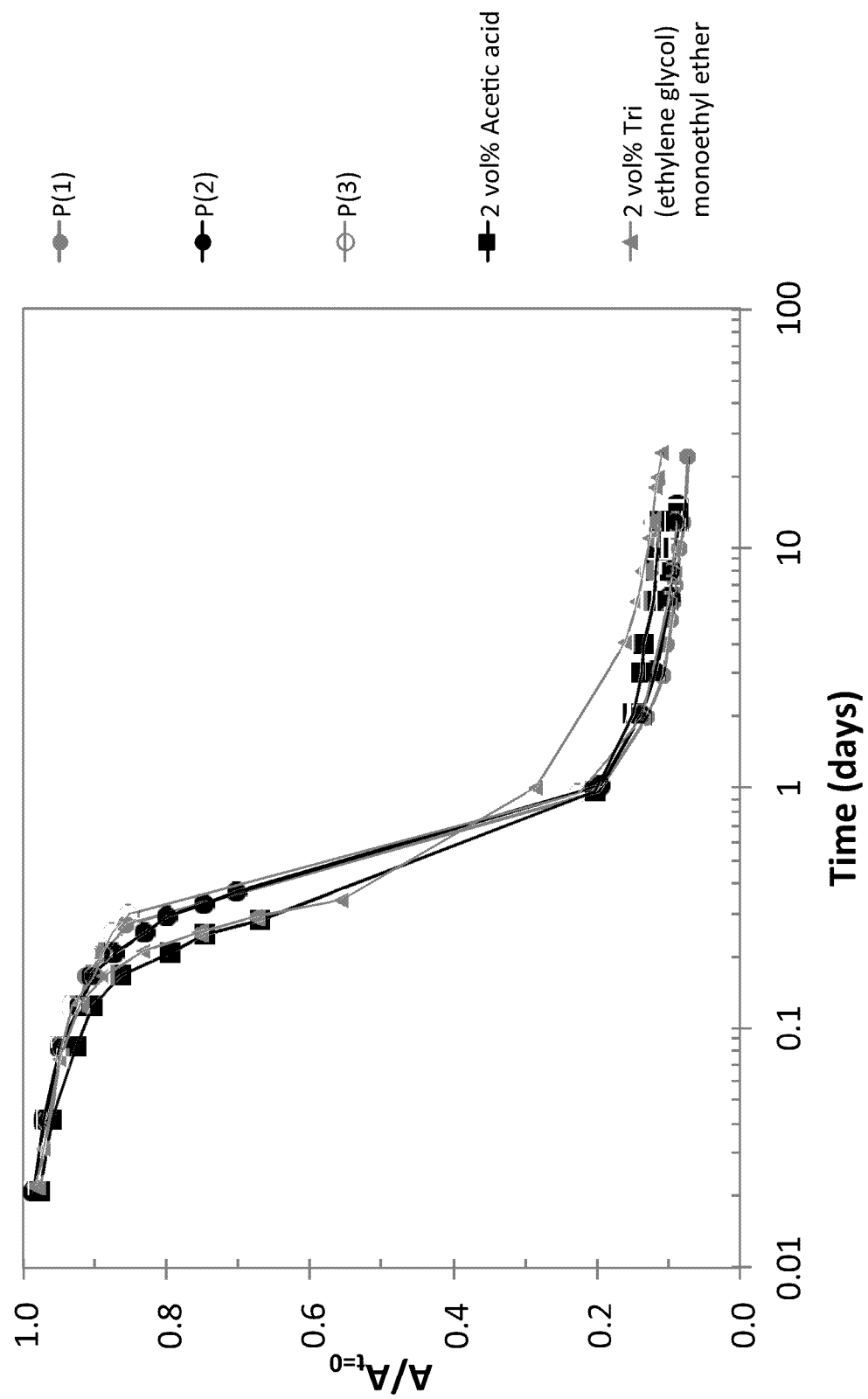
FIG. 25 is a chart showing colloidal stability for dispersion samples generated from 1-MN with acetic acid and tri(ethylene glycol) monoethyl ether in Example 7.

Acetic acid (bp 118° C., mp 16° C.) and tri(ethylene glycol) monoethyl ether (bp 256° C.) are both miscible with 1-MN and when introduced at 2 vol % produced a small reduction in the rate of particle formation (Table 10). Functionalisation with these molecules leads to a slight decrease in the colloidal stability of graphene nanosheets in 1-MN (FIG. 25).

TABLE 10

Functionalisation with H$_2$O, HOOH, acetic acid and tri(ethylene glycol) monoethyl ether.

| Sample i.d. | Liquid composition | Energy[a] (kJ) | A $l^{-1}t^{-1}$ ($m^{-1}$ $min^{-1}$) |
|---|---|---|---|
| P(1) | 1-MN (batch 1) | 600 | 2.16 |
| P(2) | 1-MN (batch 2) | 600 | 2.10 |
| P(3) | 1-MN (batch 3) | 600 | 2.09 |

TABLE 10-continued

Functionalisation with H$_2$O, HOOH, acetic acid and tri(ethylene glycol) monoethyl ether.

| Sample i.d. | Liquid composition | Energy[a] (kJ) | A $l^{-1}t^{-1}$ ($m^{-1}$ $min^{-1}$) |
|---|---|---|---|
| AG | 200 ppm(v) H$_2$O[b] | 600 | 2.12 |
| AH | 0.2 vol % H$_2$O[b] | 600 | 1.96 |
| AI | 2 vol % H$_2$O[b] | 600 | 1.75 |
| AJ | 0.2 vol % HOOH in H$_2$O[b] | 600 | 1.79 |
| AK | 2 vol % Acetic acid[b] | 600 | 1.84 |
| AL | 2 vol % Tri(ethylene glycol) monoethyl ether[b] | 600 | 1.85 |

[a]measured on the in-built meter of the ultrasonic processor
[b]in 1-MN

Figure 26:
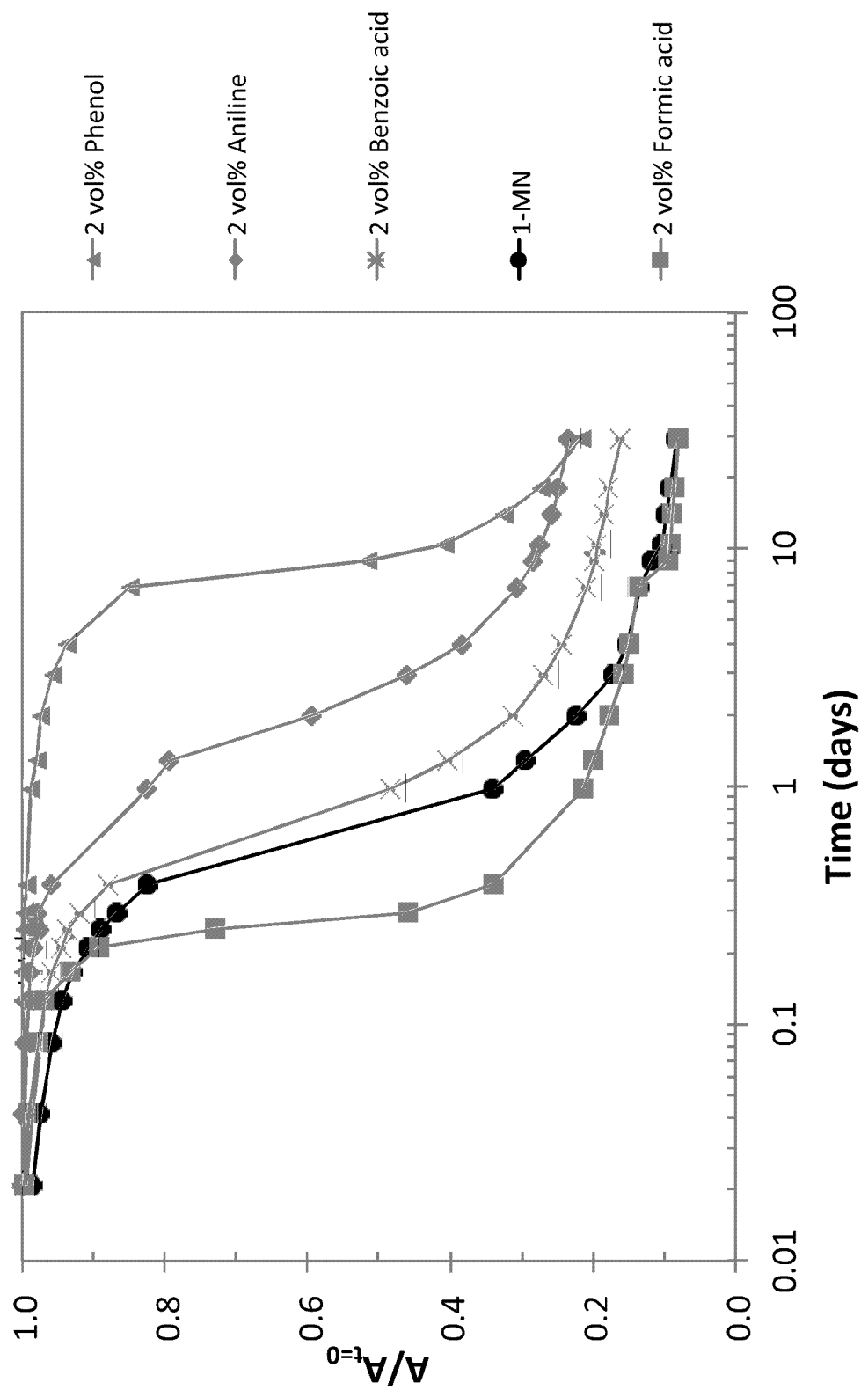
FIG. 26 is a chart showing colloidal stability for dispersion samples generated from 1-MN with Aniline, benzoic acid, phenol, and formic acid in Example 7.

Aniline (bp 184° C., mp −6° C.), benzoic acid (bp 249° C., mp 122° C.) and phenol (bp 182° C., mp 41° C.) are either miscible with or soluble in 1-MN. Each of these aromatic molecules was added to 1-MN (ex Sigma Aldrich) at 2 vol %. Formic acid (bp 101° C., mp 8° C.) is not miscible with 1-MN and at 2 vol % forms a macroemulsion when shaken with 1-MN. Again when ultrasound is applied the macroemulsion becomes a transparent nanoemulsion. The addition of these molecules resulted in no significant changes in the rate of particle formation during cavitation (Table 11). Formic acid produced a less stable colloid in 1-MN whereas the three other molecules increased colloidal stability (FIG. 26). The effectiveness of colloidal stabilisation follows the order benzoic acid<aniline<phenol.

TABLE 11

Functionalisation with aniline, benzoic acid, phenol and formic acid

| Sample i.d. | Liquid composition | Energy[a] (kJ) | A $l^{-1}t^{-1}$ ($m^{-1}$ $min^{-1}$) |
|---|---|---|---|
| AM | 1-MN (ex. Sigma Aldrich) | 600 | 1.96 |
| AN | 2 vol % Aniline[b] | 600 | 1.93 |
| AO | 2 vol % Benzoic acid[b] | 600 | 2.02 |
| AP | 2 vol % Phenol[b] | 600 | 2.03 |
| AQ | 2 vol % Formic acid[b] | 600 | 1.99 |

[a]measured on the in-built meter of the ultrasonic processor
[b]in 1-MN

Discussion

The compression and rarefaction of sound waves when passed through a liquid can produce bubbles; the formation, growth and collapse of which is known as cavitation. These bubbles, which are comprised of vapour and dissolved gases, shrink and expand under the influence of the acoustic field. Individual bubbles experience interference from their surroundings and consequently expansion to an unstable size can be followed by an implosive collapse. This produces localised hot spots (>5000 K), which are characterised by very rapid heating and cooling rates (>10$^9$ K s$^{-1}$)[6-10]

During sonication the maximum radius of a bubble (R$_{max}$) and the time that it takes to collapse (τ) is defined by:[11]

$$R_{max} = 4/(3w_a)(P_A - P_h)(2/(\rho P_A))^{1/2}[1 + 2(P_A - P_h)/3P_h]^{1/3} \quad [1]$$

$$\tau = 0.915 R_{max}(\rho/P_m)1/2(1 + P/P_m) \quad [2]$$

Where $w_a$ is the applied circular frequency ($2\pi f_a$) (s$^{-1}$), $P_A$ is the amplitude of the oscillating acoustic pressure (Nm$^{-2}$), $P_h$ is the hydrostatic pressure (Nm$^{-2}$), ρ is the density (kgm$^{-3}$) of the liquid being irradiated, $P_m$ is the pressure (Nm$^{-2}$) in the liquid at the moment of collapse (which is the sum of the ultrasound amplitude during sonication and the ambient liquid pressure, $(P_A+P_h)$ and P is the vapour pressure (Nm$^{-2}$) inside the collapsing bubble (typically assumed to be the vapour pressure of the liquid). If $\tau > \frac{1}{5}^{th}$ of the cycle time of the acoustic pressure (10 μs for ultrasound at 20 kHz) then insufficient time is available for bubbles to undergo complete collapse.[11] Consequently $R_{max}$ is limited for the implosive bubble collapse of diaromatic hydrocarbons during cavitation induced with ultrasound.

Some of the first reports of non-aqueous sonochemistry were published over fifty years ago and suggest that the sonication of aromatic and heterocyclic compounds produces ring cleavage and acetylene production.[12-14] Subsequently Suslick and co-workers found that alkanes undergo sonochemical reactions, which are similar to high temperature (>1200° C.) pyrolysis.[15] For example, the products of n-decane sonolysis are hydrogen, methane, acetylene and a series of alkenes including ethylene, propylene, butene, pentene, etc. This is consistent with the operation of a radical chain Rice mechanism.[16] Misik and Riesz in related work trapped and identified the radicals produced during the sonolysis of a number of different organic liquids, including n-alkanes. Their results were also consistent with a pyrolysis mechanism.[17-18] Cataldo found that the prolonged sonication of benzene, toluene, styrene, decalin and tetralin produced insoluble dark matter.[19] Infrared spectroscopy of the material from benzene sonolysis suggested that the product contained a cross-linked structure similar to radiation-damaged polystyrene. Decalin and tetralin sonication caused aromatisation reactions, although decalin was also cracked to o-xylene and ethylene. Somewhat related studies have also been carried out on middle distillate hydrocarbons ($C_8$-$C_{26}$), in particular for diesel fuels where there is an interest in understanding cavitation-induced fuel degradation in the high-pressure fuel systems of vehicles.[20-23]

Katoh et al. irradiated benzene (bp 80° C.) with ultrasound and observed a slow formation of solid carbon particles (yellow colouration of the benzene after 1 hour and black sooty material formed after 12 hours)—the formation of $C_{60}$ in low yield (ca. 1 pg) was seen after 1 hour.[24] The same group also irradiated chlorobenzene (bp 131° C.) and 1,2-dichlorobenzene (bp 179° C.) in the absence and presence of a variety of metal particles (ZnCl$_2$, Zn, Ni, NiCl$_2$ and ZnO) to produce either carbon nanotubes or graphitic particles.[25] Graphitisation was not observed in the absence of these metals. They concluded that polymerisation reactions proceeded in the vapour phase to form disordered carbon (primary sonochemistry).[26, 27] Annealing into more ordered structures occurred when metal particles were present through collisions that were induced by the turbulent flow and shockwaves produced by collapsing bubbles.

Assuming an adiabatic compression allows the maximum pressure and temperature that occur inside a collapsing bubble to be calculated:[28, 29]

$$T_{max}=T_o[P_m(\gamma-1)/P] \qquad [3]$$

$$P_{max}=P[P_m(\gamma-1)/P]^{\gamma/(\gamma-1)} \qquad [4]$$

Where $T_0$ is the ambient temperature (K) of the liquid, $\gamma$ is the ratio of heat capacity of the bubble gas at constant pressure ($C_p$) and volume ($C_v$). The relatively high vapour pressure of mono aromatic hydrocarbons compared to diaromatic hydrocarbons means the temperatures produced inside bubbles are not sufficiently high to generate significant and rapid particle formation. For example if identical conditions ($T_o$ and $P_m$) are assumed for different liquids then from equation [3] it follows that $T_{max}$ (1-MN)/$T_{max}$ (toluene) ~200 and $T_{max}$(1-MN)/$T_{max}$(benzene) ~500. Temperatures inside the bubbles generated by the cavitation of water have been experimentally determined at 4300±200 K.[30] Equation [3] gives $T_{max}$(1-MN)/$T_{max}$(H$_2$O) ~50 and this would suggest that accurate estimates of $T_{max}$ for diaromatic hydrocarbons from this equation are not possible. However it is experimentally observed that only the low vapour pressures of diaromatic hydrocarbons (e.g. 1-MN and NAP) are uniquely able to produce the conditions required for homolytic fission of C—H bonds and rapid formation of particles in the vapour phase of the bubbles.

Cyclodehydrogenation reactions enable the growth of two-dimensional carbon sheets.[31-33] If a reaction takes place between the α-positions (1,8 or 4,5) on two adjacent naphthalene molecules then perylene (the second molecule in the homologous rylene series) is produced by a peri-condensation along the zig-zag edge of the molecules.

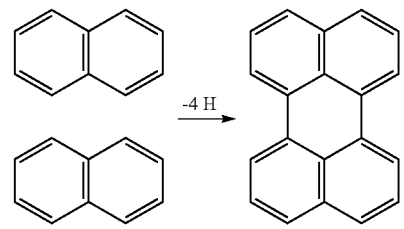

[5]

An armchair feature is established by this reaction, which then allows for a second type of cyclodehydrogenation that produces a cata-condenstaion involving adjacent β-positions (2,3 or 6,7).

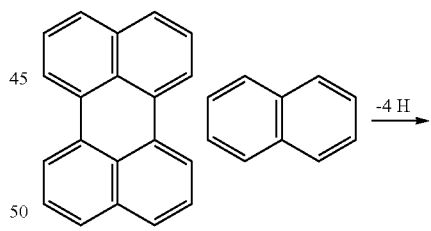

[6]

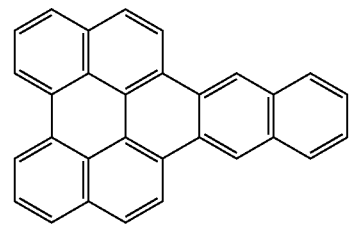

A perfect sheet of graphene is grown if only α, α and β, βC—C bonds are formed. The repeating unit cells established by the two reactions are shown below.

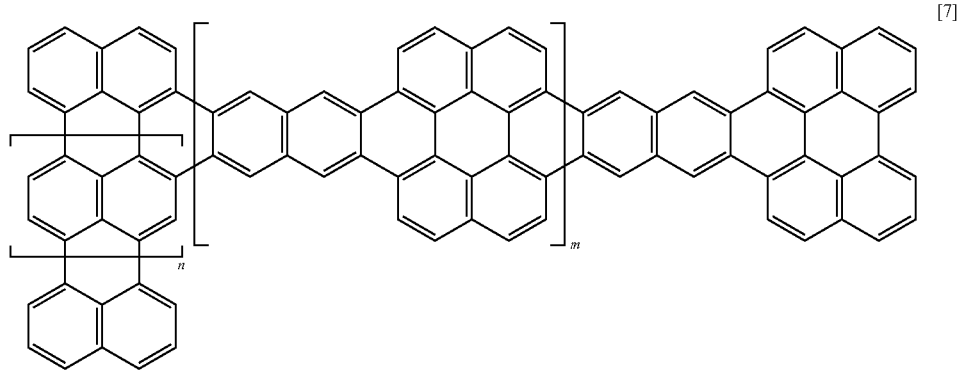

[7]

However if condensation reactions occur between the α and β position of two adjacent molecules, perfect tessellation breaks down and holes (see dots in 8) will appear within the growing sheet.

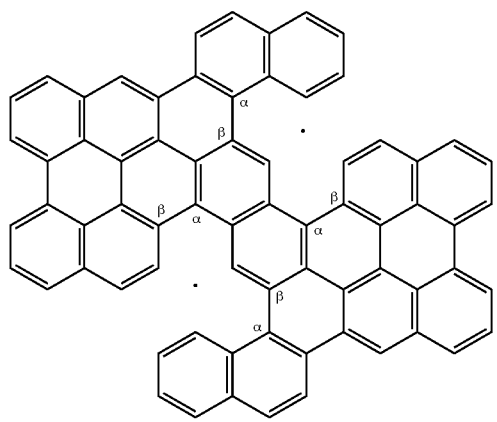

[8]

The temperature of the diaromatic hydrocarbons rapidly equilibrated during sonication to ~40° C. Hydrocarbons contain small amount of dissolved air: ~100-130 mg/L between 10 and 40° C. (determined from Ostwald coefficients reported as a function of temperature for hydrocarbons).[34] Some of this air is removed during the early stages of sonication, with the degree of degassing being dependant on the level of power being used to induce cavitation.[35] Sonication of diaromatic hydrocarbons at the input power used in these experiments produced material with a C/O atom ratio of 10 ($X.1_{NMP}$). This is consistent with naphthalene and oxygen reacting in a 2:1 mole ratio in the collapsing bubbles. C/O atom ratio of the product increased to 15 ($Z_{1-MN/NMP}$) when nitrogen was bubbled through the reaction medium, consistent with 3 moles of naphthalene reacting with 1 mole of oxygen. Further removal of dissolved air will lead to even higher C/O atom ratios and the production of purer forms of graphene nanomaterial. Freeze-pump-thaw, bubbling of inert gasses and inducing cavitation all offers means of reducing the presence of dissolved oxygen in the diaromatic hydrocarbons and decreasing the level of oxidation in the graphene produced.

When NMP (bp 202° C.) is added to the reaction mixture (Sample 0 in Table 4) then the vapour pressure of this component (P=133 $Nm^{-2}$ cf. P=24 $Nm^{-2}$ for 1-MN and P=99 $Nm^{-2}$ for NAP)[36,37] means that the mole fraction of diaromatic hydrocarbons in the bubble is reduced. Additionally $T_{max}$ decreases as the total vapour pressure of the bubble is raised. This results in a ten-fold reduction in the rate of nanosheet formation, which is consistent with the sonochemistry of particle formation taking place in the vapour phase of collapsing bubbles (primary sonochemistry).

Figure 27:
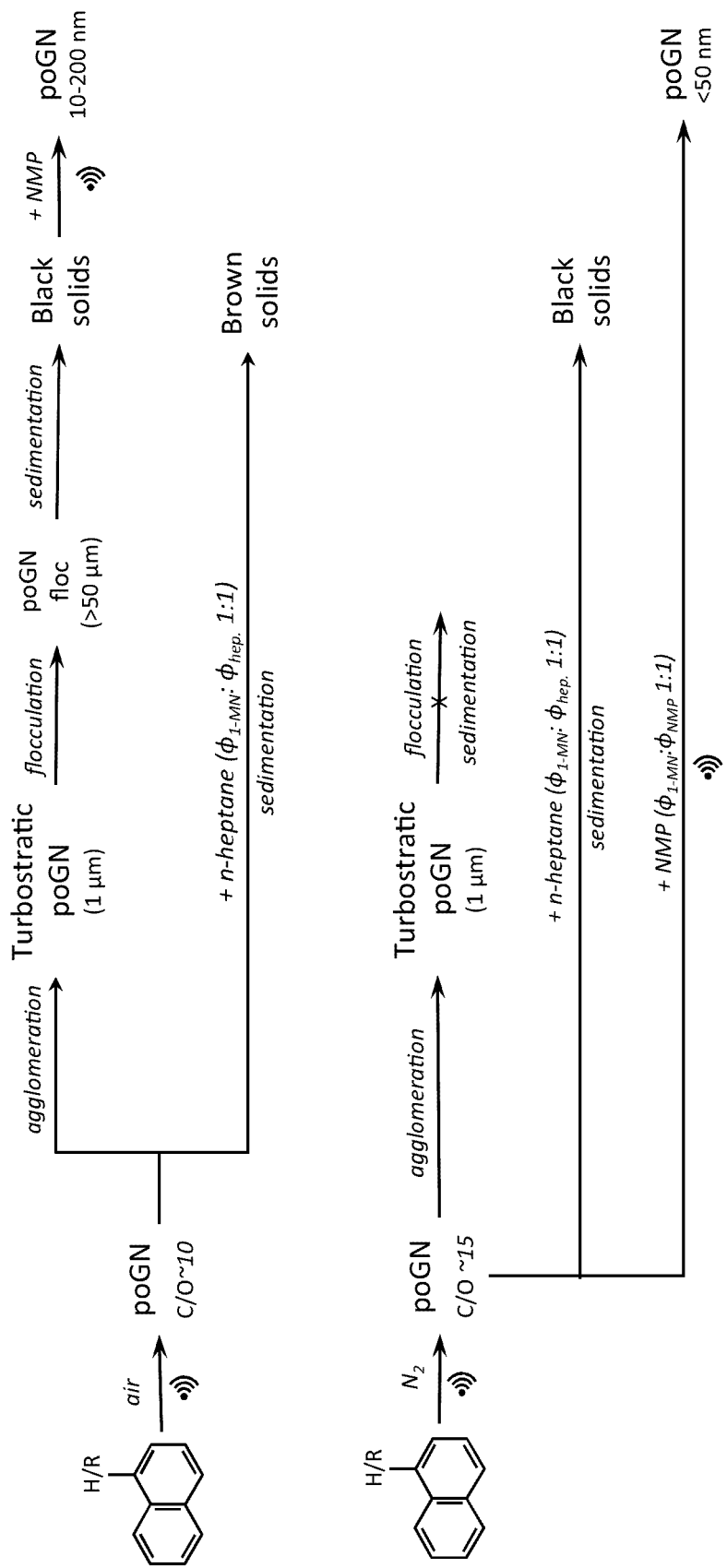
FIG. 27 shows the consequences of diaromatic hydrocarbon cavitation by irradiation with ultrasound (poGN—partially oxidised qraphene nanosheets)

The partially oxidised graphene sheets produced during cavitation undergo perikinetic agglomeration to produce particles of a measurable size (≥1 µm). This material can undergo flocculation to eventually produce black sediments. However some of the sheets produced remain dispersed (due to variations in composition and/or size) until n-heptane is added and they then form brown sediment. The brown colouration is consistent with sheets of smaller dimensions as found for GQDs.[38,39]. Sparging the reaction mixture with nitrogen before cavitation increases the C/O atom ratio in the product from 10 to 15, consistent with a partial removal of dissolved oxygen from the diaromatic hydrocarbons. This shift in composition and possibly change in the distribution of sheet sizes to smaller dimensions means that although some agglomeration still occurs this does not result in flocculation and sedimentation. FIG. 27 shows the consequences of diaromatic hydrocarbon cavitation produced by irradiation with ultrasound (poGN—partially oxidised graphene nanosheets).

Based on reported Hansen Solubility Parameters (HSPs) for graphene (G),[40] reduced graphene oxide (rGO) and graphene oxide (GO)[41] it is possible to assess how readily these two-dimensional materials might disperse in mixtures of 1-MN, NAP and NMP by calculating distances in Hansen solubility space:[42]

$$R^2 = 4(\delta_{D1}-\delta_{D2})^2 + (\delta_{P1}-\delta_{P2})^2 + (\delta_{H1}-\delta_{H2})^2$$

Figure 28:
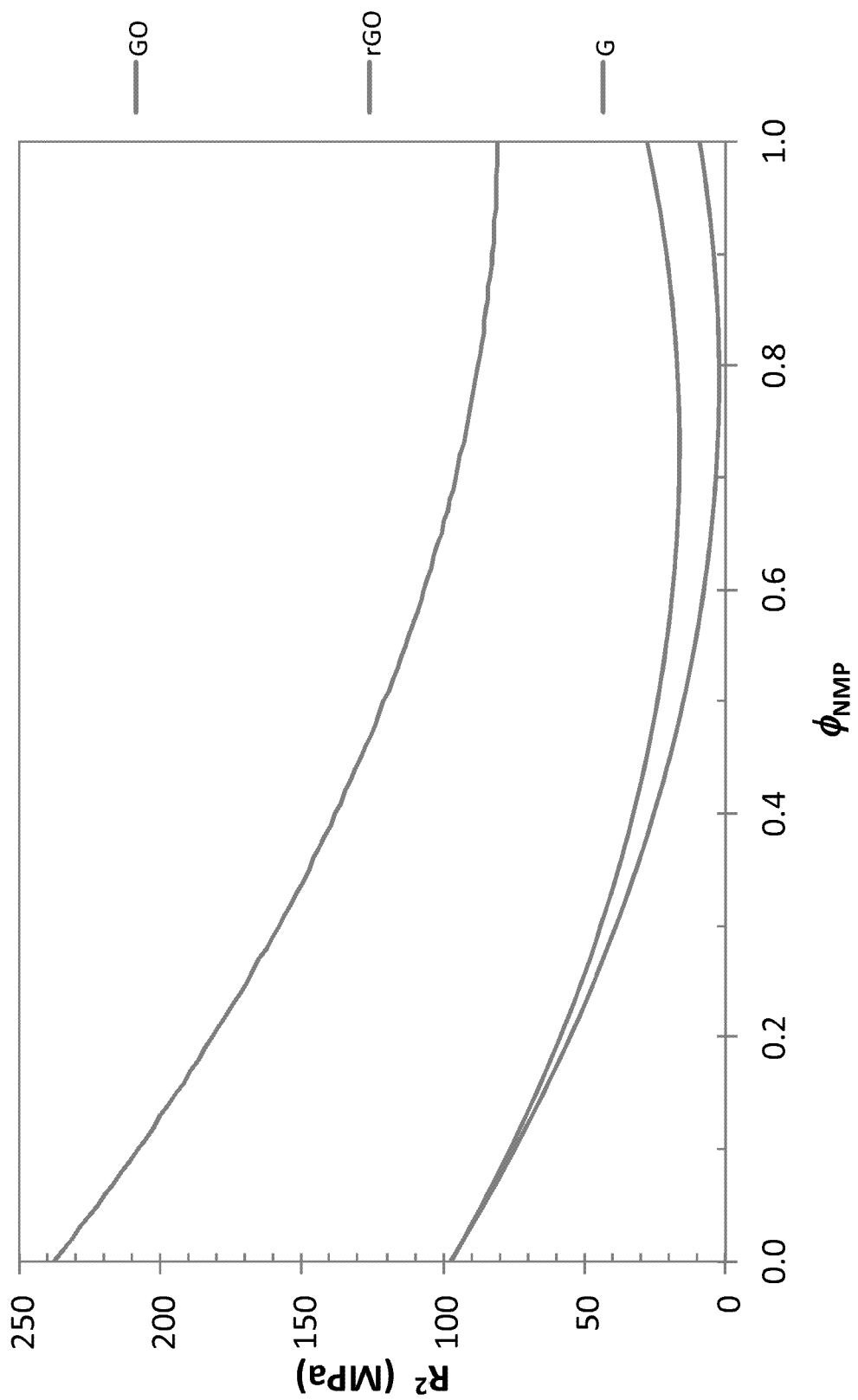
FIG. 28 shows changes in Hansen solubility distance (R) between 2-dimensional materials (graphene (G), reduced graphene oxide (rGO) and graphene oxide (GO)) and diaromatic hydrocarbons ($\phi_{1-MN}=0.8$, $\phi_{NAP}=0.2$) upon addition of NMP.

More highly oxidized forms of graphene are more likely to agglomerate in diaromatic solvents. FIG. 28 shows changes in Hansen solubility distance (R) between 2-dimensional materials (graphene (G), reduced graphene oxide (rGO) and graphene oxide (GO)) and di-aromatic hydrocarbons ($\phi_{1-MN}$=0.8, $\phi_{NAP}$=0.2) upon addition of NMP. The HSPs used to calculate the Hansen solubility distance in FIG. 28 are listed in Table 12.

TABLE 12

Hansen solubility parameters.

| Material | $\delta_{D1}$ (MPa$^{1/2}$) | $\delta_P$ (MPa$^{1/2}$) | $\delta_H$ (MPa$^{1/2}$) |
|---|---|---|---|
| 1-Methylnaphthalene (1-MN)[43] | 20.6 | 0.8 | 4.7 |
| Naphthalene (NAP)[43] | 19.2 | 2.0 | 5.9 |
| N-methyl-2-pyrrolidone (NMP)[43] | 18.0 | 12.3 | 7.2 |
| Graphene (G)[40] | 18.0 | 9.3 | 7.7 |
| Reduced graphene oxide (rGO)[41] | 17.9 | 7.9 | 10.1 |
| Graphene oxide (GO)[41] | 17.1 | 10.0 | 15.7 |

The sheets of graphene produced in this work have levels of oxidation similar to those reported for rGO and the addition of NMP ($\phi_{NMP}$=0.5) after sonication is therefore sufficient to establish stable dispersions of nanosheets. Indeed the Hansen solubility distance could be used to determine other mixtures and solvents that would produce stable colloidal suspensions. The turbostratic structure of nanosheets that forms through agglomeration is disordered and allows sediment to be dispersed into stable colloids of graphene nanosheets by choosing a solvent with an appropriate set of HSPs. The presence of some residual aggregate particles in dispersed colloids may be a consequence of inter-particle collisions driven by the shockwaves generated during the implosion of bubbles forcing sheets together into more graphitic-like material. These aggregates are therefore more ordered structures, which are resistant to dispersion back into nanosheets. However the complete separation of residual aggregate from dispersed nanosheets should be achievable by standard separation techniques.

Making full use of the properties of graphene will require its dispersion in a broad range of solvents. Adjusting levels of oxidation (GO v rGO v G) can increase the range of solvents that may be used to achieve stable colloids but such oxidation has an impact on the physical properties of the 2-dimensional sheets. Chemical functionalisation of graphene provides another means of achieving greater dispersibility.[44] This can be done via non-covalent modifications in which π-π or cation-π interactions are used to adsorb molecules on to the graphene surface. Alternatively surfactants and particles have also been employed to make graphene more dispersible. Covalent modification of graphene typically employs the enhanced chemical reactivity of GO or rGO to produce functionalised graphene. GO and rGO contain a range of epoxide, ether, aldehyde, ketone, alcohol and carboxylic acid groups which provide reactive sites on the sheets at which covalent functionalization can be achieved. Nucleophilic substitutions (e.g. the reaction of the amine functionality of organic modifiers at epoxy groups on the sheet), electrophilic substitutions (e.g. the grafting of aryl diazonium salts to the surface of graphene), condensation reactions (e.g. the reaction of carboxylic acid and hydroxyl groups in GO with isocyanate functionalised hydrocarbons to form amide and carbamate ester linkages) and addition reactions (e.g. the reaction of alkyl azides with graphene via a biradical or [2+1] cycloaddition pathway to form functionalised graphene sheets) have all been the subject of review.[45]

Example 7 illustrates how covalent functionalization may be achieved during the production of graphene nanosheets by the cavitation of diaromatic hydrocarbons. Alkylamines are known to produce nucleophilic ring opening of epoxides and the grafting of alkylamine onto the sheet surface.[46-48] The volatility of octylamine (bp 178° C.) is sufficiently high to result in a significant impact on the composition of the collapsing bubbles (Table 9). Indeed when introduced into the reaction mixture at ϕ=0.1 bubble vapour pressure is significantly increased, resulting in a reduction in the rate of particle formation. The longer alkyl chain in dodecylamine (bp 247° C.) results in a much-reduced impact on bubble composition (Table 13). The ability of both alkylamines to produce colloid stabilisation in 1-MN would suggest that the reaction of the alkylamine with the partially oxidised graphene nanosheets takes place, at least in part, in the liquid phase outside of the collapsing bubble (secondary sonochemistry).

TABLE 13

Impact of alkylamine on bubble composition.

| Material | $\phi_{RNH2}{}^a$ | $x_{RNH2}{}^b$ |
|---|---|---|
| Octylamine | 0.002 | 0.025 |
|  | 0.020 | 0.210 |
|  | 0.100 | 0.591 |
| Dodecylamine | 0.002 | 0.000 |
|  | 0.020 | 0.003 |
|  | 0.100 | 0.018 |

$^a$liquid fraction in reaction mixture
$^b$cestimated mole fraction of RNH$_2$ in the bubble assuming complete degassing Aromatic organic molecules with different functional groups (—NH$_2$, —OH, —COOH) can be used to produce functionalisation. Importantly materials that are not miscible or soluble in diaromatic hydrocarbons can also be used to produce functionalisation. For example the formation of nanoemulsions allows water and formic acid to react with nanosheets, making them more polar (via the incorporation of —OH and —O(O)CH groups) and less stable in 1-MN. It therefore becomes possible to combine solid molecules in a range of different solvents or liquid molecules that are not miscible with diaromatic hydrocarbons and produce functionalisation during the production of graphene nanomaterials by cavitation.

CONCLUSION

Cavitation of diaromatic hydrocarbons provides a means of generating the conditions necessary for a rapid formation of graphene nanomaterial in the vapour phase of imploding bubbles. The level of dissolved air in the liquid reaction medium has an impact on the degree of partial oxidation and for untreated diaromatic hydrocarbons material similar in composition to reduced forms of graphene oxide (rGO) is produced. Reducing the level of dissolved air in the reaction mixture can produce material closer to pristine forms of graphene.

Colloid dispersions of nanomaterial particles that are partially oxidised are prone to agglomeration when dispersed in the starting reaction medium. Larger agglomerates flocculate and then form sediments when dispersions are left to stand. However stable dispersions of sheets can be obtained by adjusting the Hansen Solubility Parameters of the reaction medium before, during or after cavitation. Alternatively sediments may be removed from the reaction medium and re-dispersed into an appropriate solvent to obtain stable dispersion of nanosheets.

The stability of colloid dispersion can also be adjusted by decreasing the level of dissolved air present in the reaction medium during cavitation. Colloidal stability may also be achieved for a range of different solvents by functionalising the material produced during cavitation by introducing appropriate molecules into the reaction medium. These molecules may or may not be soluble in or miscible with diaromatic hydrocarbons.

This bottom up synthesis has potential to be modified to allow for the production of graphene in forms required for different applications and also controlled for the yield of sheet dimensions down to the scales required for the fabrication of graphene quantum dots.

REFERENCES

1. K. R. Paton et al., *Nature Materials*, 2014, 13, 624-630.
2. C. R. Herron, K. S. Coleman, R. S. Edwards and B. G. Mendis, *J. Mater. Chem.*, 2011, 21, 3378-3383.
3. J. Kauppila, *Graphene from graphite by chemical and physical techniques*, Ph.D. thesis, University of Turku, 2014.
4. Sobon et al., *Optics Express*, 2012, 20, 19464-73.
5. K. Krishnamoorthy, M. Veerapandian, K. Yun and S.-J. Kim, *Carbon*, 2013, 53, 38-49.
6. K. S. Suslick, and D. J. Flannigan, *Annu. Rev. Phys. Chem.*, 2008, 59, 659-83.
7. K. S. Suslick, D. A Hammerton and R. E. Cline, *J. Am. Chem. Soc.*, 1986, 108, 5641-2.
8. E. B. Flint and K. S. Suslick, *Science*, 1991, 253, 1397-9.
9. Y. T. Didenko, W. B. McNamara and K. S. Suslick, *J. Phys. Chem. A*, 1999, 103, 10783-8.
10. W. B. McNamara, Y. T. Didenko and K. S. Suslick, *Nature*, 1999, 401, 772-5.
11. T. J. Mason and J. P. Lorimer, *Applied sonochemistry: the use of power ultrasound in chemistry and processing*, Weinham: Wiley-VCH; 2002.
12. L. Zechmeister and L. Wallcave, *J. Am. Chem. Soc.*, 1955, 77, 2853-5.
13. L. Zechmeister and E. F. Magoon, *J. Am. Chem. Soc.*, 1956, 78, 2149-50.
14. D. L. Currell and L. Zechmeister, *J. Am. Chem. Soc.*, 1958, 80, 205-8.
15. K. S. Suslick, J. J. Gawienowski, P. F. Schubert and H. H. Wang, *J. Phys. Chem.*, 1983, 87, 2299-301.
16. P. Riesz, D. Berdahl and C. L. Christman, *Environ. Health Perspect.*, 1985, 64, 233-52.
17. V. Misik and P. Riesz, *J. Phys. Chem.*, 1994, 98, 1634-40.
18. V. Misik and P. Riesz, *Ultrason. Sonochem.*, 1996, 3, 25-37.
19. F. Cataldo, *Ultrason. Sonochem.*, 2000, 7, 35-43.
20. G. J. Price and M. McCollom, *Fuel*, 1995, 74, 1394-7.
21. G. J. Price and M. McCollom, *Ultrason. Sonochem.*, 1995, 2, S67-70.
22. R. D. Lockett and M. Jeshani, *Int. J. Eng. Res.*, 2013, 6, 606-21.
23. R. J. Price, D. Blazina, G. C. Smith and T. J. Davies, *Fuel*, 2015, 156, 30-39.
24. R. Katoh, E. Yanase, H. Yokoi H, S. Usuba, Y. Kakudate and S. Fujwara, *Ultrason. Sonochem.*, 1998, 5, 37-8.
25. R. Katoh, Y. Tasaka, E. Sekreta, M. Yumara, F. Ikazaki, Y. Kakudate and S. Fujjiwara, *Ultrason. Sonochem.*, 1999, 6, 185-7.
26. R. Katoh, H. Yokoi, S. Usuba, Y. Kakudate and S. Fujiwara, *Ultrason. Sonochem.*, 1998, 5, 69-72.
27. H. Xu, B. W. Zeiger and K. S. Suslick, *Chem. Soc. Rev.*, 2013, 42, 2555-2567.
28. B. E. Noltingk and E. A. Neppiras, *Proc. Phys. Soc. 8*, 1950, 638, 674-85 (London).
29. E. A. Neppiras, *Phys. Rep. Rev. Sec. Phys. Lett.*, 1980, 61, 159-251.
30. Y. Didenko, W. B. McNamara III and K. S. Suslick, *J. Phys. Chem. A.*, 1999, 103, 10783-10788.
31. M. Murakami, *Synthetic Metals*, 1987, 18, 531-536
32. H. Kamo, M. Yudasaka, S. Kurita, T. Matsui, R. Kikuchi, Y. Ohki and S. Yoshimura, *Synthetic Metals*, 1994, 68, 61-63.
33. M. Treier, C. A. Pignedoli, T. Laino, R. Rieger, K. Mullen, D. Passerone and R. Fasel, *Nature Chemistry*, 2011, 3, 61-67.
34. *Handbook of Fluid Dynamics and Fluid Machinery: Fundamentals of Fluid Dynamics, Volume I*, Ed. by J. A. Schetz and A. E. Fuhs, Chichester: John Wiley & Sons, Inc; 1996, $p_{161}$-162.
35. T. Vencel, J. Donovalova, A. Gaplovsky, T. Kimura and S. Toma, *Chem. Pap.*, 2005, 59(4), 271-274.
36. NIST Chemistry WebBook, http://webbook.nist.gov/chemistry/
37. Dortmund Data Bank, DDBST GmbH (Oldenburg), http://ddbonline.ddbst.com/AntoineCalculation/AntoineCalculationCGI.exe
38. P. He, J. Sun, S. Tian, S. Yang, S. Ding, G. Ding, X. Xie and M. Jiang, *Chem. Mater.*, 2015, 27(1), 218-226.
39. S. Kim, D. H. Shin, C. O. Kim, S. S Kang, S. S. Joo, S-J. Choi, S. W. Hwang and C. Stone, *Appl. Phys. Let.*, 2013, 102, 053108.
40. Y. Hernandez, M. Lotya, D. Rickard, S D. Bergin and J. N. Coleman, *Langmuir*, 2010, 26(5), 3208-3213.
41. D. Konios, M. M. Stylianakis, E. Stratakis and E. Kymakis, *Journal of Colloid and Interface Science*, 2014, 430, 108-112.
42. M. Yi, Z. Shen, X. Zhang and S. Ma, *J. Phys. D: Appl. Phys.*, 2013, 46, 025301.
43. C. M. Hansen, *Hansen Solubility Parameters: A User's Handbook*, $2^{nd}$ *Edition*, Boca Raton: CRC Press; 2007.
44. D. W. Johnson, B. P. Dobson and K. S. Coleman, *Current Opinion in Colloid & Interface Science*, 2015, 20, 367-382.
45. T. Kuila, S. Bose, A. K. Mishra, P. Khanra, N. H. Kim and J. H. Lee, *Progress in Materials Science*, 2012, 57, 1061-1105.
46. X. Yang, T. Mei, J. Yang, C. Zhang, M. Lv and X. Wang, *Applied Surface Science*, 2014, 305, 725-731.
47. J. Jang, V. H. Pham, S. Hyun, J. S. Chung, *Journal of Colloid and Interface Science*, 2014, 42, 62-66.
48. P. Feicht, D. A. Kunz, A. Lerf and J. Breu, *Carbon*, 2014, 80, 229-234.

The invention claimed is:

1. A process for preparing a functionalised graphene nanomaterial product, the process comprising:
    cavitating a liquid medium comprising a diaromatic component and a functionalising component to synthesise functionalised graphene nanomaterial from the diaromatic component and the functionalising component and form a dispersion of the functionalised graphene nanomaterial in the liquid medium; and
    obtaining a functionalised graphene nanomaterial product from the dispersion, wherein the functionalising component includes molecules comprising an amine group, molecules comprising a hydroxyl or peroxide group, molecules comprising a carboxylic acid group, or a combination thereof.

2. The process of claim 1, wherein the nanomaterial product comprises graphene quantum dots, graphene nanoflakes, graphene nanoribbons, graphene nanosheets, or combinations thereof.

3. The process of claim 1, comprising cavitating the liquid medium in the presence of oxygen or another heteroatom impurity and wherein the nanomaterial product comprises one or more heteroatom impurities.

4. The process of claim 1, wherein the diaromatic component comprises optionally substituted fused or linked diaromatic hydrocarbons or heterocycles.

5. The process of claim 1, wherein the diaromatic component is a diaromatic hydrocarbon component consisting of one or more optionally substituted diaromatic hydrocarbons.

6. The process of claim 1, wherein the diaromatic component comprises one or more compounds of Formula A or Formula B, or heterocyclic variants thereof, optionally substituted with one or more moieties at one or more of the numbered positions:

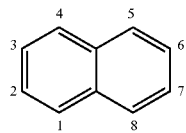

Formula A

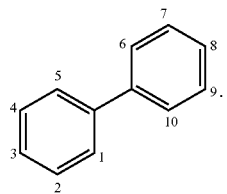

Formula B

7. The process of claim 6, wherein the one or more moieties are selected from alkyl, alkenyl or alkynyl substituents, and halides.

8. The process of claim 6, wherein the one or more moieties are selected from methyl, ethyl, and halides.

9. The process of claim 1, wherein the diaromatic component comprises methylnaphthalene or ethylnaphthalene, and optionally naphthalene.

10. The process of claim 1, wherein the liquid medium comprises a stabilising component for stabilising the dispersion of graphene nanomaterial to be formed.

11. The process of claim 10, wherein the stabilising component comprises a solvent which on addition to the liquid medium, is capable of reducing the distance in Hansen space between the predicted Hansen Solubility Parameters of the liquid medium (HSPs: $\delta_{Ds}$, $\delta_{Ps}$ and $\delta_{Hs}$) and of graphene, graphene oxide, reduced graphene oxide, or functionalised graphene (HSPs: $\delta_{Dg}$, $\delta_{Pg}$ and $\delta_{Hg}$), such that it reduces R, where $R^2 = (\delta_{Dg}-\delta_{Ds})^2+(\delta_{Pg}-\delta_{Ps})^2+(\delta_{Hg}-\delta_{Hs})^2$.

12. The process of claim 10, wherein the stabilising component comprises N-Methyl-2-pyrrolidone (NMP).

13. The process of claim 10, wherein the liquid medium consists of the diaromatic component, the functionalising component and a balancing amount of stabilising component.

14. The process of claim 1, wherein the functionalising component is selected to enhance dispersion stability of the graphene nanomaterial.

15. The process of claim 1, wherein the functionalising component comprises one or more compounds capable of taking part in a nucleophilic substitution, electrophilic substitution, condensation reaction or addition reaction.

16. The process of claim 1, wherein the functionalising component comprises aromatic molecules, optionally substituted with one or more of an amine group, hydroxyl group, peroxide group, and carboxylic acid group.

17. The process of claim 1, wherein the liquid medium comprises an emulsion of the functionalising component in the diaromatic component, the emulsion optionally being kinetically stable or thermodynamically stable.

18. The process of claim 1 wherein cavitation of the liquid is effected by subjecting the liquid medium to ultrasound.

19. A process for preparing a functionalised graphene nanomaterial product, the process comprising:
    cavitating a liquid medium comprising a diaromatic component and a functionalising component to synthesise functionalised graphene nanomaterial from the diaromatic component and the functionalising component and form a dispersion of the functionalised graphene nanomaterial in the liquid medium; and
    obtaining a functionalised graphene nanomaterial product from the dispersion, wherein the functionalising component is one or more compounds capable of taking part in a nucleophilic substitution, electrophilic substitution, condensation reaction or addition reaction and is present in an amount in the range of from 0.01 to 10% v/v based on the total volume of the liquid medium, and wherein the diaromatic component comprises methylnaphthalene or ethylnaphthalene, and optionally naphthalene.

* * * * *